United States Patent
Ragner et al.

(10) Patent No.: US 9,022,076 B2
(45) Date of Patent: May 5, 2015

(54) LINEARLY RETRACTABLE PRESSURE HOSE STRUCTURE

(71) Applicant: Ragner Technology Coporation, Newberry, FL (US)

(72) Inventors: Gary Dean Ragner, Gainesville, FL (US); Robert Daniel deRochemont, Jr., Gainesville, FL (US)

(73) Assignee: Ragner Technology Corporation, Newberry, FL (US)

( * ) Notice: Subject to any disclaimer, the term of this patent is extended or adjusted under 35 U.S.C. 154(b) by 0 days.

(21) Appl. No.: 14/262,108

(22) Filed: Apr. 25, 2014

(65) Prior Publication Data

US 2014/0230945 A1      Aug. 21, 2014

Related U.S. Application Data

(60) Continuation of application No. 11/343,602, filed on Jan. 30, 2006, now Pat. No. 8,776,836, which is a continuation-in-part of application No. 11/234,944, filed on Sep. 26, 2005, now Pat. No. 7,549,448, which (Continued)

(51) Int. Cl.
*F16L 11/00* (2006.01)
*F16L 11/24* (2006.01)
(Continued)

(52) U.S. Cl.
CPC ............... *F16L 11/24* (2013.01); *F16L 11/118* (2013.01); *F16L 11/111* (2013.01); *F16L 11/112* (2013.01); *F16L 11/115* (2013.01)

(58) Field of Classification Search
CPC ....... F16L 11/02; F16L 11/082; F16L 11/085; F16L 11/086; F16L 11/087; F16L 11/088; F16L 11/112

USPC .................. 138/119, 121, 122, 125, 126, 133; 239/281

See application file for complete search history.

(56) References Cited

U.S. PATENT DOCUMENTS

2,396,059 A    3/1946  Leo et al.
2,867,833 A    1/1959  Duff
(Continued)

FOREIGN PATENT DOCUMENTS

DE    26 02 502 A    7/1976
DE    197 38 329 A    3/1999
(Continued)

OTHER PUBLICATIONS

International Search Report and Written Opinion dated Feb. 13, 2014 for Application No. PCT/US2013/069301.
(Continued)

*Primary Examiner* — James Hook
(74) *Attorney, Agent, or Firm* — Frost Brown Todd LLC

(57) ABSTRACT

A self-actuated linearly retractable and extendible hose for use in transporting fluids (liquids, gases, solid particles, and combinations of these) between a source location and an output location can be implemented as an extendible hose comprising a biasing element, a sealing layer, and a reinforced cover layer. The sealing layer forms a sealed conduit for transporting the fluids, and the reinforced cover layer on the outside provides radial and longitudinal strength for the sealing layer. The hose can be operated by increasing internal pressure within the hose relative to ambient pressure. When the hose is pressurized by a fluid source, the internal pressure of the hose overcomes the retracting force of the biasing element and the hose extends. When the fluid source is turned off or disconnected from the hose, internal pressure is reduced and the biasing element exerts a tension force on the hose causing the hose to retract.

18 Claims, 16 Drawing Sheets

Related U.S. Application Data is a division of application No. 10/303,941, filed on Nov. 25, 2002, now Pat. No. 6,948,527.

(60) Provisional application No. 60/648,638, filed on Jan. 29, 2005, provisional application No. 60/739,323, filed on Nov. 23, 2005, provisional application No. 60/335,497, filed on Nov. 24, 2001.

(51) Int. Cl.
    *F16L 11/118* (2006.01)
    *F16L 11/11* (2006.01)
    *F16L 11/112* (2006.01)
    *F16L 11/115* (2006.01)

(56) References Cited

U.S. PATENT DOCUMENTS

| | | | |
|---|---|---|---|
| 2,927,625 A | 3/1960 | Rothermel et al. | |
| 2,954,802 A | 10/1960 | Duff | |
| 3,028,290 A | 4/1962 | Roberts et al. | |
| 3,050,087 A | 8/1962 | Caplan | |
| 3,288,169 A | 11/1966 | Moss | |
| 3,353,996 A | 11/1967 | Hamrick | |
| 3,486,532 A | 12/1969 | Sawada | |
| 3,520,725 A | 7/1970 | Hamrick | |
| 3,623,500 A | 11/1971 | Hoy | |
| 3,861,424 A | 1/1975 | Mizutani et al. | |
| 3,872,893 A * | 3/1975 | Roberts | 138/121 |
| 3,966,121 A | 6/1976 | Littman | |
| 4,009,734 A | 3/1977 | Sullivan | |
| 4,050,113 A | 9/1977 | Wright et al. | |
| 4,096,888 A | 6/1978 | Stefano et al. | |
| 4,136,149 A | 1/1979 | Payne | |
| 4,704,765 A | 11/1987 | Ataka | |
| 4,955,106 A | 9/1990 | Stein et al. | |
| 5,023,959 A | 6/1991 | Mercer | |
| 5,036,890 A | 8/1991 | Whaley | |
| 5,156,349 A | 10/1992 | Wilson et al. | |
| 5,485,870 A | 1/1996 | Kraik | |
| 5,526,842 A | 6/1996 | Christensen | |
| 5,555,915 A | 9/1996 | Kanao | |
| 5,607,107 A | 3/1997 | Grieve et al. | |
| 5,740,851 A | 4/1998 | Haynes | |
| 5,778,941 A | 7/1998 | Inada | |
| 5,780,581 A | 7/1998 | Hermansen et al. | |
| 6,024,132 A | 2/2000 | Fujimoto | |
| 6,024,134 A | 2/2000 | Akedo et al. | |
| 6,098,666 A | 8/2000 | Wells et al. | |
| 6,182,327 B1 | 2/2001 | Gosselin | |
| 6,186,181 B1 | 2/2001 | Schippl | |
| 6,223,777 B1 | 5/2001 | Smith et al. | |
| 6,382,241 B1 | 5/2002 | Setrum | |
| 6,523,539 B2 | 2/2003 | McDonald et al. | |
| 6,607,010 B1 | 8/2003 | Kashy | |
| 6,830,076 B1 * | 12/2004 | Patel | 138/110 |
| 6,948,527 B2 | 9/2005 | Ragner et al. | |
| 6,983,757 B1 | 1/2006 | Becker et al. | |
| 7,156,127 B2 | 1/2007 | Moulton et al. | |
| 7,398,798 B2 | 7/2008 | Ostan et al. | |
| 7,520,302 B2 | 4/2009 | Smith | |
| 7,549,448 B2 | 6/2009 | Ragner | |
| 8,291,941 B1 | 10/2012 | Berardi | |
| 8,291,942 B2 | 10/2012 | Berardi | |
| 8,479,776 B2 | 7/2013 | Berardi | |
| 8,757,213 B2 * | 6/2014 | Berardi | 138/118 |
| 8,776,836 B2 * | 7/2014 | Ragner et al. | 138/119 |
| 2002/0013974 A1 | 2/2002 | Gibson et al. | |
| 2004/0194781 A1 * | 10/2004 | Fukunaga et al. | 128/203.12 |
| 2004/0231096 A1 | 11/2004 | Battle et al. | |
| 2006/0070679 A1 * | 4/2006 | Ragner | 138/119 |
| 2009/0050227 A1 * | 2/2009 | Smith | 138/122 |
| 2009/0071400 A1 * | 3/2009 | Soyland et al. | 118/323 |
| 2009/0277525 A1 * | 11/2009 | Jourdan | 138/122 |
| 2009/0301593 A1 * | 12/2009 | Zucchi et al. | 138/109 |
| 2010/0108170 A1 | 5/2010 | Chudkosky et al. | |
| 2013/0180615 A1 | 7/2013 | Ragner et at. | |

FOREIGN PATENT DOCUMENTS

| | | |
|---|---|---|
| EP | 0 965 689 A | 12/1999 |
| FR | 2 336 624 A | 7/1977 |
| GB | 982 951 | 2/1965 |
| GB | 1 551 429 | 8/1979 |
| GB | 2 310 369 A | 8/1997 |
| JP | 2002-206670 | 7/2002 |
| WO | WO 85/00277 | 1/1985 |
| WO | WO 99/35954 | 7/1999 |
| WO | WO 03/024294 | 3/2003 |
| WO | WO 2012/122601 | 9/2012 |

OTHER PUBLICATIONS

US Office Action dated Feb. 26, 2007 for U.S. Appl. No. 11/343,602.
US Office Action dated Apr. 30, 2008 for U.S. Appl. No. 11/343,602.
US Office Action dated Mar. 16, 2012 for U.S. Appl. No. 11/343,602.
US Office Action dated Jun. 13, 2013 for U.S. Appl. No. 11/343,602.
Notice of Allowabilty dated Feb. 25, 2009 for U.S. Appl. No. 11/234,944.
English language equivalent of German Patent DE 26 02 502.
Abstract and English Machine Translation of German Patent DE 197 38 329.
English language equivalent of French Patent FR 2 336 624.
Abstract and English Machine Translation of Japenese Patent JP 2002-206670.

* cited by examiner

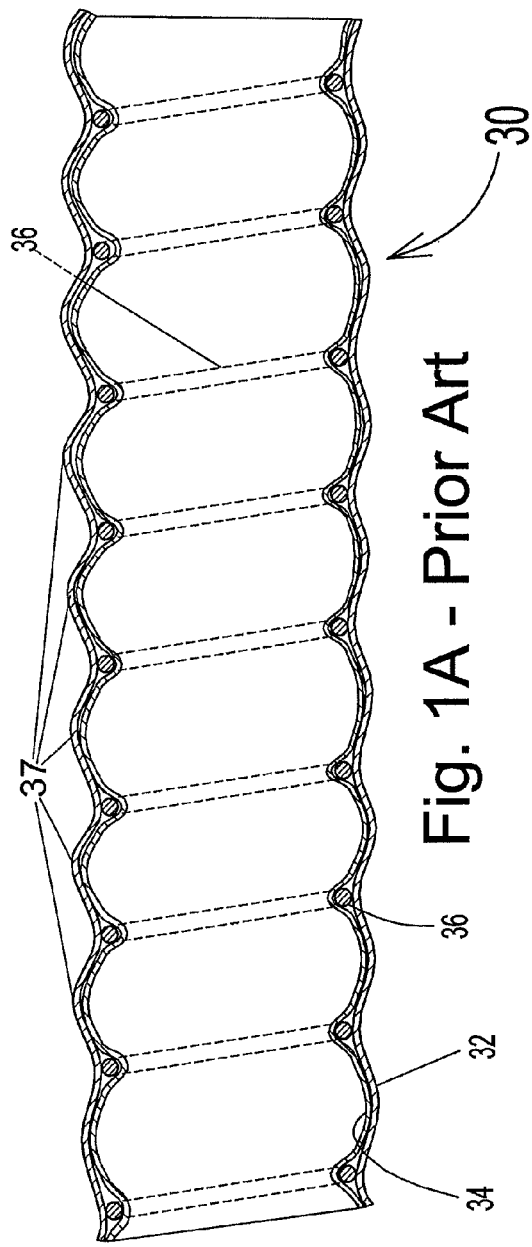
Fig. 1A - Prior Art
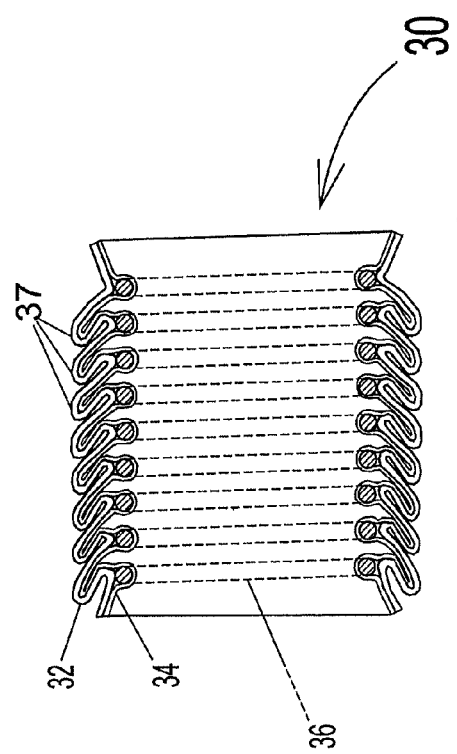
Fig. 1B - Prior Art

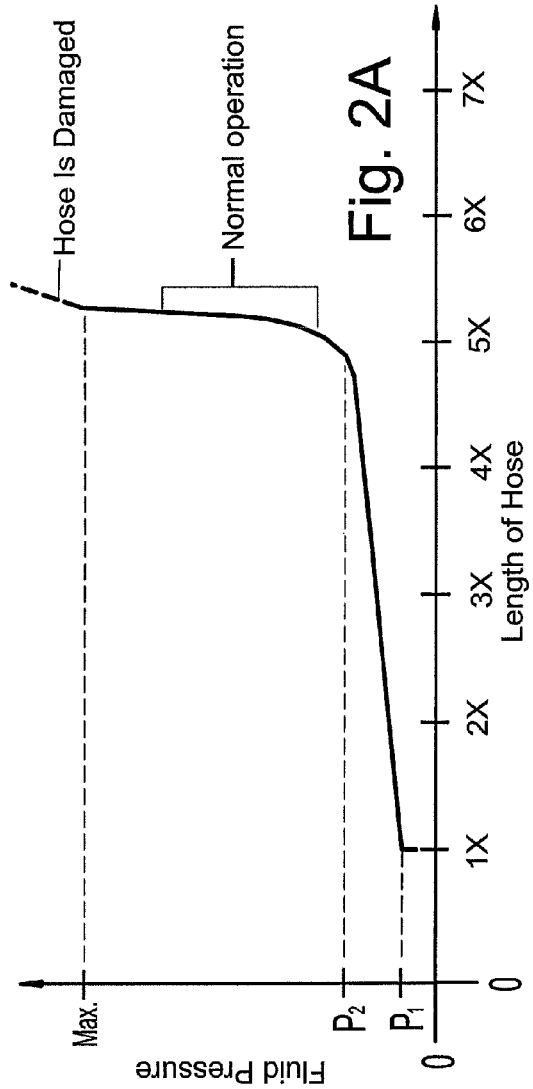
Fig. 2A
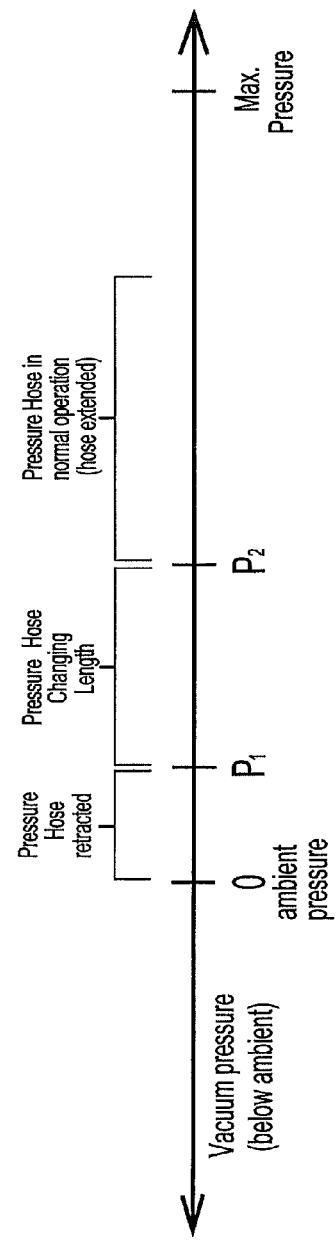
Fig. 2B – Longitudinal Force Due to Fluid Pressure

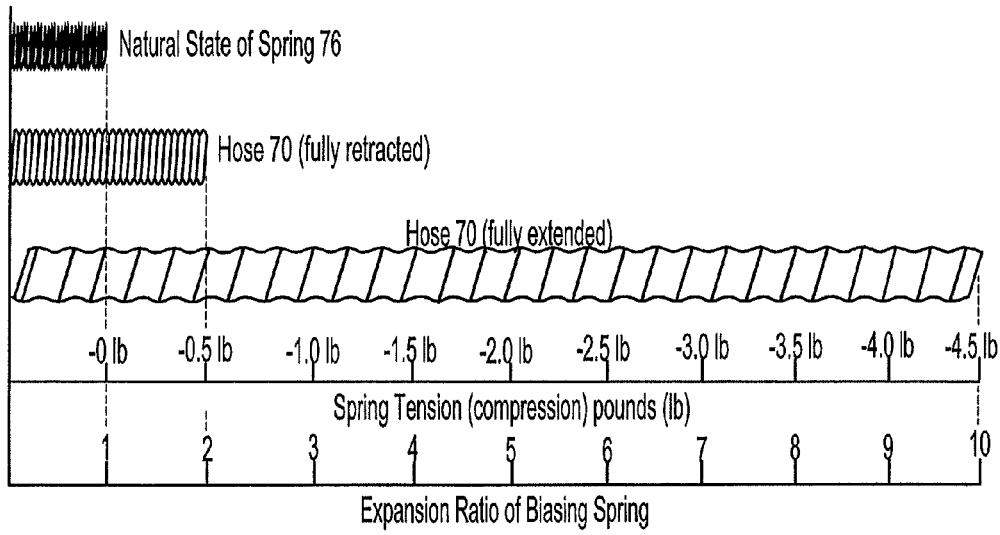
Fig. 3A - Spring-Bias Effects on Pressure Hose
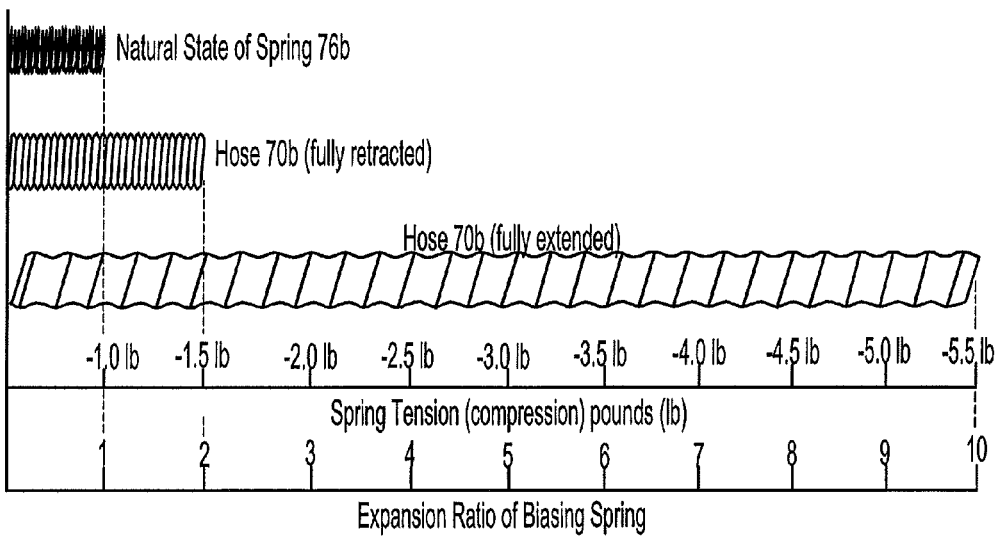
Fig. 3B - Spring-Bias Effects on Pressure Hose

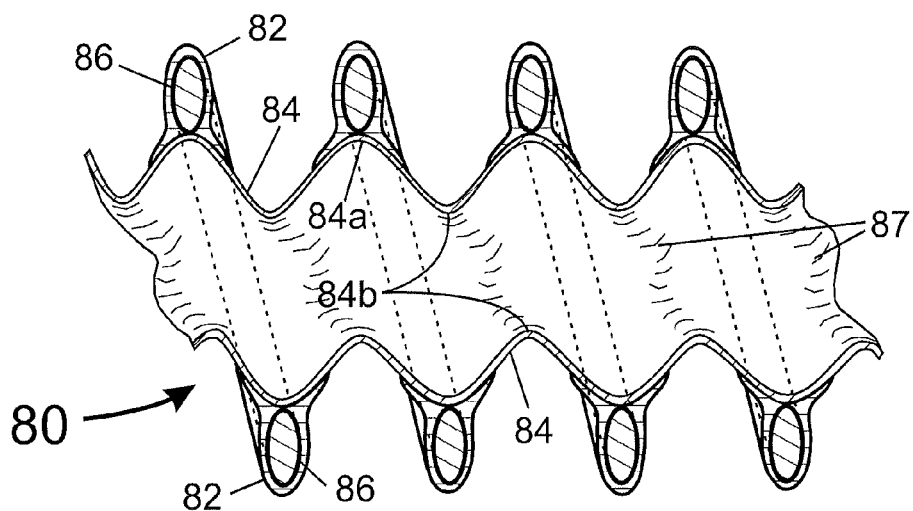
Fig. 5A
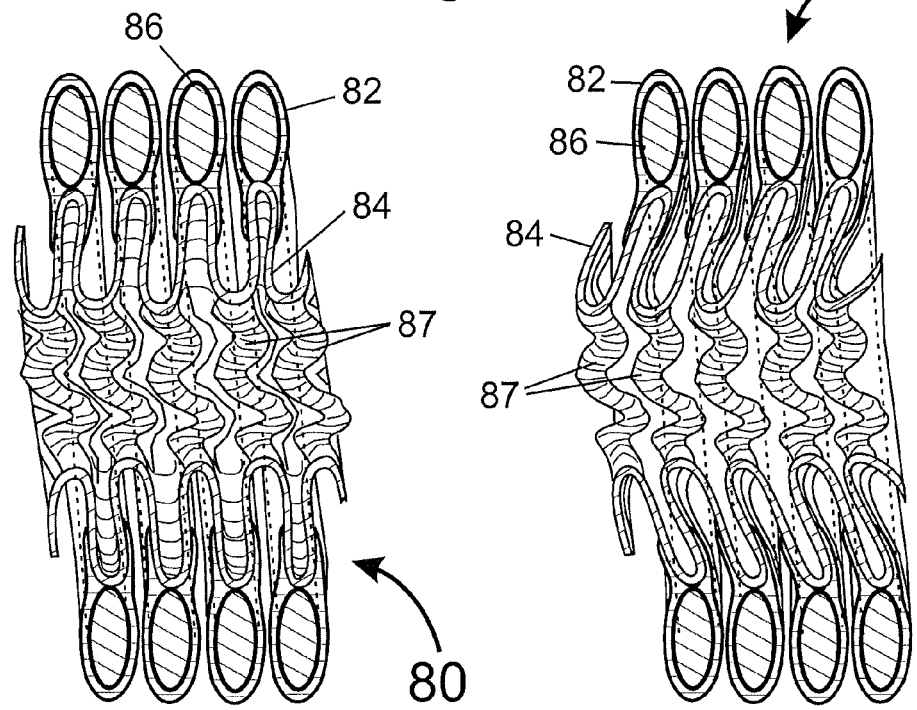
Fig. 5B
Fig. 5C

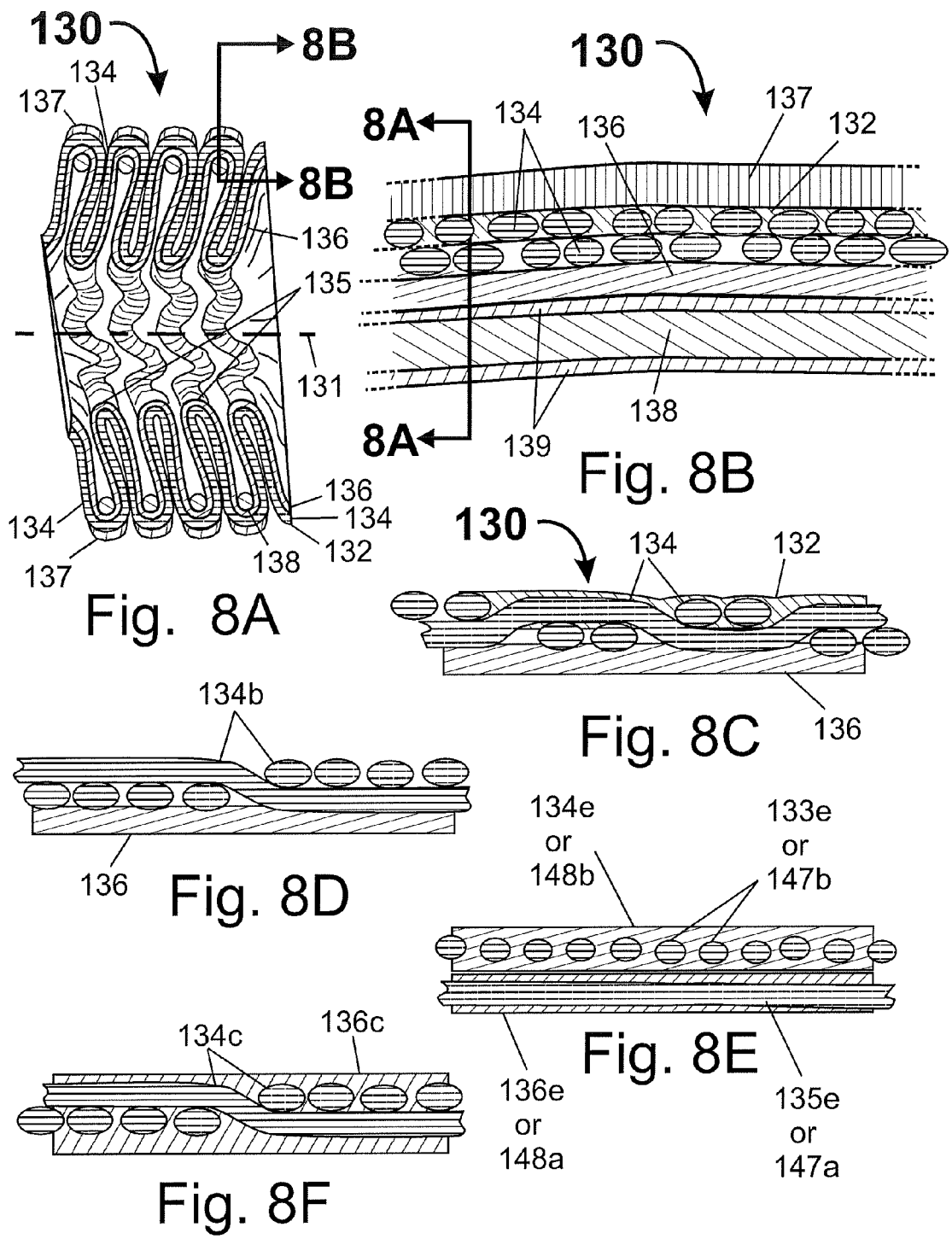

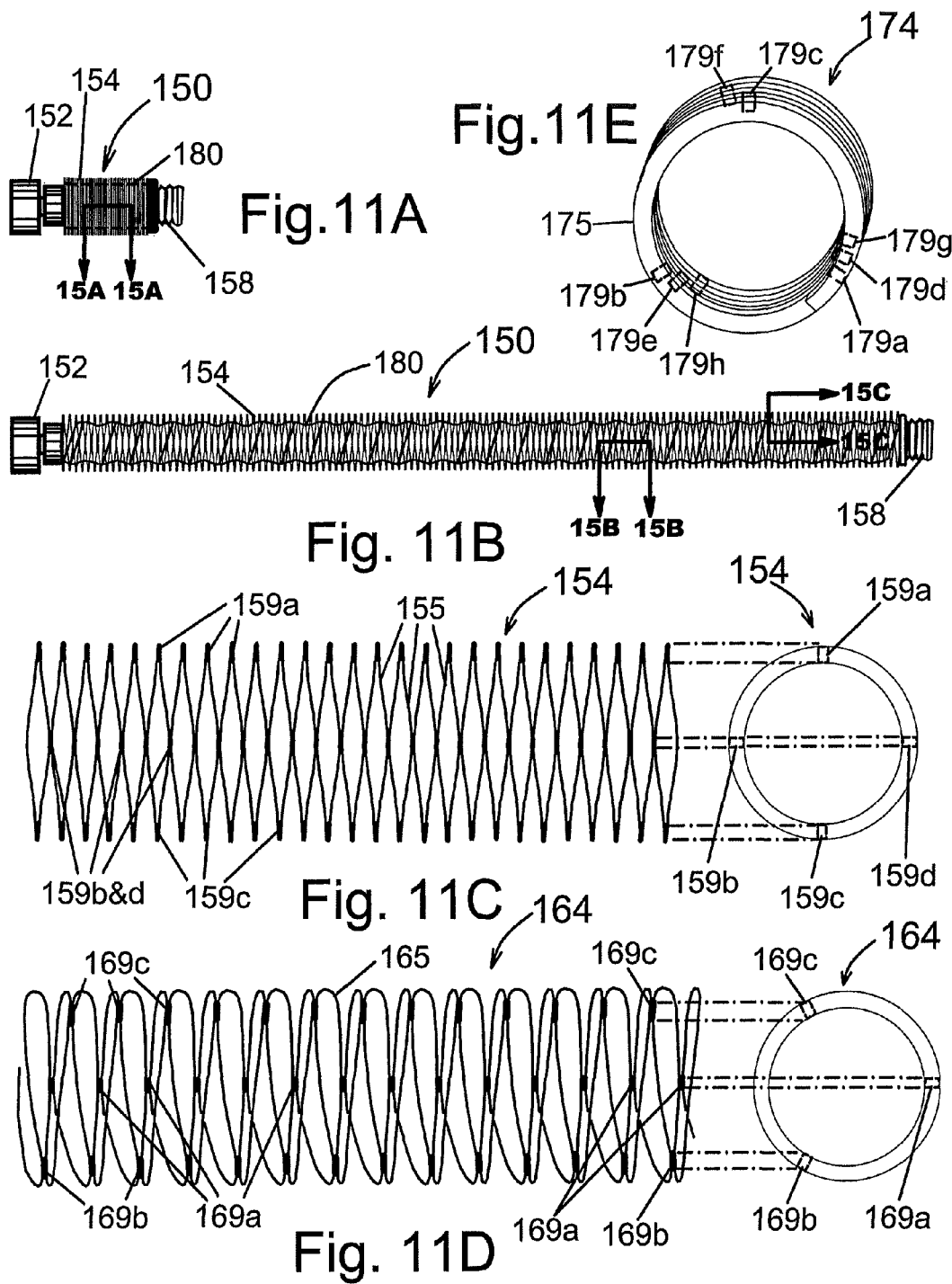

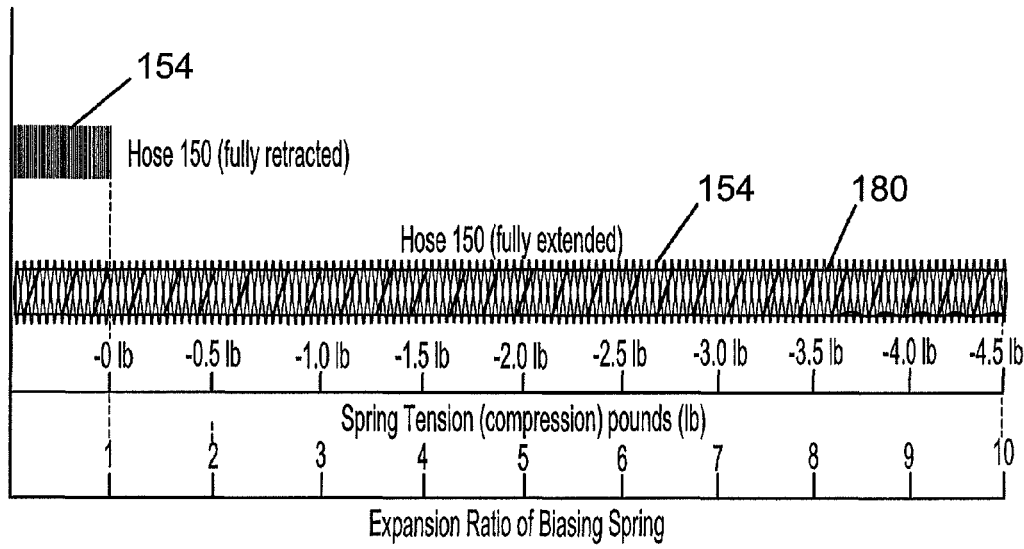
Fig. 12A – Spring-Bias Effects on Pressure Hose
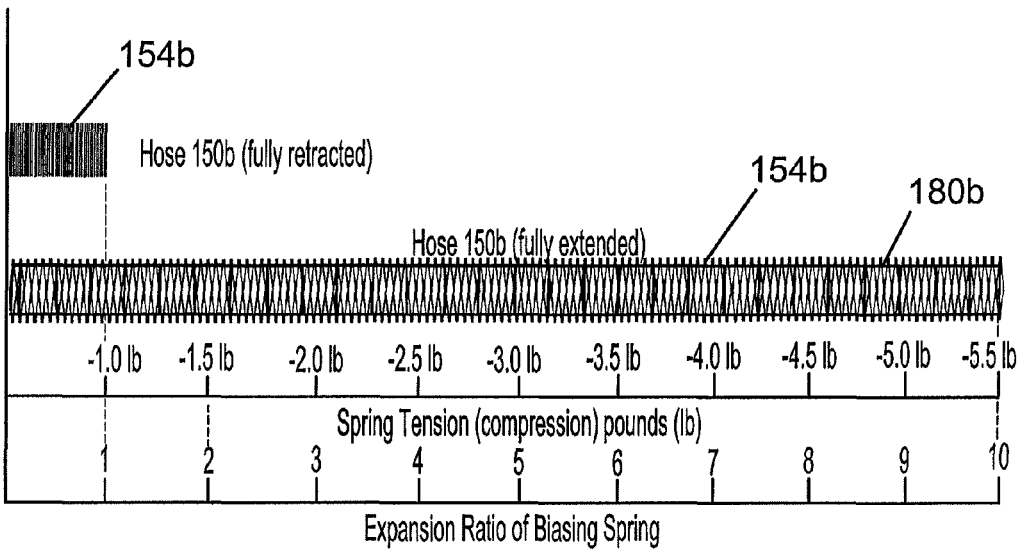
Fig. 12B – Spring-Bias Effects on Pressure Hose

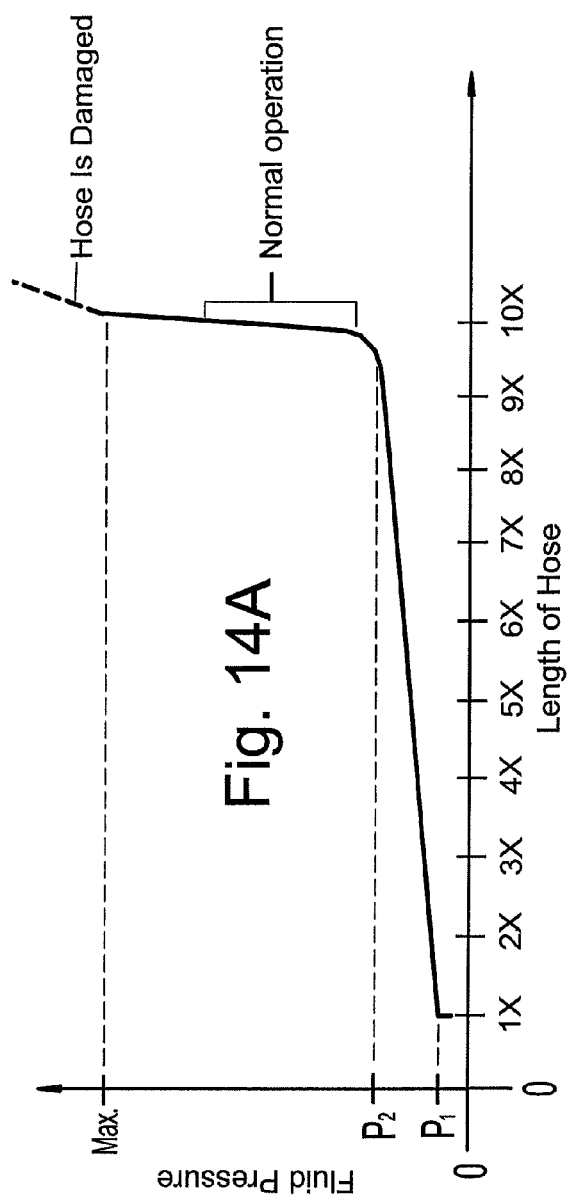
Fig. 14A
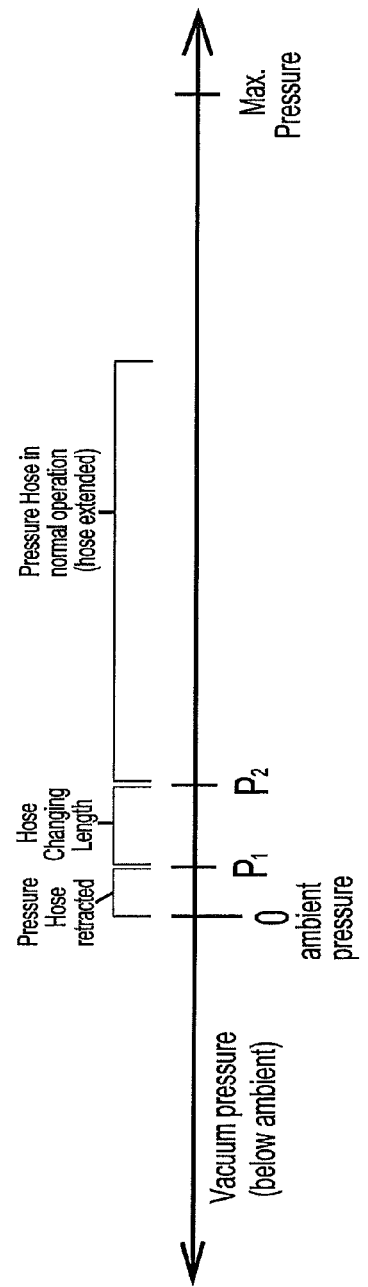
Fig. 14B - Longitudinal Force Due to Fluid Pressure

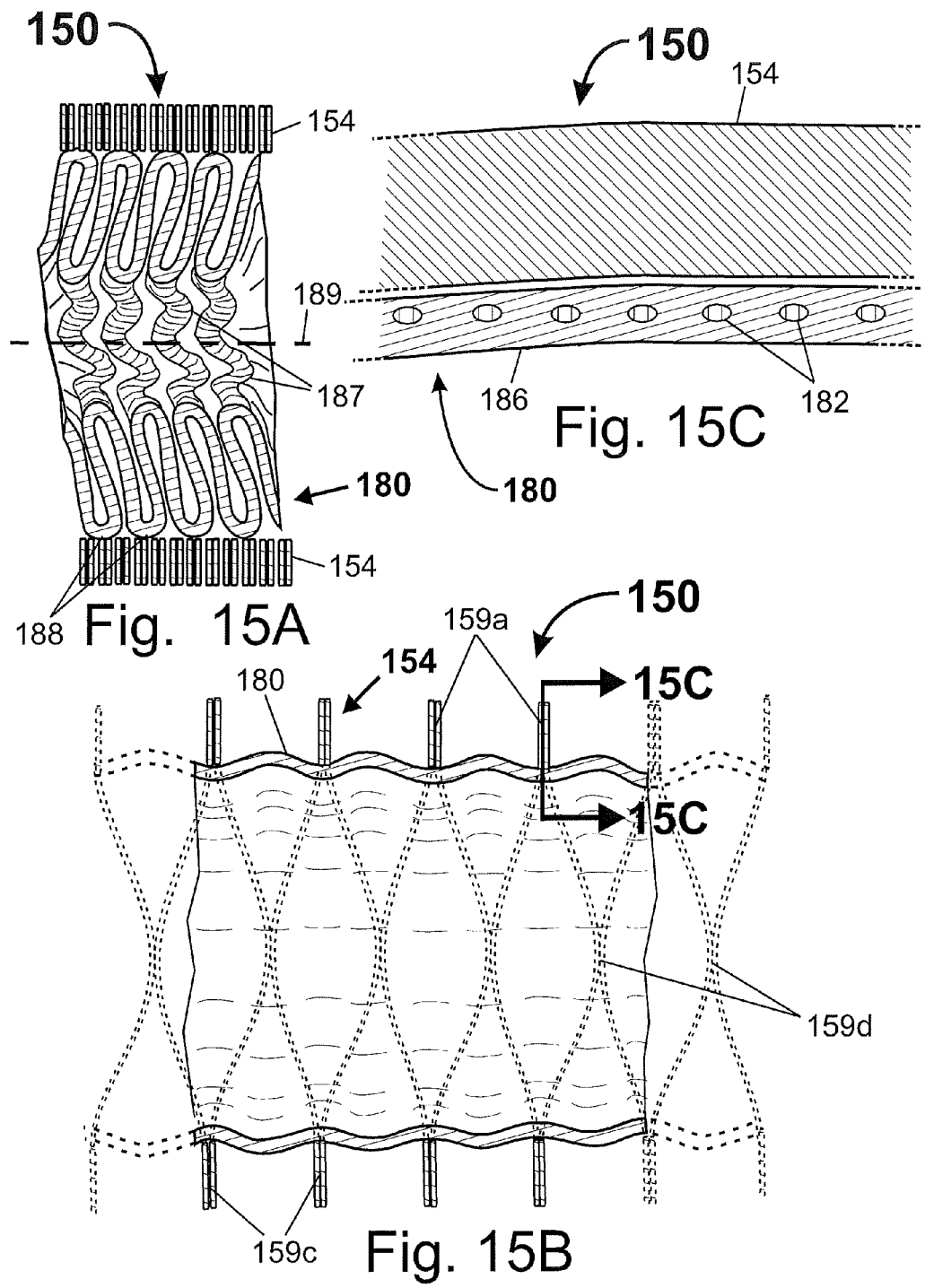

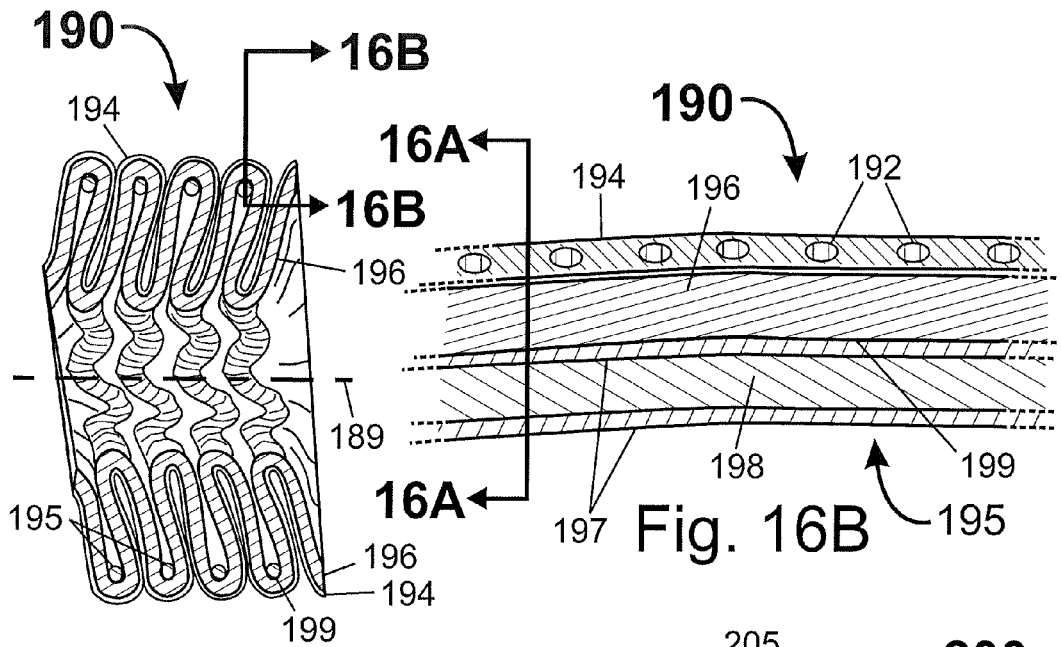
Fig. 16A
Fig. 16B
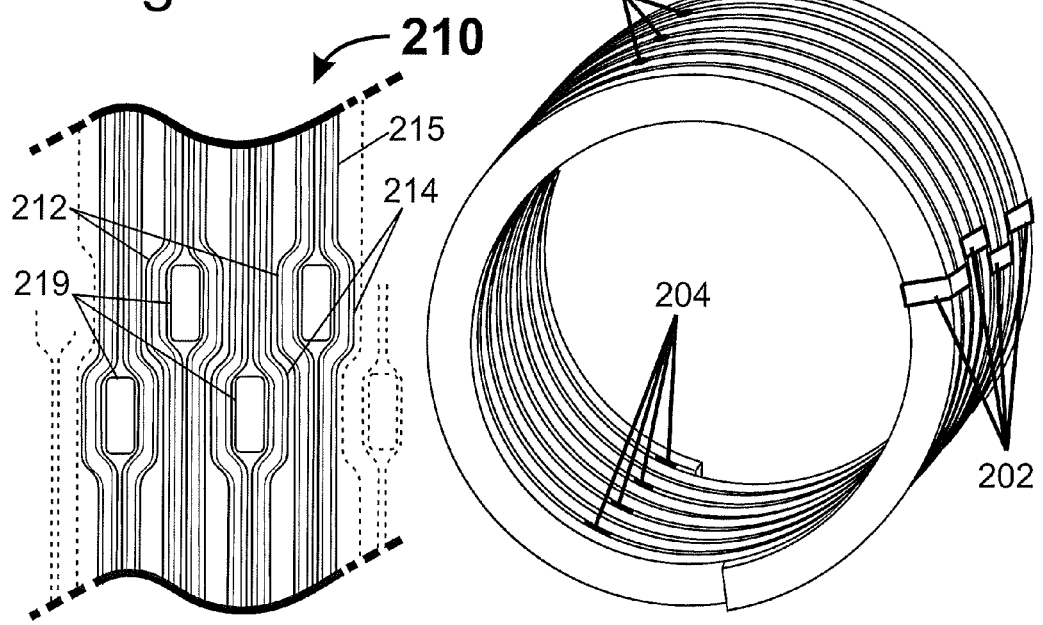
Fig. 16D
Fig. 16C

LINEARLY RETRACTABLE PRESSURE HOSE STRUCTURE

CROSS-REFERENCE TO RELATED APPLICATIONS

The present application is a continuation of U.S. application Ser. No. 11/343,602, filed Jan. 30, 2006, which is:
1) a continuation in part of U.S. application Ser. No. 11/234,944, filed Sep. 26, 2005, which is a division of U.S. application Ser. No. 10/303,941, filed Nov. 25, 2002, which is a non-provisional of U.S. Provisional Application Ser. No. 60/335,497, filed Nov. 24, 2001;
2) a non-provisional of U.S. Provisional Application Ser. No. 60/648,638, filed Jan. 29, 2005;
3) a non-provisional of U.S. Provisional Application Ser. No. 60/739,323, filed Nov. 23, 2005;
of which applications, application Ser. No. 11/343,602 and provisional applications 60/648,638 and 60/739,323 are hereby incorporated by reference in their entirety, including any figures, tables, equations or drawings.

FIELD

The field of this invention relates to hoses for carrying fluid materials (i.e. gas, liquid, solid particle mixes) and more specifically to hoses having a retractable and extendable means built into the hose itself.

BACKGROUND

The linearly retractable and extendible pressure hose was developed by Gary Ragner in 2001 and formally applied for in Utility application Ser. No. 10/303,941 filed Nov. 25, 2002, and Divisional application Ser. No. 11/234,944 filed Sep. 26, 2005. This prior art by the Applicant shows a linearly retractable and extendible hose structure that extends longitudinally along its length to provide approximately a five-to-one expanded-to-retracted ratio of both its length and its interior volume. This prior art designs by Ragner uses a hose body (see layers 32 and 34 in FIGS. 1A and 1B) that bulged outward between the coils of a biasing spring 36 in both its extended and retracted positions (see FIGS. 1A and 1B, respectfully). The disclosed improvements of the "linearly retractable and extendible pressure hose" comprise eliminating the bulging surface portion 37, and instead indenting that surface portion of the hose between the coils of spring 36. This places hose body (comprising layers 32 and 34), substantially within the biasing spring's volume (see FIGS. 4A-B, 5A-C, 6A-C and 7A-C). While the bulging outward of the hose body (layers 32 and 34), intuitively seems to be the best way to transfer interior hose pressure to the biasing spring, this arrangement causes three main problems that the new designs solve. The first problem is that the bulging hose body (convex between spring coils) is susceptible to wear and abrasion, and because of the very flexible nature of the hose, the hose body must be very thin and flexible. Thus, only a small amount of wear can cause such a hose to fail. The herein disclosed linearly retractable hose design indents the hose body substantially within the biasing spring's coils. This indenting of the hose body can help protect the hose body from abrasive surfaces because the biasing spring can make contact with these abrasive surfaces before the softer and more easily damaged hose body. With this type of hose design in its retracted position, the hose body is substantially protected form abrasive surfaces by the biasing spring (see FIGS. 4A through 7D). The exterior edge of the spring coils can make contact first with a flat abrasive surface to provide the very good wear protection. The spring's coils can be made of spring steel or other resilient material, which can be extremely abrasion resistant. Second, the strength needed for the hose body material under pressure is mathematically proportional to the diameter (and radius) of the hose material. Thus, the bulges require a proportionally stronger hose material than one that does not bulge out between the coils (note that this is somewhat offset by the support provided by the spring coils). By indenting the hose body intermediate between the coils, the effective radius at the center of the indentation can be significantly reduced (see FIGS. 4B, 5A, 6B-C and 7A-B), so that the physical strength of the hose body can be less than for the prior art design seen in FIG. 1A (for the same diameter cross-section biasing spring). Third, by indenting the hose body between the spring's coils, and having the hose body fold inside the spring when retracted, the overall volume of the linearly retractable pressure hose is significantly reduced in its retracted position compared to prior art linearly retractable pressure hose designs which fold the hose body outside the spring's coils.

The disclosed linearly retractable hose designs solves these problems as a direct result of having the hose body material indented between the spring's coils (see FIGS. 3A through 10C) or entirely within a tension wave-spring (see FIGS. 11A through 16C). For indented hose body designs, the flexible hose body is indented between the spring coils, and generally stay inside the outside diameter of the helical spring, both when extended and when retracted. However, as the hose ages it may bow outward under full pressure, but should still be designed to retract radially back inside the outside diameter (diameter defined by a specific radius from the central longitudinal axis of the hose) of the biasing spring when internal pressure is reduced. This way the hose body does not get in the way between the coils of the spring, is substantially protected from abrasion, and the overall size of the hose is substantially reduced compared to prior art designs. For hybrid tension wave-spring designs (see FIGS. 11A-12B, 15A-C, and 16C-D), the hose body is placed entirely within the tension wave-spring structure (also referred to as, hybrid tension wave-spring, hybrid wave-spring, and hybrid spring herein) with little or no bonding between the hose body 180 and tension biased wave-spring 154 along the length of hose 150 (see FIG. 11A). For hose 150, both hose body 180 and wave-spring 154 are only connected together at their ends where inlet connector 152 (faucet connector) and outlet connector 158 each connect to both the hose body and the wave-spring.

In the seventh presently disclosed "linearly retractable pressure hose" design, where the spring biasing is provided by a tension wave-spring (or hybrid wave-spring) the spring structure: 1) provides radial supports for the hose body and 2) completely surrounds the hose body providing physical protection. The interior hose body provides very little radial support and is contained radially by the biasing spring's circumferential strength. For wave-springs this strength comes from tension in the spring windings which are bonded together. Physical protection is provided by the wave-spring by providing only small openings between coil turns. This tight spacing protects the hose body from eternal damage, and allows the hose body to be made of very thin and flexible materials to provide very large extension ratios of 10-to-1 or more.

In FIG. 1A we see a prior art Linearly Extendable and Retractable Pressure Hose 30 shown in section view, cut longitudinally down its central longitudinal axis. Hose 30 is specifically designed to be a pressure hose. A biasing means (helical spring 36) is incorporated to bias the hose toward its retracted position. Biasing spring 36 can be a simple helical spring that extends along the full length of the hose. Spring 36 may be integrated with hose 30 in a number of different ways, such as, molded completely within hose 30 as shown in FIGS. 1A and 1B, or may be internal or external to hose 30. For designs with such internal or external biasing mean, the biasing means can be attached at the ends of hose 30. For the disclosed pressure hose, the hose body must be securely attached to the biasing means to provide the proper control over folding of the hose body within the biasing means (helical spring). In FIG. 1A, helix spring 36 is shown encapsulated between hose cover material 32 on the outside and hose cover material 34 on the inside, which provides a flexible elongated hose body for the hose. This cover material can be molded onto spring 36 or wound on with interlocking strips, as is common practice in present day hose manufacturing. Vinyls and other polymers may be used for cover materials 32 and 34 to make them thin, but also strong and durable and easy to bond to one another. Cover materials 32 and 34 is bowed outward between the spring coils as it is molded around the spring coil. This gives the cover material for the prior art design room to move out of the way when the hose retracts and spring coils 36 are forced close together (see FIG. 1B). Preferably, the spring would continue this retracting force, even when the hose is in its fully compressed (retracted) state. Bias spring 36, thus, can be a coiled spring that is biased to provide a retracting force even when fully retracted. From this naturally retracted state, the spring is stretched as the hose cover materials 32 and 34 are placed over it. Then, when the hose is released, hose 30 would take on its naturally retracted state. The spring can continue to exert a significant retracting force even with the hose is in its fully extended position (see FIG. 3B).

FIG. 1A shows prior art hose 30 in its substantially extended state. Cover material 34 (layer 34) provides most of the pressure support and may have a mesh of fibers within a more flexible material to help withstand higher pressures. Cover material 32 can be molded on top of spring coils 36 (compression biased spring) and cover material 34 to hold the entire system together. Because this is a pressure hose, materials 32 and 34 protrude (or bow) outward in between the coils of spring 36. This slight outward bow assists the hose in keeping the cover material from getting trapped between the adjacent coils of bias spring 36. Notice that the outward extending of cover materials 32 and 34 significantly increase the volume of the hose in both its retracted and extended positions compared to the cylindrical volume of spring 36 in its retracted and extended positions of the same length, respectfully. The disclosed invention removes this additional volume problem by indenting and folding the hose body material inside the helical biasing spring.

FIG. 1B shows hose 30 only partially retracted with further contraction possible as cover material 34 is compressed and makes contact with itself on the inside the hose. Ideally, the biasing spring would continue to contract the hose until cover material 34 is stopped by contact with itself. This means that the cover material needs to be flexible to allow easy stretching and contracting. Cover material 34 mounted on the inside of the spring coil providing most of the pressure holding ability of the hose. Spring 36 acts as a support structure for hose cover material 34 to keep it from expanding radially too far. Cover material 32 basically provides a water proof cover for the spring and also helps hold cover 34 in place on the spring coils. Cover materials 32 and 34 must be relatively strong in the plane of the material to resist the pressure forces created by a pressurized fluid flowing within it. This strength also means that the hose body will not be easily stretched longitudinally or around its circumference (hoop strain). In other words, cover materials 32 and 34 can be folded, but are not easily be stretched. Thus, cover materials 32 and 34 in prior art hose 30 need to be bowed out to allow space for the materials to fold out of the way of adjacent cover material and from between spring coils 36. Notice that the cover material may fold under itself to allow the spring to contract more fully (see FIG. 1B). If the bowing out of cover materials 32 and 34 is made too small, the hose body (cover materials 32 and 34) can get bunched up between the coils of the spring 36 and greatly reduce the amount of retraction possible for the hose. In the disclosed hose design, the hose body is folded inward from the spring coils (the opposite of prior art). This allows the cover materials to crumple into the space within the biasing spring. This reduces the volume of the hose when retracted and also protects the hose body from damage.

SUMMARY

The disclosed invention comprises an improvement for a "Linearly Retractable and Extendable Pressure Hose" as seen in Divisional application Ser. No. 11/234,944 filed Sep. 26, 2005 by Ragner. The Linearly Retractable Hoses disclosed herein is specifically for pressure hoses, where the pressure inside the hose is substantially greater-than the ambient pressure outside the hose. The disclosed Linearly Retractable Pressure Hose Structures can carry any fluid (liquid, gas, solid particles, or mixture of the three), but is discussed here mostly for use in the construction of a garden water hose. To describe the contraction and extension of the hose, the terms "retract linearly", "extend linearly", "linearly retractable" and "linearly extendible" are used in this document to describe the longitudinal retraction and longitudinal extension of the hose along its fluid-flow path. The term, "linearly" is used to differentiate the disclosed invention from prior art systems, which may also retract the length of the hose "longitudinally", but does not significantly change the hose's fluid-flow length. Thus, the terms "linearly" and "longitudinally" used in prior, does not necessarily describe flow-line length changes (fluid-flow path-length changes) in the hose ("linearly retractable or extendible), but instead describe length changes due to a shape-change of the hose (i.e. a spiraled shaped hose, retracting and extending like a spring). In this document, "linearly" will be used to describe changes in longitudinal hose length which includes the fluid-flow path length within the hose. Thus, a hose that "retracts linearly" is a hose that actually reduces the path-length of the fluid flowing through the hose, and also reduces its interior volume.

The disclosed Linearly Retractable Pressure Hose has two basic states: 1) an extended state where the hose may be used to dispense the fluid it is transporting and 2) a retraced state where the hose is substantially not being used and pressure within the hose is substantially near the ambient pressure. In both cases, the extending and retracting of the hose can be automatically controlled by adjusting the pressure (above ambient pressure) within the hose against a biasing means. This biasing allows the hose to utilize the internal pressure of the fluid within it to control its extending and retracting. The biasing means can comprise a helical spring, or other spring style, positioned on the exterior, and/or interior of the hose body along a substantial portion of the hose length. This biasing spring(s) tend to longitudinally (linearly) bias the hose against (in the opposite direction of) the internal pressure trying to extend the hose. In other words, the biasing means produces a retracting force linearly along the length of the hose, opposite the extending force created by the pressure differential between the interior and exterior of the hose.

Thus, the magnitudes of these two forces are opposed to one another. When the internal fluid pressure is increases above a first critical pressure ($P_1$) within the hose (either by increasing fluid flow rate and/or pressure, or by restricting fluid flow from the dispensing end of the hose), the extending pressure force can overcome the spring's biasing force and the hose tends to extend for use. Further increases in pressure cause the hose to reach its full extension at a second critical pressure ($P_2$). Similarly, when pressure is dropped below the second critical pressure ($P_2$), the spring biasing force can overcome the internal pressure force and the hose tends to retract, reaching its fully retracted length when the internal pressure drops below the first critical pressure ($P_1$).

The disclosed improvement to the "Linearly Retractable Pressure Hose", comprises two basic designs: 1) placing the hose body substantially within an exoskeleton biasing spring (wave-springs and hybrid wave-springs) and, 2) indenting the hose body substantially within the radius of the helical biasing spring (biasing means), where the hose body comprises a radial or helical indentation between each of the springs coils. This creates a helical shaped trench (or indentation) radially inward between adjacent spring coils (see FIGS. 3A through 10C). Similar indentations can be used on hose bodies placed within an exoskeleton spring (see FIGS. 11A-B, 13A-D, 15A, and 16A-B).

With the helical spring design with a generally cylindrical in shape (circular coils), one can consider a central longitudinal axis positioned at the center of the circular coils of the spring. The interior of the spring coils would generally be at a constant radius from this central longitudinal axis (or longitudinal axis). The hose body attached to the inside of the spring coils would also have an larger radius similar to the spring coils, while the indentation between the coils would have a substantially smaller radius from the longitudinal axis than the spring coils. This forms a double helix shape, where one helix is formed by the portion of the hose body attached to the spring coils, and second helix with a smaller radius formed by the bottom portion of the indentation between adjacent coils in the spring. For hybrid springs, the hose body is placed entirely with the hybrid spring.

This novel helical and radial indentation for linearly retractable pressure hoses provides three benefits over prior art linearly retractable pressure hose designs: 1) the hose body is substantially protected by the helical spring from abrasion and other damage. The spring can be made of a very abrasion resistant material such as spring steel, 2) the hose body is compacted within the center of the helical spring when retracted, thus significantly reducing the volume of the hose over other linear retractable pressure hose designs which compact the hose body on the outside of the helical spring, and 3) the resiliency of the hose body can be tailored so that when under pressure, the helical indented portion of the hose body can stretch radially outward due to fluid pressure and provide a smooth, nearly cylindrical, interior channel. Such a smooth cylindrical channel can have significantly less fluid-flow resistance and turbulence than a hose with a changing interior diameter or non-linear path for the interior channel.

Unlike previous linearly retractable hoses, the designs with hybrid tension wave-springs (also referred to as exoskeleton springs) do not need substantial bonding or attachment of the exoskeleton spring to the hose body within it. The hose body and exoskeleton spring need only be attached at the hose ends. The interior of the exoskeleton spring can simply provide a friction contact with the exterior of the flexible hose body. Small tabs or ridges on the hose body or the exoskeleton spring can be used if needed to hold the hose body and exoskeleton spring together and keep them from slipping longitudinally with respect to each other. This exoskeleton spring provides a number of advantages. First, the exoskeleton provides superior abrasion protection, and cut protection. The exterior of the exoskeleton's coils make contact with abrasive surfaces first and provide the abrasion protection of steel. The exoskeleton's coils can be made of spring steel or other resilient material, which can be extremely abrasion resistant, and difficult to cut. Second, the strength needed for the hose body material under pressure is supported by the exoskeleton. Because the exoskeleton has very small longitudinal gaps (preferably between 0.01 to 0.30 inches) the hose material is supported by the exoskeleton and only has small gaps to bulge through. Because the thickness of the hose material is comparable to the width of the gaps in the exoskeleton spring, there is little danger of the hose material rupturing between these gaps. Further, the longitudinal cords also provide strength against rupture. Third, the exoskeleton provides protection from puncture, because the depth of the exoskeleton cover is approximately the same as the gap widths, thus a very narrow and long pointed object is needed to get pass the exoskeleton to puncture the hose body.

This novel use of an exoskeleton spring for the disclosed linearly retractable pressure hoses provides five benefits over prior art linearly retractable pressure hose designs. (1) the hose body provides substantial external protection with the closely spaced spring coils of an exoskeleton spring 154. The small gaps between coils can protect the hose body from punctures and cuts. (2) The exoskeleton spring's coils provide extremely good abrasion protection, because the spring is made of steel it provides good wear protection even on abrasive surfaces. (3) The exoskeleton spring provides a support structure for the hose body to contain radial pressure within hose body 180. The flat spring's steel structure provides very high pressure strength and provides multiple support lines for the hose boy. (4) The exoskeleton spring allows extreme extended length-to-retracted length ratios (10-to-1 or greater). (5) Because of the closely spaced coils on an exoskeleton spring, the hose body can be made relatively thin and weak radially. This thin hose body allows the hose body to easily expand longitudinally and stretch from its helical or corrugated shape to a generally smooth cylindrical shaped interior. Thus a relatively smooth surface for the interior of the hose body is formed as pressure expands it against for hybrid spring support. The resulting cylindrical shape reduces hydrodynamic drag and allows the water to flow more easily through the hose. Such a smooth cylindrical channel can have significantly less fluid-flow resistance and turbulence than a hose with a changing interior diameter (corrugated hose body 180b) or non-linear path for the interior channel (helical hose body 180).

OBJECTIVES AND ADVANTAGES

Accordingly, several objects and advantages of the invention are:

To provide a hose that can retract linearly to a much smaller internal volume than previous linearly retractable pressure hoses (has greater ratio of extended to retracted length).

To provide a hose that compresses the hose body inside its biasing spring when retracted to provide a much smaller volume than previous linearly retractable pressure hoses.

To provide a hose body made substantially of a thin fiber-reinforced fabric material and made to be waterproof.

To provide a more durable thin wall hose body by positioning the hose body entirely within a helical spring, so that when pressurized the hose body maintains a radius significantly smaller than the outside radius of the helical spring (diameter of hose body significantly smaller than the outside diameter of the helical spring). Thus, the coils of the helical spring act to provide protection from abrasion and punctures to the hose body.

To provide a thin wall hose body that includes a helical indentation that can expand under fluid pressure to provide a nearly cylindrical shaped interior channel for fluid transport.

To provide automatic extension force on a hose when the pressure differential between the exterior and interior of the hose is above a predetermined pressure.

To provide a thin wall hose body that is molded over the biasing spring and indented between the spring's coils.

To provide a woven cover tightly fitted over a thin wall hose body that has been molded over a helical spring and indented between the spring's coils.

To provide a pressure hose that provides a longitudinal retracting force when fluid pressure is shut off.

To provide spring biasing means on the exterior of the hose to protect the hose body from wear.

To provide a wave spring biasing means on the exterior of the hose to protect the hose body from wear and to increase the extension ratio of the linearly retractable pressure hose.

To provide a hose that places the hose body completely inside a hybrid biasing spring.

To provide a hose that provides retractable and extendable forces by varying the water pressure within it.

To provide a hose body substantially of a thin fiber-reinforced fabric material and made to be waterproof.

To provide a hose body that relies on the physical support of the hybrid spring exoskeleton to provide radial pressure strength.

To provide a more durable thin wall hose body by positioning the hose body entirely within a hybrid spring, so that when pressurized the hose body maintains a diameter significantly smaller than the outside radius of the hybrid spring (diameter of hose body cannot expand significantly beyond the outside diameter of the hybrid spring). Thus, the coils of the hybrid spring act to provide protection from abrasion and punctures to the hose body.

To provide a thin wall hose body that can expand under fluid pressure to provide a substantially smooth cylindrical shaped interior channel for fluid transport.

To provide automatic linear (longitudinal) retracting force on a hose when the pressure differential between the exterior and interior of the hose is near zero (pre-biasing spring).

To provide an exoskeleton spring (hybrid spring) for a hose body with smaller longitudinal gaps between coil turns than standard helical coil springs of the same external size and retracting force (spring constant).

To provide a tension spring with a helical retracted shape, and adjacent coils bonded at specific intervals around the spring for increasing the spring's spring constant.

To provide a hybrid spring comprising a wire mesh structure composed of bonded rings to form a closed cell structure.

To provide a hybrid spring comprising a wire mesh structure composed of a helical coil bonded to itself in such a way to provide a closed cell structure.

To provide a hybrid spring comprising wire substantially thinner longitudinally than previous spring design of the same overall size and spring constant.

To provide a pressure hose that forcefully retracts itself when fluid pressure is shut-off.

A linearly retractable hose with a woven outer layer that has an effective diameter considerably smaller than the hose's biasing spring, whereby pressurization of the hose causes the woven layer to straighten and resist expansion of the hose and even cause it to contract radially to a smaller diameter as the hose is pressurized.

BRIEF DESCRIPTION OF THE DRAWINGS

FIG. 1A Prior Art—Linearly Retractable Pressure Hose (extended).

FIG. 1B Prior Art—Linearly Retractable Pressure Hose (retracted).

FIG. 2A Graph of hose length vs. fluid pressure of a Linearly Retractable Pressure Hose.

FIG. 2B Diagram showing the different states of a Linearly Retractable Pressure Hose due to internal pressure.

FIG. 3A Diagram showing the biasing force on a Linearly Retractable Pressure hose.

FIG. 3B Diagram showing the biasing force on a Linearly Retractable Pressure hose with a pre-biased spring 76.

FIG. 5A Second embodiment of the improved Linearly Retractable Pressure Hose shown in section view partially retracted.

FIG. 5B-C Second embodiment of the improved Linearly Retractable Pressure Hose shown in section fully retracted.

FIG. 8A Seventh embodiment in section view from side in its retracted position.

FIG. 8B Seventh embodiment in close-up section view from front, (see section cut 8B-8B seen in FIG. 8A.

FIG. 8C-F Alternate arrangements of the hose body layers for the seventh embodiment, FIG. 8E in section view from the side as in FIG. 8A.

FIG. 11A-B Tenth preferred embodiment of exoskeleton hose 150 in side-views of its retracted position in FIG. 11A and extended position in FIG. 11B.

FIG. 11C Side-view of tension wave-spring 154 (extended) comprised of multiple rings bonded together.

FIG. 11D Side-view of tension wave-spring 164 (extended) comprising a single helical coil with adjacent coils bonded together at specific points around the coil.

FIG. 11E Perspective view of tension wave-spring 174 (retracted) similar to hybrid spring 164, except adjacent coils are bonded together at slightly offset points around the coils.

FIG. 12A Diagram showing the biasing force on a Linearly Retractable Pressure hose.

FIG. 12B Diagram showing the biasing force on a Linearly Retractable Pressure hose with a hybrid spring 154b.

FIG. 14A Graph of hose length vs. fluid pressure of a Linearly Retractable Pressure Hose.

FIG. 14B Diagram showing the different states of a Linearly Retractable Pressure Hose due to internal pressure.

FIG. 15A Section view of Linearly Retractable Pressure Hose 150 sectioned along its longitudinal axis as noted in FIG. 11A. Hose 150 shown substantially in a Retracted Position.

FIG. 15B Section view of Linearly Retractable Pressure Hose 150 sectioned along its longitudinal axis as noted in FIG. 11B. Hose 150 shown substantially in an Extended Position.

FIG. 15C Section view of Linearly Retractable Pressure Hose 150 sectioned transversely along the hose as noted in FIG. 15A.

FIG. 16A Section view of alternative hose body 190 sectioned along it longitudinal axis, comprising a multiple layer hose body construction formed over a support wire 195 for facilitating manufacture.

FIG. 16B Section view of a linearly retractable pressure hose with an alternative hose body 190 shown in section view as noted in FIG. 16A.

FIG. 16C Section view of alternative tension wave-spring 200 (hybrid wave-spring or exoskeleton spring), showing three different coil bonding means for construction of the hybrid wave-spring from a standard flat spring.

FIG. 16D Side-view of alternative tension wave-spring 210 (hybrid wave-spring or exoskeleton spring), showing a modified helical spring coil 215 with adhesive bonds 219 within molded indentations between coils of the spring.

DETAILED DESCRIPTION

Figures 4A, 4B, 4C, 4D, 4E:
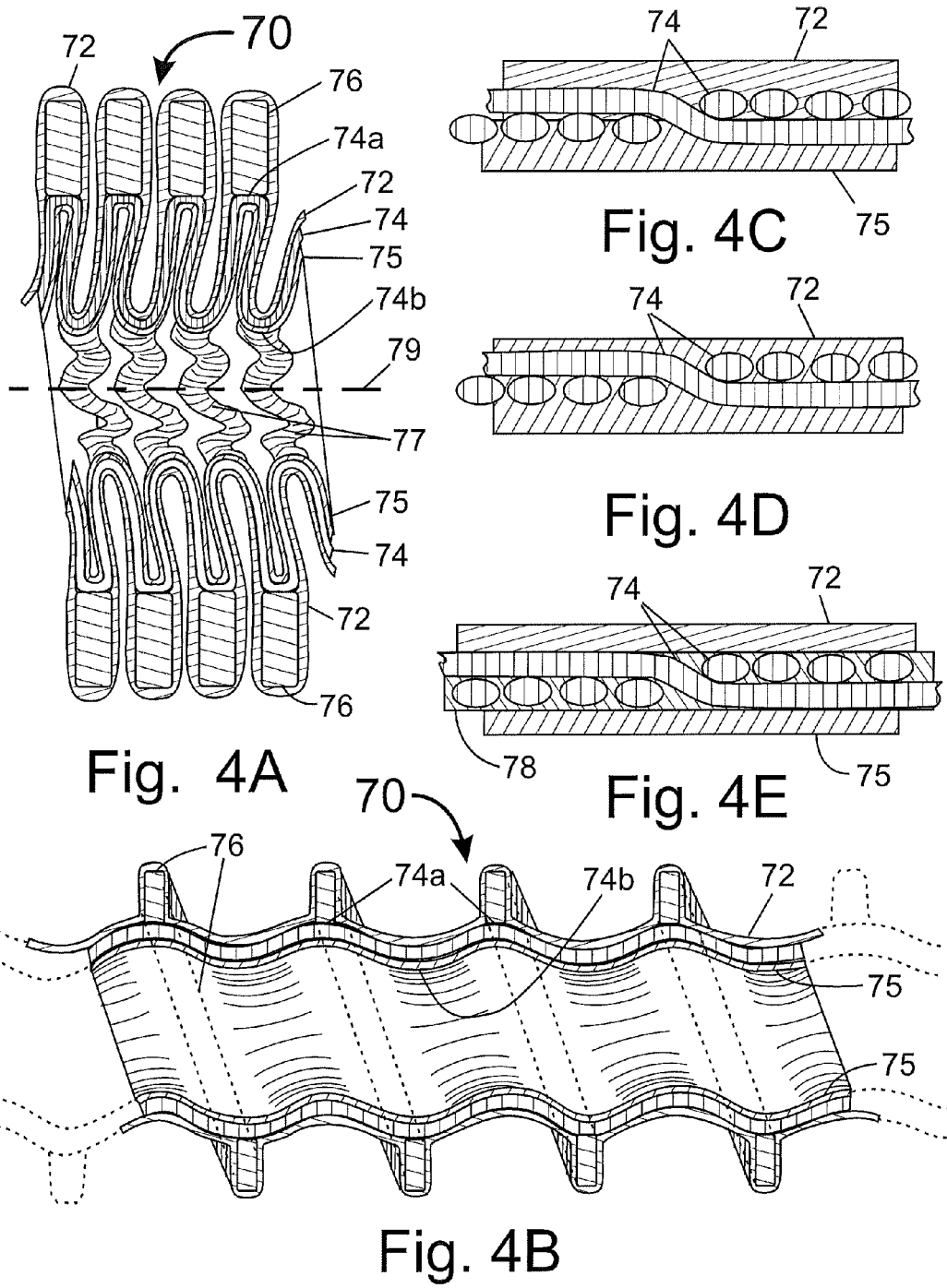
FIG. 4A-B First preferred embodiment of the improved Linearly Retractable Pressure Hose in section view.
FIG. 4C-E Section view of alternate designs for hose body of a linearly retractable hose.

In this document the Linearly Retractable and Extendible pressure hose will be often referred to as "retractable garden hose", but at times may be referred to as "linearly retractable hose", "retractable hose", "garden hose", "water hose", "hose", etc. Many methods already exist for constructing helical hoses, for both vacuum hoses and pressure hoses. The hoses disclosed here can be constructed in a similar manner, with long strips of material fed into a laminating machine to bond all the parts of the hose together along with the biasing spring. Spray coatings for the interior and/or exterior of the hose can also be applied after the main portion of the hose has been bonded together. A few specific methods of manufacturing the disclosed hoses will be discussed later in this document.

Spring Bias and Pressure Relationship—FIGS. 2A, 2B, 3A and 3B

In FIG. 2A we see a graph relating the length of a typical linearly retractable pressure hose, to the fluid pressure within the hose. These relationships are essentially the same as for prior art linearly retractable hoses, however, the novel feature of indenting the hose body between the spring coils may allow it to attain a greater retraction/expansion ratio than previous designs. At pressures below $P_1$, the retractable hose is substantially fully retracted with a length denoted by 1× in the graph to designate a unit length of hose. As pressure increases above $P_1$ the hose begins to expand longitudinally (linearly) as the force created by the water pressure overcomes the retracting force generated by the spring biasing. As the fluid pressure within the hose continues to increase the hose continues to expand, and at a pressure $P_2$ reaches substantially its full length of 5×. The graph in FIG. 2A shows a straight line relationship between hose length and fluid pressure during the transition between pressures $P_2$ and $P_2$. This is because of the linear relationship between spring tension and length of stretch. In reality, the hose body will effect this expansion slightly, making the change in length slightly curved, especially near pressure $P_2$ as the hose becomes taught. At pressure $P_2$ the hose body material has substantially stopped its longitudinal expansion, and the hose body has stopped its radial expansion due to the radial strength of the hose body. As fluid pressure increases above $P_2$ the hose body can stretch slightly in both the radial and longitudinal directions, but fiber reinforcing prevents much stretch beyond the designed value. The hose body may be designed to have a tailored resiliency in the radial direction so that the hose can stretch radially at the indentation in the hose body as pressure increases. This straightens the sidewalls of the hose to form a nearly perfect cylindrical shape. As this happens the hose tends to expand linearly slightly because the hose body is straightening out in the longitudinal direction and is no longer significantly concave (indentation nearly gone). This stretch effect can be seen in the graph (see FIG. 2A) as the slight increase in the hose length as pressure increases well above pressure $P_2$ in the Normal Operation pressure range. As pressure continues to increase, eventually the hose's maximum pressure is reached, and there is a danger that the hose will be damaged.

FIG. 2B shows the same information as FIG. 2A, in a linear graph of the different pressure states for a typical linearly retractable pressure hose. For this discussion, the term "longitudinal biasing force", "biasing means" or simply "biasing force" is defined to include both the spring bias and any biasing caused by the flexible cover material (hose body) that actually makes up the hose. In most designs, the biasing caused by the flexible cover material is small compared to the biasing caused by the spring. However, in some designs, for special purposes, the cover material may represent a significant portion of the biasing force. In fact, if desired, the hose may obtain substantially all its biasing force from the cover material, and not need a separate metal or composite spring at all.

In FIG. 2B, when the interior pressure and exterior pressure of the hose are the same (zero gauge pressure), the hose is in what is called its "natural state", where the spring bias determines whether the hose is extended or retracted. This zero gauge pressure is signified by "0 ambient pressure" on the graph. Pressures to the left of "0" are vacuum pressure (pressure less-than ambient) and pressures to the right of "0" have positive pressure (pressure greater-than ambient). In general, a pressure hose will only experience pressure values to the right of "0" and vacuum hoses will only experience pressures to the left of "0". However, in some applications, pressure fluctuations may extend outside this range for each type of hose. At "0" gauge pressure, a linearly retractable pressure hose is fully retracted due to its biasing spring. The pressure hose remains retracted until pressure within the hose increases to gauge pressure $P_1$. At a pressure of $P_1$, the pressure hose is still fully retracted (net longitudinal force is zero, but the force exerted by the bias spring now exactly cancels the hydraulic force exerted by the internal pressure $P_1$. As the hose gauge pressure increases from $P_1$ to $P_2$, the pressure hose extends and reaches its full length at a pressure of $P_2$. Again, if fluid is flowing through the hose, fluid friction against the walls of the hose can result in significant differences in pressure at different sections of the hose. At the pressure of $P_2$ at the dispensing end of the hose, the biasing spring force matches the hydraulic pressure force (net longitudinal force equals zero), but the hose is now fully extended. Above pressure $P_2$ (net longitudinal force positive–tending to extend hose) the pressure hose remains fully extended and cannot extend significantly further because it is restrained by the hose cover material (hose body) itself. Thus, the hose maintains substantially its fully extended length between pressure $P_2$ and up to its "Max. pressure" which is the maximum pressure the hose can withstand.

In FIG. 3A we see linearly retractable and extendible hose 70 from FIG. 4A-B in a graph showing the relationship between the spring tension and the expansion length of the pressure hose. The values shown in FIG. 3A are just for example and many other tension values can be obtained by proper selection and design of the biasing spring and hose cover material. At the top of the graph we see spring 76 in its uncompressed state ("natural state"), that is, no external forces exerted on it. In this example, the "natural state" spring 76 is with no tension in it (–0 lb). In FIG. 3A, below spring 76, we also see hose 70 in its fully retracted state (hose's natural state). Notice that hose 70, is considerably longer than spring 76 in its "natural state", this added length is due to two thicknesses of cover material 72 between each coil in spring 76, and interaction between layers 72, 74 and 75, which limits how far spring 76 can retract. The hose material layers 74 and 75 within the spring may be designed so they interfere very little with the retraction of hose 70. Thus, for this example, when spring 76 is molded into hose 70, the spring's length in the hose's fully retracted state, is approximately twice the spring's naturally length (see FIG. 3A-B). This causes a pre-tension bias in the spring which tries to retract (or compress) the hose longitudinally. Also, notice on the "Spring Tension" bar, that spring 76 provides one-half pound (–0.5 lb.) of retracting force (compression force) even when hose 70 is fully retracted. The negative sign signifies that the bias force is trying to compress the hose longitudinally. In FIG. 3A, below hose 70 in its fully retracted state, is hose 70 shown in its fully extended state. On the "Spring Tension" bar we see that four and one-half pounds (4.5 lb) of force is needed to overcome the spring tension within the hose when fully extended to five times (5×) its original length. Also notice that spring 76 in this extended position is ten times (10×) is original length. The fully extended spring tension force of four and one-half pounds (–4.5 lb) does not take into account any additional biasing forces that may be caused by the hose cover material (hose body). Notice that the force generated by the spring increases linearly, which is typical for simple helical springs. The "Length Expansion Ratio" bar shows the different expansion ratios for pressure hose 70, normalized to the natural retracted length of spring 76. From this graph, we see that four and one-half pounds (4.5 lb) of pressure force on the ends of hose 70 is needed to overcome spring bias (bias force) when fully extended to ten times the springs natural length (five times the hoses natural length). These forces are relatively easy to obtain with a typical household water faucet (water outlet) that usually has a working pressure between 40 and 80 pounds per square inch (psi). Thus, for a hose with close to a one-half square inch cross-section, only a small fraction of the actual water pressure may be needed to forcefully extend hose 70 and keep it fully extended while in use. A typical spray nozzle (or other watering attachment) will provide sufficient restriction in the water flow to provide sufficient internal pressure to extend the hose. For areas with low water pressure a lighter bias springs can be used and/or greater restriction to the flow of water can be used.

In FIG. 3B, a biasing spring 76b is used in hose 70b to provide a different biasing output from that seen in hose 70 with spring 76. In this example, spring 76b and hose 70b are substantially the same size, shape and construction as spring 76 and hose 70. Spring 76b however, includes a small pre-stress bias built into it. On the spring tension bar in FIG. 3B, notice that spring 76b has one pound of tension (–1.0 lb) in its natural state, while spring 76 had zero. This pre-stress allows spring 76b to provide a stronger retracting force when hose 70b is fully retracted than was possible for hose 70. Thus, hose 70b has a retracting force of one and one-half pounds (–1.5 lb) even when fully retracted. This is three times the retracting force for hose 70 when fully retracted. When fully extended, hose 70b has only one pound of additional spring tension than hose 70. Thus, the ratio of retracting force for hose 70 between its fully extended position and its fully retracted position is 9-to-1, while the retracting force ratio for hose 70b is less than 4-to-1. This means that hose 70b has a more constant retracting bias (force) and would retract more strongly than hose 70 especially as it nears its retracted position. The biasing spring may also be adjusted by other means, such as, using a different "spring constant (k)" for the spring, to provide the desired range of forces for a specific application.

Improved Hose Structure—(FIGS. 4A-E, 5A-C, 6A-C, and 7A-B)

In FIGS. 4A and 4B we see a section view of a first preferred embodiment of an improved linearly retractable hose 70. Hose 70 is designed for use as a garden water hose, but may be adapted for use with other fluid materials and applications requiring the transport of fluids form one location to another. Hose 70 can also be used with compressed air as the fluid material. FIG. 4A shows hose 70 in its retracted position, and FIG. 4B shows hose 70 in its extended position. For this design, hose 70 comprises a biasing spring 76, an outer layer 72, a support layer 74, and a sealing layer 75. Note that hose 70 is drawn with layers 72, 74 and 75 considerably thicker in cross-section than would normally be used in an actual linearly retractable hose. They are drawn with this thicker cross-section to allow the reader to more easily distinguish between the layers in the drawings.

Spring 76 is a helical spring which can be made of any number of spring materials, such as, composites, resilient plastics, resilient metals (spring steel, spring stainless steel, etc.), and others. For the purposes of this discussion we will be using a spring steel that is coated with an anti-rust coating, or made of a stainless steel alloy. Spring steel provides a strong biasing force and can be protected from the environment with outer coating material 72. A stainless spring steel may be used instead to insure the biasing means does not rust, but would be more expensive than the standard spring steel. The stainless steel spring has the advantage of not requiring a protective coating around it, thus reducing its longitudinal width compared to the plastic coated spring steel wire. Plastic polymers can also be used, but would generally provide significantly less biasing force than a metal bias spring on a per volume basis. In this particular hose design, spring 76 has a rectangular shape. This rectangular shape is used to provide a narrower longitudinal profile so that larger retraction/expansion ratios can be achieved for the same biasing force. The redial height of spring 76 can be increased even more than shown in FIGS. 4A and 4B to provide more spring biasing without increasing the longitudinal width of the spring coils. A wider spring coil would reduce the hose's expansion ratio (below the five-to-one expansion ratio shown in this example).

Outer layer 72 is applied over the outside of spring 76 and support layer 74. Layer 72 can comprise any number of polymer materials such as urethane, polypropylene, ABS, polycarbonate, etc. Layer 72 provides two main functions, firstly to hold layers 74 and 75 to spring 76, and secondly to provide protection for layers 74 and 75. Layer 72 can include an ultraviolet sunlight absorbing filler material, such as carbon black, graphite, or other UV radiation absorbing material to quickly absorb ultraviolet light so that it cannot penetrate and damage support layer 74 and sealing layer 75. Layer 72 can be applied in a number of ways, including being painted-on, sprayed-on, rolled on, etc. Layer 72 may alternatively comprise a wound strip of material, which after winding around the rest of the hose, is heated, molded and/or bonded to the other components of the hose.

Support layer 74 is bonded between layers 72 ad 75 and can provide the majority of the strength of the hose to resist fluid pressure. The stresses in the hose body due to internal fluid pressure are both longitudinal and radial. For a hose body with a substantially constant radius geometry, the hoop stresses in the hose layers are twice as great as the linear longitudinal stresses. Along with these ideal stresses, are stresses within the layers due to forces exerted by spring 76 and pre-stresses in the layers. For this example, layer 74 comprises a fiber reinforced material, such as, rip-stop nylon or other strong tear resistant material. Preferably, layer 74 would be woven to provide multi-axis strength. Because the hoop stress (tension in hose body around the circumference of the hose) is twice as great as the longitudinal stress (tension along the axis of the hose), stress can be aligned with the fibers if they are woven at sixty degrees from the longitudinal axis. In this way, the vector sum of the hoop and longitudinal stress points along the fibers to reduce shearing stress within support layer 74. Layer 74 may also be made of multiple layers, one layer wrapped on top of the other to provide more resiliency and/or strength. For this example, layer 74 provides the majority of the hose's strength to resist fluid pressure. However, nothing is preventing layers 72 and/or 75 from providing all or part of the hose's strength against internal pressure, or any combination of the three layers.

In manufacturing hose 70, support layer 74 can be woven together in the correct shape just prior to being bonded to the other layers and spring 76 coiled around it. Layer 74 can be woven and then bonded together with pressure, heat, and/or a binding material to lock the fibers together in the desired shape for the hose. This shape would comprise a raised helical portion having a outer radius 74a (major radius) with respect to the central longitudinal axis 79 of spring 76, and an indented helical portion 74b (minor radius) having a smaller radius with respect to the central longitudinal axis (see FIG. 4B). After bonding of the woven fibers, layer 74 would tend to hold its shape when pressurized from within. Layer 74 can be made very thin, having almost cloth like properties. Thus, even though layer 74 is quite strong and stiff in the plane of its surface, it is thin enough that it is very flexible outside this plane, and allowing it to fold and bend to match the space it is compressed into during retraction of the linearly retractable hose. Notice corrugated folds 77 on the hose body allow the hose body to compress to a smaller radius than the body normally has when pressurized. This allows a considerable amount of hose body to be folded within spring 76, allowing extended-to-retracted length ratios of five-to-one or more. Support layer 74 is positioned inside the interior radius of spring 76, with its helical raised portion 74a (major radius portion) mounted adjacent the interior radius of spring 76, and its helical indented portion 74b (minor radius portion) indented toward central axis 79 between adjacent coils of the spring.

Sealing layer 75 comprises a resilient polymer and covers the entire inner surface of the hose channel to prevent the fluid from escaping through the sides of the hose. Sealing layer 75 is not needed if support layer 74 can maintain a waterproof seal for the life of the hose. However, in most cases support layer 74 will need an additional sealing material bonded within the fiber layer itself or an additional sealing layer like layer 75 to provide a good seal. Layer 75 can comprise a thin layer of polypropylene that is either bonded to the inside of layer 74 or actually impregnated into layer 74 to make it water tight. Sealing layer 75 can also be painted on, sprayed on, bonded on as a spiral strip or applied by another application method.

In FIG. 4B we see hose 70 expanded near its fully extended length. Notice that indented portion 74b is no longer crumpled (or corrugated) as it was in FIG. 4A when the hose is retracted, and is instead pressurized and taut. If hose 70 is designed with the proper resiliency properties for layers 72, 74 and 75, the addition of more pressure can cause the smaller radius portion 74b to stretch to provide a nearly cylindrical inner channel (see FIG. 6C). This added stretch can provide additional length to the hose and provide easier passage of water or other fluid through the hose.

Many alternative ways exist for manufacturing hose 70, which can be manufactured in ways similar to other hoses. For example, layers 72, 74, and 75 can come in thin flexible ribbons and spring 76 can be bent form a spool of wire. During production, a hose winding machine could be used to form the hose out of ribbons of materials which are brought together and bonded to form layers 72, 74 and 75 of the hose (see helical wound hoses in FIGS. 7A and 7B). Spring 76 would be bent into a helical shape as the hose is rotated on the winding machine. Inside layers 74 and 75 would be fed into the machine and wrapped on to the inside of the spring coils in a helical pattern, while layer, 72 would be wrapped onto outside of the hose in a helical pattern. Support layer 74 would be oriented so that its fiber reinforcement is angled at the optimum sixty degrees from the longitudinal axis. The hose winding machine would provide heated surfaces and/or heated rollers that could then bond and shape the layers together into the proper helical configuration. As noted before some of the layers, specifically layers 72 and 75, can be sprayed on and/or painted on. Layer 72 can be a very thin coating of plastic, just thick enough to hold layers 74 and 75 in place within spring 76, and to reduce oxidation of the spring material. An alternate way of manufacturing hose 70 would be to have layers 74 and 75 already bonded together (see FIG. 4D) to form a single ribbon which would be wound onto the inside of helical spring 76 and molded into its final shape by heated surfaces and/or rollers on the hose winding machine. A final protective layer of UV absorbing material can then be spray onto the outside of the hose, bonding spring 76 to the hose body (layers 74 and 75). The actual shape of the wound on ribbons after being shaped, might look similar to the shape seen in FIG. 4B, which is near its fully extended shape. To assist in bonding layers 72, 74 and 75 together, additional layers of adhesives or primers can be coated onto the feed ribbons to assist in bonding all the layers and spring together.

It should also be noted that one or more of the three layers 72, 74 and 75 can be wound on the outside of the helical spring as a ribbon by a winding machine (as woven yarn by a hose weaving machine, or other winding method) with the same helical indentation 74b formed between the spring's coils (see FIG. 4B). These woven layer(s) can be secure bond to the other hose body layers and/or spring coil 76, however bonding of the layers is not critical to the proper function of the hose. In fact, with the woven layer on the outside (see layer 72 in FIG. 4B) not bonding that woven layer to the other layers can provide greater flexibility of the hose as a whole.

FIGS. 4C through 4E show three ways the layers 72, 74, and 75 of hose 70 might be constructed. In FIG. 4C, layers 72 and 75 are melted onto semi-porous fiber reinforced layer 74 (i.e. rip-stop nylon, polyester, polypropylene, polyethylene, Kevlar, etc.). The porous nature of layer 74 allows layers 72 and 75 to combine within layer 74 and actually bond themselves together if the materials are compatible. In FIG. 4D, both the protective layer 72 and the sealing layer are made from the same material. The layers simply become one enclosing layer with fiber reinforcing 74 inside. When wrapped onto the hose, the protective layer can provide the fluid tight seal for the hose, bonding to itself as it is wrapped on the inside of spring 76. In FIG. 4E, support layer 74 is impregnated with a sealing material 78, which helps seal layer 74 and can help layer 74 bond to layers 72 and 75. In alternate designs additional layers can be added to provide the desired strength, and/or provide a more durable hose body. Generally, layers 72 and 75 should be made of a considerably softer material than fiber support layer 74 so that the when the layers are bonded together, they remain relatively flexible because the stiff support layer 74 is between two more resilient layers 72 and 75.

In FIGS. 5A through 5C we see a second preferred embodiment of the disclosed invention sectioned along its mid-section longitudinally. Linearly retractable pressure hose 80 comprises a helical spring 86, a hose body 84 and an attachment layer 82. Helical spring 86 is preferably constructed of a spring metal such as spring steel, or stainless steel, and is attached to the major radius portion 84a of hose body 84 by attachment layer 82. Layer 82 can be bonded to both spring 86 and hose body 84. Hose body 84 comprises a polymer layer that has considerable strength in the plane of the layer to allow pressurized fluids to be within its central channel defined by body 84. Hose body 84 can comprise fiber reinforcement in a more resilient matrix sealing material (see FIG. 4D), or may comprise multiple layers of material (see FIGS. 4C and 4E). Attachment layer 82 can comprise any of a number of polymers that can be bonded to hose body 84 either directly or by intermediate boding layer(s). Layer 82 may be wound onto linearly retractable hose 80 as a ribbon of material, covering the outside of spring 86 and bonding against hose body 84 adjacent to the spring coil. If a wider ribbon of layer 82 material is used, a complete covering of hose 80 is possible (see layer 72 in FIG. 4A-B). Hose body 84 has a major radius (portion 84a of hose body 84) and a minor radius (portion 84b of hose body 84 when extended and retracted) both forming a helical spiral along the length of the hose. The major radius (portion 84a) is positioned against the interior surface of spring 86 along the length of the spring. A helical shaped indentation, which defines the minor radius (portion 84b when hose is extended) on hose body 84. The minor radius at 84b has a smaller radius of curvature than the major radius at 84a which is attached to the spring. Thus, the minor radius creates a helical shaped trough around linearly retractable hose 80 in the space between the coils of helical spring 86. This trough allows hose 80 to extend and retract linearly along its axis of elongation (longitudinal axis), while hose body material 84 remains substantially inside the coils of spring 86. This greatly reduces the retracted volume of linearly retractable hose 80 compared to the retracted volume of hose 80 if hose body 84 were folded between the coils of spring 86 and/or folded on the exterior of spring 86. The folding, or corrugating 87, of hose body 84 (bottom of indentation 84b) allows the radius of indentation portion 84b to be decreased during retraction (contraction) to a smaller radius than the minor radius (portion 84b of hose body 84 when extended) of hose body 84. This in turn allows hose body 84 to fold substantially inside spring 86 and not interfere with the adjacent coils of spring 86 from coming together in its fully retracted position (see FIGS. 5B and 5C).

In FIG. 5A, linearly retractable hose 80 is in a partially retracted state. Hose body 84 is can be limp in this state and the bottom of indentation 84b is shown as it starts to wrinkle, or corrugate, radially to make room for the hose body as hose 80 contracts. When pressurized, hose body 84 would be taut and the bottom of indentation 84b would be expanded radially from its position shown in FIG. 5A, and the longitudinal spacing between adjacent spring coils would increase, making the hose extend from the position shown.

In FIG. 5B, linearly retractable hose 80 is in its fully retracted position, with the coils of spring 86 substantially touching each other (with outer coating 82, the coating on the spring coils is touching not the actual spring). In FIG. 5B, hose body 84 is shown folded substantially radially with corrugated portions 87 still positioned substantially between its adjacent spring coils.

In FIG. 5C, linearly retractable hose 80 is shown in its fully retracted position. However, the dynamics of flexible sheet material will generally cause the folding of hose body 84 to angle in one direction or the other along the hose's length due to expansion forces in the hose body at corrugated locations 87. Corrugated section 87 provides a slight radial expanding force that tends to push the folded hose body 84 longitudinally to the left in FIG. 5C. Generally there will not be enough room within spring 86 to allow some folds to shift to the left (longitudinally, see FIG. 5C) and also allow other folds to shift to the right. Thus, once one fold begins to shift left it tends to push the other folds in the same direction and the result is what is they all tend to angle in the same direction as seen in FIG. 5C.

Figure 6A:
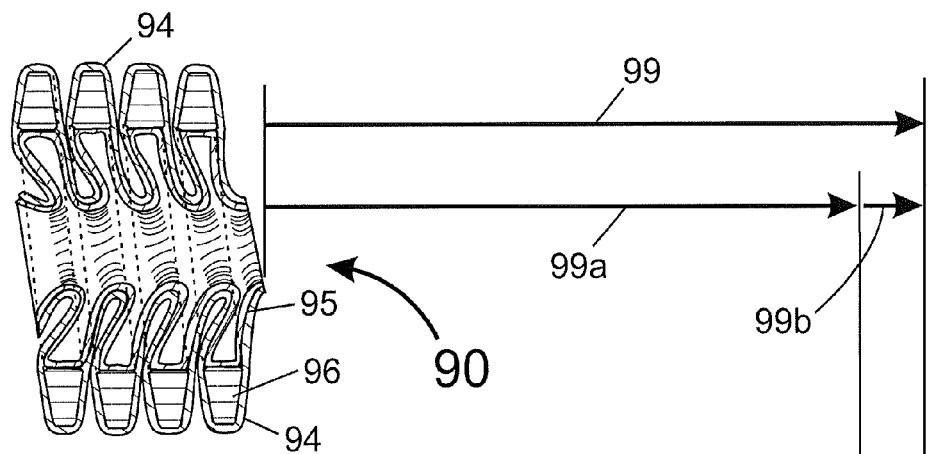
FIG. 6A-C Third embodiment of the improved Linearly Retractable Pressure Hose shown in section view fully retracted, extended and extended with substantial internal pressure to straighten the interior surface of the hose.
Figure 6B:
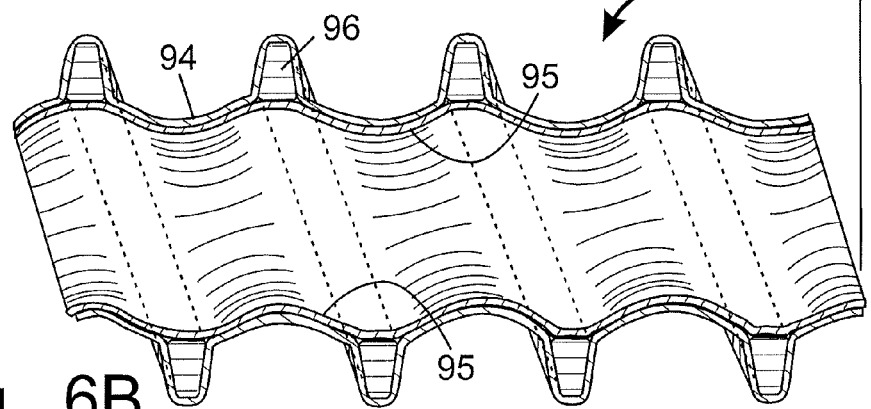
Figure 6C:
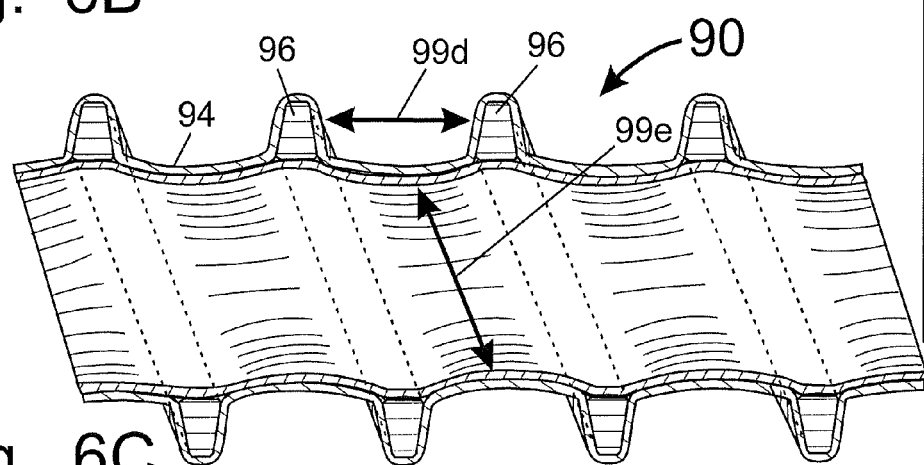

In FIGS. 6A through 6C we see a third preferred embodiment of the disclosed invention sectioned along its mid-section longitudinally. Linearly retractable hose 90 comprises a biasing spring 96, a hose body 94 and an attachment layer 95. Helical spring 96 is preferably constructed of a spring metal, such as, spring steel, or stainless steel. Hose body 94 is molded around the outside of spring 96 and shaped to provide an indentation in hose body 94 between the coils of spring 96. Attachment layer 95 provides a water tight seal for the hoses interior channel, an also provides longitudinal strength to the hose body 94 one either side of the spring coils. Without layer 95 providing this longitudinal strength, hose body 94 would tend to detach from the inner portion of the spring 96. Also, layer 95 defines an interior channel for transporting fluids and provides a seal for the interior channel even if hose body 94 is worn away at the outer edge of spring 96. With both layers 94 and 95, bonded together, layer 94 can be completely worn away on the outside of spring 96 exposing the outer edge of the spring, and still provide normal function of the hose. This is because, attachment layer 95 provides longitudinal strength to the hose while also providing a water tight seal for the hose's interior channel, and hose body 94 provides radial strength to keep hose 90 from bursting due to fluid pressure within the interior channel of the hose. The physics of hose pressure determine that the hoop stress (circumference tension force) in layer 94 will be approximately twice the longitudinal stress (tension force) in layer 95. Thus, layer 94 can be made twice as strong as layer 95 to reflect these force differences.

In FIGS. 6A through 6C, spring 96 in this design has a trapezoid cross-section to provide an angled side surface which can reduce the chances that the spring will get caught on objects as the hose is pulled around during use. The trapezoid cross-section (see FIGS. 6A-C) and the oval cross-section (see FIGS. 5A-C) are less efficient at producing spring biasing than a rectangular shape for a given width of spring cross-section. Thus, trapezoid and oval (and round) shaped spring cross-sections may have a smaller maximum overall retraction/extension ratio than for a rectangular cross-section spring (see FIGS. 4A-B), with other factors being equal.

In FIGS. 7A through 7D, we see four linearly retractable hoses 100, 110, 120 and 121, respectfully. Each of these linearly retractable hoses is shown constructed by a winding process, where ribbons of hose body material are wound inside and/or outside a helical spring. This general construction method is compatible with all the designs disclosed in this document. This winding process is generally more cost efficient than molding the entire layers on the hose body as a single piece. In practice, individual ribbons of hose body material can be melted and shaped with heat during the winding process such that the actual boundaries between the ribbon layers are almost undetectable, with the edges of the ribbons can be contoured into the ribbon it is bonded to (FIGS. 7A through 7D show the ribbons of hose material unmodified and still having their sharp edges, to make clear to the reader the layered and wound construction of the hoses).

Figure 7A:
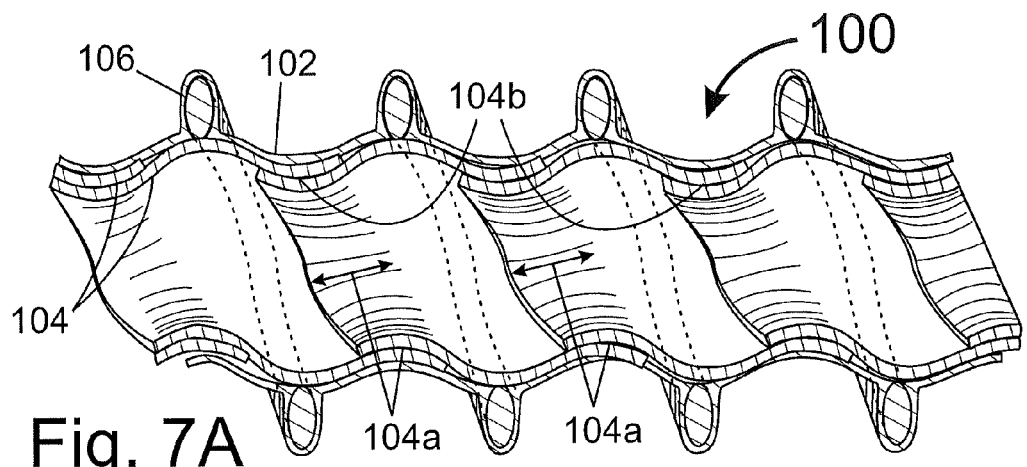
FIG. 7A Forth embodiment of the improved Linearly Retractable Pressure Hose shown in section view in its substantially extended position.

In FIG. 7A, we see a section view of the fourth preferred embodiment of as improved linearly retractable hose 100. Linearly retractable hose 100, comprises a helical spring 106, an outer layer 102 and a wound inner layer 104 comprising a ribbon wound onto itself and bonded at its overlaps at portions 104a. Outer layer 102 may also be wound onto the hose similarly to inner layer 104, but is shown entirely melted together to form a single continuous layer in FIG. 7A. Layer 102 may also be sprayed or painted on after the rest of the hose is constructed. Wound layer 104 is constructed of a single ribbon that is wound onto the interior of spring 106 so that it overlaps near the center of the indented portion 104b. Placing the overlap within the indentation of the hose body provides added radial strength where it is needed (the hose body near the spring coils can be supported against pressure by the spring coils themselves). However, the overlap of ribbon 104 can be placed elsewhere in relationship to the coils of spring 106 and is placed in the center only for example. Spring 106 can be wound into a helical coil at the same time as ribbon layer 104 as is common in the hose manufacturing art.

Figure 7B:
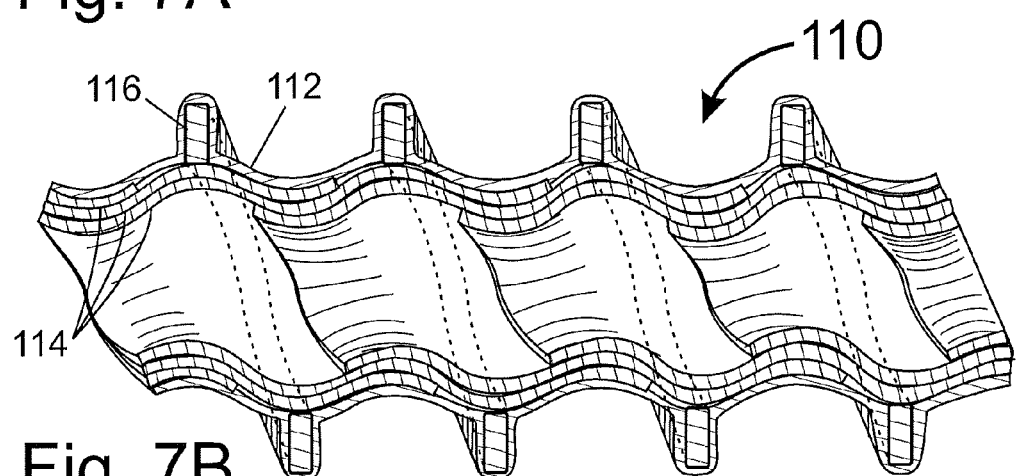
FIG. 7B Fifth embodiment of the improved Linearly Retractable Pressure Hose shown in section view in its substantially extended position.

In FIG. 7B, we see a section view of the fifth preferred embodiment of as linearly retractable hose 110. Retractable hose 110 comprises a helical spring 116, an outer layer 112 and a wound inner layer 114. Just like in FIG. 7A, ribbon 114 is wound on the interior of spring 116. However, in this case, ribbon 114 is twice as wide as ribbon 104 in hose 100. Thus, ribbon 114 extends under two loops of spring 116 instead of just one (as in hose 100). Ribbon 114 is wound at the same angle as ribbon 104 so that it follows the curve of the coils of spring 106 and 116. This means that wider ribbon 114 overlaps itself twice on hose 110 as seen in FIG. 7B. This type of winding process provides two layers of ribbon 104 under the coils of spring 116 and three layers near the indented portion between the spring coils. Ribbon 114 can be made of a thinner or from a weaker material than ribbon 104, while still providing the same radial pressure strength as ribbon 104 because of the layering of the ribbon. Layer 112 would hold the inner layer 114 in place and also provide protection to inner layer 114 from physical damage as well as ultraviolet radiation (UV radiation). Thus layer 112 can comprise a tough UV blocking polymer.

Figure 7C:
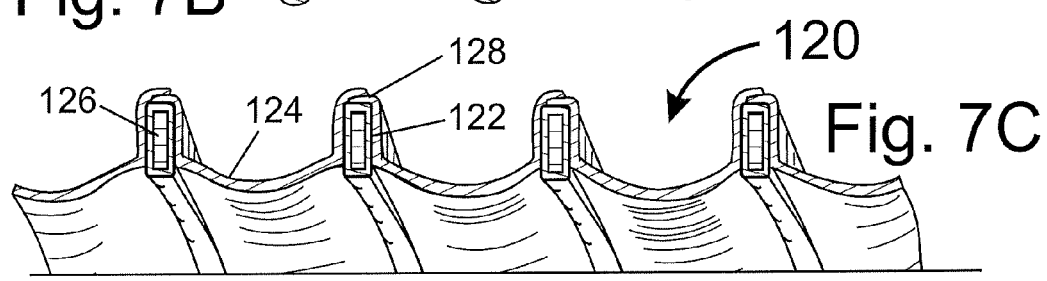
FIG. 7C-D Sixth embodiment of the improved Linearly Retractable Pressure Hose shown in section view in its substantially extended position, using coated and un-coated wire, respectfully, for the biasing spring.

In FIG. 7C, we see the sixth preferred embodiment in a quarter section view of a linearly retractable hoses 120 and 121, respectfully. Retractable hose 120, comprises a helical spring 126, a coating 122 on helical spring 126, and an outer layer 124. In this design, spring 126 is pre-coated with a structural coating 122 which outer layer 124 can be bonded to. Outer layer 124 would comprise a ribbon of fiber reinforced film that would be wound on the outside of spring 126 and bonded to coating 122. Coating 122 would provide a good bond between the spring and the outer layer 124. The inner portion of coating 122 would help transfer longitudinal forces in outer layer 124 from one side of each spring coil to the other side. Ribbon 124 is bonded together with itself at overlapped seam 128, to form a continuous layer for the hose, and provide a water tight seal. Seam 128 is shown here substantially just overlapping adjacent edges of ribbon layer 124. However, during the bonding process, these edges would be melted together with little or no visible seam. Also note, that seam 128 does not need to be located as shown on the ridge of spring wire 126, but can be placed nearly anywhere between the adjacent coils. Present manufacturing equipment makes a hose similar to this shape and places the seam centered between the spring coils (bottom of indent). This seam between the coils of spring 126 is nearly invisible. However, the advantage of placing the seam at the top of the ridge on spring 126 is that the overlapped section 128 can remain thick to provide extra wear protection for this exposed surface. Additional protection can be placed over seam 128 to provide additional protection against abrasion. Similar protection can also be used on the exterior portion of hose 121 at the ridge formed by spring 126b seen in FIG. 7D. Notice FIG. 7C is aligned with FIG. 7D so that they appear to be opposite sides of the same hose.

Figure 7D:
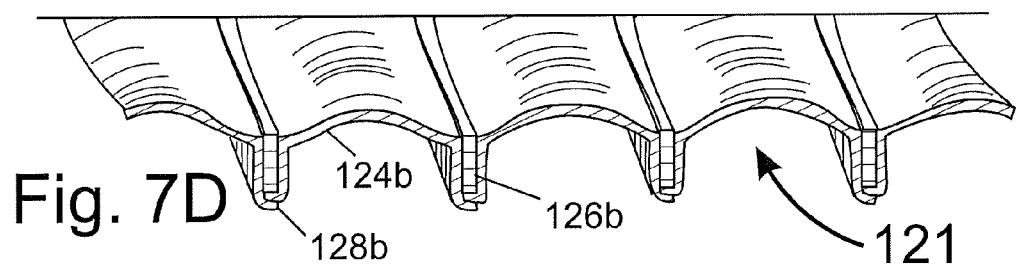

In FIG. 7D, we see a quarter section view of a linearly retractable hose 121, comprising a helical spring 126b, and wound outer layer 124b. In this design spring 126b is uncoated and outer layer 124b is bonded and/or wrapped directly onto it. Because the bonding between spring 126b and outer layer 124b is likely to be weak, outer layer 124b is bonded securely to itself to form a water proof layer covering the spring and forming the indentation in outer layer 124b. Outer layer 124b could include a ribbon of fiber reinforced film that would be wound on the outside of spring 126b and bonded to itself at position 128b on the exterior edge of spring 126b. The leading edge of ribbon 124b is overlapped and bonded together with its trailing edge, to form a continuous waterproof layer along the length of the hose. The actual position of the overlap (seam) is shown at the outer edge of spring 126b at overlapped seam location 128b, but the seam can be located nearly anywhere, including near the center of the helical indentation (bottom of indent). The double thickness of layer 124b at the outer edge of spring 126b (position 128b) helps protect the hose from abrasion. Additional protection can be placed over this bonded seam 128b to provide additional protection against abrasion. A thin metal U-channel could be bonded over the ridge portion of the hose (parallel to the helical spring) to protect the outer layer at the ridge from wearing through and potentially allowing the hose to leak.

Woven and Fiber Supported Hoses—FIGS. 8A-F, 9A-B, 10A-C

Figure 9A:
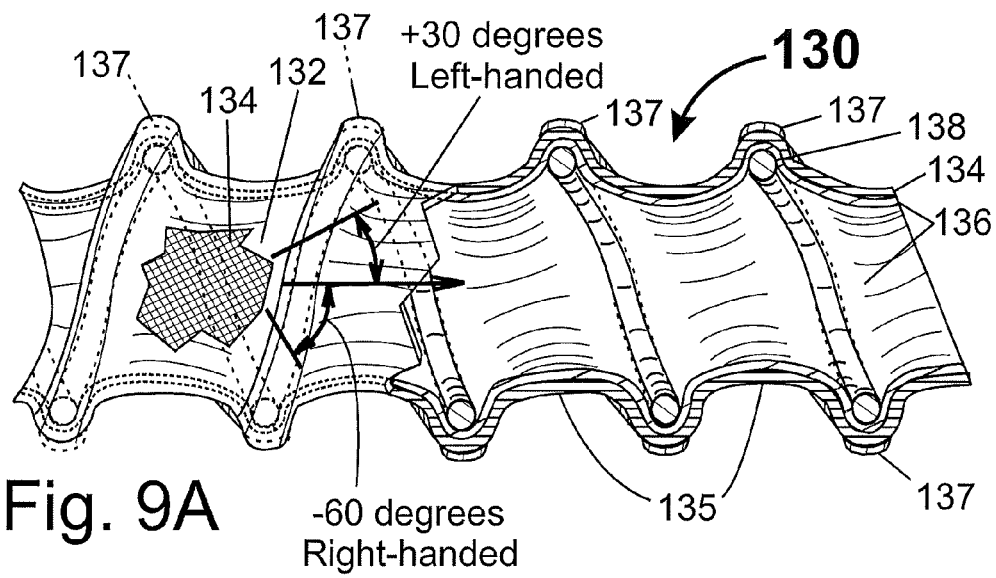
FIG. 9A Seventh embodiment in its extended position in cut-away side view.

In FIGS. 8A, 8B, and 9A, we see the seventh preferred embodiment as linearly retractable hose 130. The hose body, comprising layers 132, 134, and 136, are all molded over the exterior of helical biasing spring 138. An abrasion ridge 137 is also bonded on the ridge formed by biasing spring 138 and can be molded into woven cover layer 134. Abrasion ridge 137 can be composed of any of a number of wear resistant polymers, including polypropylene, nylon, ABS, etc. Care must be taken to keep the abrasion ridge only on the outer most portion of the ridge so that it does not come down over the sides of the ridge. The sides of the ridge must be left open so that cover layer 134 and sealing layer 136 can expand and take on a cylindrical shape. If abrasion ridge is made from a flexible material then some bonding to the sides of the ridge can be allowed, but adding material to the side of the ridge will increase the thickness of the coil and thus reduce the extended length to retracted length ratio.

In FIG. 8A we see a section view of hose 130 cut vertically along central longitudinal axis 131 of the hose (central longitudinal axis runs longitudinally down the center of biasing spring 138, equidistant radially from the spring). Biasing wire 138 can be made from a round stock stainless spring-steel, with or without a polymer coating 139 (see FIG. 8B). A thin polymer coating 139 on wire 138 can assist in bonding sealing layer 136 to the spring. The wire which spring 138 is made from can have a diameter of about 0.045 inches to provide about one and one-half pounds of retracting force when fully retracted.

Sealing layer 136 can be extruded as a strip of hot polymer over biasing spring wire 138 with the extruded strip bonded to the previous turn near the midpoint between the spring's coils. Layer 136 can be a high-density vinyl with a thickness of about 0.02 inches. Rollers are used to shape layer 136 with indented portion 135 (inside radius or minor radius of hose body) and to bond each turn to the one before it. The polymer used for layer 136, should be flexible, durable, heat resistant to about 80 degrees Celsius, and somewhat elastic so that it can return to its indented helical shape after being extended for long periods of time. Layer 136 may include fiber reinforcing to enhance temperature stability and/or enhance tensile strength for use in climates where solar heating can heat the hose to very-high temperatures.

Woven tube cover layer 134 would comprise a woven fiber tube with an effective diameter substantially less than the outside diameter of helical spring 138 in its relaxed condition. The woven diameter of cover layer 134 can be between zero to thirty percent smaller than the diameter of spring 138. The presently preferred diameter for cover layer 134 (woven tube) is about ten percent (10%) smaller than the diameter of spring 138. The smaller diameter woven tube 134 can be place over the larger diameter helical spring 138 because woven tube 134 can follow the helical path of spring 138, because the space between spring coils is open. This results in woven tube 134 having an indentation on the side of the hose opposite the helical spring. Thus, central longitudinal axis of tube 134 follows a helical path around the central longitudinal axis of spring 138, so that the helical indented portion 135 is formed between the coils of spring 138. Woven tube cover layer 134 can be made from fibers of any strong wear-resistant material, but nylon, polyester, polyethylene, polypropylene seem to be the best balance between strength, temperature resistance and cost. These fibers can also include fiber fillers, such as glass fibers, to provide higher temperature stability.

Bonding layer 132 can comprise a rubberized or soft polymer material that can be sprayed on and bonded to the outer surface of woven cover 134. Note that layer 132 is not drawn in cross-section in FIGS. 8A and 9A, but only marked as located on the outer surface of woven layer 134. This is done to keep the drawings uncluttered and to also denote how thin layer 132 can be made. Layer 132 is, for the most part, optional for this hose design is not needed for its proper operation, but would tend to provide added wear protection and hold fiber layer 134 together. Layer 132 may be sprayed on before or after abrasion ridge 137 is applied. Layer 132 can be made of either high or low-density vinyl or a soft urethane.

In FIG. 8B, we see a front section view of the hose body (layers 132, 134, and 136) of retractable hose 130. FIG. 8B shows the transverse cross-section of the hose body from the direction noted in FIG. 8A for FIG. 8B (sectioned perpendicular to the longitudinal axis of the hose). Notice that woven layer 134 in hose 130 are oriented at +30 degrees and −60 degrees (see FIG. 9A for cutaway view of fibers) with respect to central longitudinal axis 131. Just the sectioned ends of the fibers in layer 134 are seen. In FIG. 8B. The wider cross-sectioned fibers 134 are the −60 degree fibers which go into the page to the right. The more circular cross-sectioned fibers are the +30 degree fibers which go into the page to the left. Notice that the weave pattern has two adjacent fibers in both the −60 and the +30 directions. The number of fibers in each direction can be adjusted to the desired need. For this hose design it could be advantageous to provide a slightly greater number of fibers per inch for the −60 degree fibers to provide greater radial support, where the stresses will be greatest. The −60 degree fibers provide most of the radial support against hoop stress, while the +30 degree fibers provide most of the longitudinal support against longitudinal stress caused by internal fluid pressure (see similar hose 140 in FIG. 10B). As we will see in other designs, this choice of fiber angle may not be the best orientation for the fibers, and other orientations may be easier to weave. However, the +30 degree and −60 degree orientation relative to the longitudinal axis, is only the presently preferred fiber orientation. Tests with fiber orientations of +90 and −60 degrees from the longitudinal axis have also worked well in actually tests. Modern hose weaving machines are capable of multiple weave patterns and fiber orientation and should be able to provide the right combination of angle and weave pattern for hose 130 without modification. Notice that woven fibers 134 are indented slightly into sealing layer 136. This is a result of cover layer 134 being woven onto sealing layer 136 while it is still hot, and pressure of the fibers deform layer 136 slightly.

In FIG. 8C, we see a section view of the hose body of hose 130 (layers 132, 134 and 136). This view is sectioned along the +30 degree fibers (see FIG. 9A), which run right to left in FIG. 8C. The −60 degree fibers are the oval cross-sections and continue into the page and right slightly. Notice that coating layer 132 is substantially on the surface of woven layer 134 and does not penetrate to sealing layer 136 in this example.

In FIGS. 8D through 8F, we see a side section view of alternative ways of constructing a hose body of a linearly retractable hose, and providing a sealed hose structure similar to layers 132, 134, and 136 on hose 130. The hose bodies are sectioned along the longitudinal axis one orientation of fibers so that the weave pattern can more easily be seen.

In FIG. 8D, we see woven layer 134b with four fibers radial running fibers. The longitudinal fibers running from left to right in the plane of the page can be woven in sets of two or three, so that the radial fibers are more tightly woven and provide greater strength. Alternatively, the radial fibers (fibers projecting into page) can be made larger in diameter than the longitudinal fibers (fibers running left to right on page) to provide greater radial tensile strength (hoop tensile strength)

to support the greater hoop stress in the hose body when pressurized. Also note that layer 132 has been omitted from this design. Without layer 132, the fibers in layer 134*b* can more easily shift during extension and contraction of the linearly retractable hose. This means layer 134*b* binds less and presents less resistance to changes in the hose's length.

In FIG. 8E we see a dual layer hose body comprising a first layer comprising longitudinal fibers 147*a* and vinyl matrix 148*a*, and a second layer comprising radial fibers 147*b* and vinyl matrix 148*b*. The orientation of fibers 147*a* are substantially longitudinally along the hose body, while the orientation of fibers 147*b* are substantially radially around the hose body. Because the hoop stress on the hose is twice the longitudinal stress (see Eq. 1 and 2), radial fibers 147*b*. Fibers 147*a-b* are molded substantially within vinyl layers 148*a-b*, respectfully, to keep them in place. Both vinyl layers 148*a-b* provide a water proof seal between the inside and outside of the hose. This structure is similar to layers 134*e* and 136*e* with fibers 133*e* and 135*e*, respectfully, in FIG. 9B, and to layers 146*a* and 146*b* with fibers 144*a* and 144*b*, respectfully in FIG. 10B, except the fiber orientation is slightly different. The dual layer hose body shown in FIG. 8E is used in hose 141 seen in FIG. 10C.

Figure 10A:
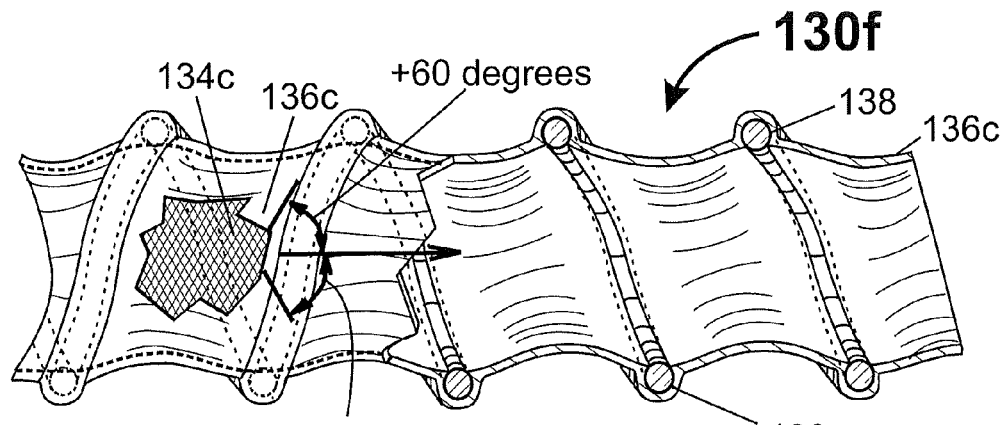
FIG. 10A Eighth preferred embodiment in cut-away having single layer construction.

In FIG. 8F, we see an alternative configuration for woven layer 134*c* and vinyl matrix layer 136*c* (see hose 130*f* in FIG. 10A). FIG. 8F is sectioned along at an angle of +60 degree from the longitudinal axis (along one orientation of fibers) so that the −60 degree fibers would project out of the page at an angle of −30 degrees (see FIG. 10A). In this design, woven fibers 134*c* are completely embedded in vinyl matrix layer 136*c*, which provides a water tight seal for hose 130*f* (see FIG. 10A). Thus hose body comprises a single layer (fibers 134*c* and matrix 136*c*) that is molded over helical spring 138 for containing fluid. Layer 136*c* can be composed of any of a number of resilient and flexible polymers, such as, vinyl, urethane, etc. Fibers 134*c* can be any of a number of high-strength polymer or natural fibers, such as, cotton, polyester, nylon, polyethylene, etc.

In FIG. 9A, we see linearly retractable pressure hose 130 in cut-away view and stretched linearly to nearly its fully extended state. Hose 130 is also seen in FIGS. 8A-C. Sealing layer 136 is formed over the outside of biasing spring 138 to form an indented portion 135 between the coils of spring 138. Indentation 135 forms a helical spiral shape that turns in the same direction as the helical spiral shape of wear ridge 137. This forms what could be called a double helix shape, where the diameter of the indented helix 135 is significantly smaller than the diameter of wear ridge helix 137. Sealing layer 136 must be relatively flexible to expand and contract with the hose, so layer 136 tends not to have sufficient tensile strength to support high fluid pressures. Thus, woven layer 134 is made of high tensile strength fibers that are woven over the top of sealing layer 136 to provide structural tensile strength. The +30 degrees (left-handed twist) and −60 degrees (right-handed twist) are chosen here because experimental hoses with these angles of fibers showed very little axial twist. Other fiber angles that work can have many acceptable values. For example, woven fibers with left-handed twist fiber between +0 and +40 degrees can be combined with right-handed twist fibers between −50 and −90 degrees. For woven fibers with left-handed twists between +45 and +75 degrees, the right-handed twist fibers can be oriented between −45 and −75 degrees. While other angle combinations are possible, in general the woven fibers should be nearly perpendicular to each other. Relative angles between the fibers can range between a narrow longitudinal weave with as little as forty degrees between fibers (i.e. fibers at +20 and −20 degrees from the longitudinal axis), or as wide as one-hundred fifty degrees (i.e. fibers at +75 and −75 degrees from the longitudinal axis).

There are many alternative ways of manufacturing hose 130. For example, inner sealing layer 136 can be formed as a shrink wrap like polymer tube that is pulled over spring 138 when it is stretched. Then heat is applied to tube 136 causing it to shrink around spring 138 and taking on the double helix shape shown. Then while spring 138 and layer 136 are stretched, woven layer 134 can be woven onto the outside of layer 136 to form the hose. As options, coating layer 132 can be applied to the outside of layer 134, and wear ridge 137 can be bonded to the outer ridge of the hose. This same technique can be used for other pressure hose designs disclosed here.

Figure 9B:
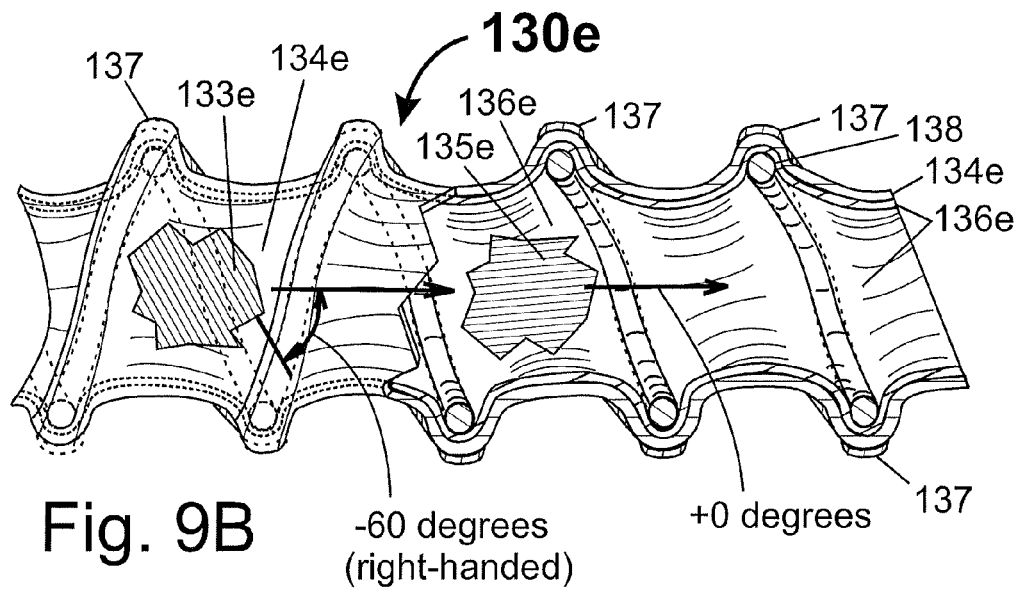
FIG. 9B Seventh embodiment with alternative layers and fiber arrangements for the hose in FIG. 9A.

In FIG. 9B, we see linearly retractable pressure hose 130 in cut-away view and stretched linearly to a partially extended state. In this design the reinforcing fibers 133*e* and 135*e* are split between layers 134*e* and 136*e*, respectfully. Fibers 133*e* are substantially embedded in vinyl matrix layer 134*e*. Fibers 135*e* are substantially embedded in vinyl matrix layer 136*e*. The cross-sectional structure of these two layers can be seen more clearly in FIG. 8E, which is a section view of the layers, sectioned along longitudinal fibers 136*e*. The −60 degree angle for fibers 133*e* and +0 degrees for fibers 135*e* are only one example of the fiber angle choices possible.

In FIG. 10A, we see linearly retractable hose 130*f*, comprising a with a single cover sealed layer 136*c*, molded over helical spring 138, and a woven fiber layer 134*c* embedded in a flexible polymer layer 136*c* (i.e vinyl). A section view of layer 136*c* is seen in FIG. 8F as if sectioned along the +60 degree line shown in FIG. 10A. FIG. 8F shows woven fibers 134*c* embedded in polymer matrix 136*c*. To construct this type of hose, helical spring 138 would be stretched and layer 134*c* would be woven over spring 138 forming the helical shape cover seen in FIG. 10A. Then a polymer matrix 136*c* would be infused into and around woven layer 134*c* to provide a water tight seal. The polymer matrix 136*c* would provide the water tight seal and woven layer 134*c* would provide the longitudinal and radial strength needed to withstand internal fluid pressure. Layer 136*c* can be composed of any of a number of resilient and flexible polymers, such as, vinyl, urethane, etc. Fibers 134*c* can be any of a number of high-strength polymer or natural fibers, such as, cotton, polyester, nylon, polyethylene, etc.

In FIG. 10A, we see the fiber orientations of +60 degrees and −60 degrees from the longitudinal. This angle appears to be optimal at the present time. This is because the nature of internal pressure within a hose tends to create twice the hoop stress as longitudinal stress at +90 degrees and +0 degrees (see Eqs. 1 and 2). Vector analysis shows that with this two-to-one hoop stress-to-longitudinal stress, the force vectors can be rearranged into two vectors oriented at +60 degrees and −60 degrees from the longitudinal axis. Thus, a hose experiencing internal pressure will tend to direct all the force along fibers that are oriented at +60 and −60 degrees. If the fibers are oriented at an angle greater than +60 and −60 degrees, say +70 and −70 degrees, the 2-to-1 relationship between the hoop stress and the longitudinal stress will tend to pull the +70 and −70 degree fibers toward +60 and −60 degree angles, respectfully, when pressurized. Similarly, if the fibers are oriented at an angle less than +60 and −60 degrees, say +50 and −50 degrees, the 2-to-1 relationship between the hoop stress and the longitudinal stress will tend to pull the +70 and −70 degree fibers toward +60 and −60 degree angles, respectfully, when pressurized. Thus, to reduce wear from fibers shifting to different angles within the hose, when pressurized and depressurized, fiber angles of either +60 and −60 degrees (see woven layer 134*c* in FIG.

10A), and/or +90 and +0 degrees (see fiber layers 147a and 147b in FIG. 10C) can be used.

Figure 10B:
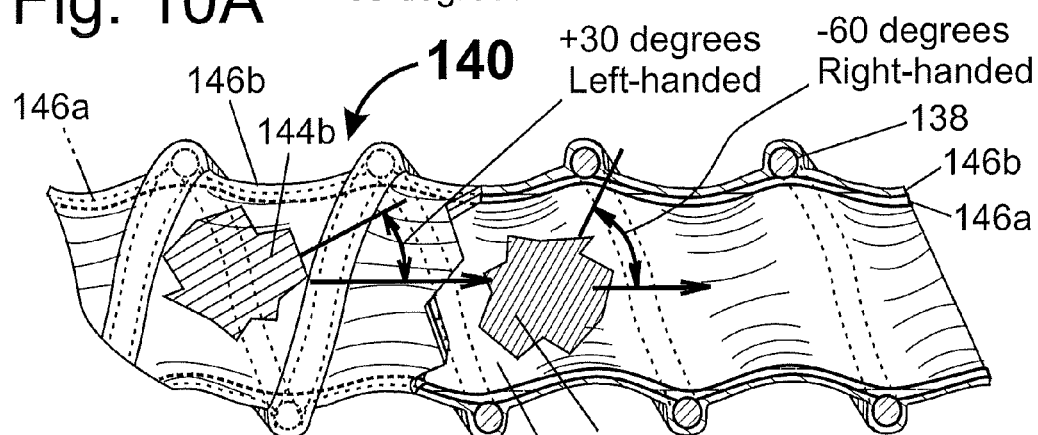
FIG. 10B Ninth preferred embodiment in cut-away having one layer outside biasing spring and one layer inside biasing spring.

In FIG. 10B, we see linearly retractable hose 140 that comprises inner layer 146a molded inside biasing spring 138, and outer layer 146b molded outside biasing spring 138. Fiber reinforcement 144a oriented at −60 degrees from the longitudinal (right-handed twist) are embedded in inner layer 146a to provide radial strength (hoop strength) for the hose. Fiber reinforcement 144b, oriented at +30 from the longitudinal (left-handed twist) are embedded in outer layer 146b. This arrangement gives essentially the same fiber reinforcement as hose 130 in FIG. 9A, accept that the fiber in hose 130 are actually woven together, while fibers 144a and 144b are in separate layers 146a and 146b, respectfully. Layers 146a-b can be reversed if desired, so that 146b is on the inside and 146a is on the outside of spring 138, placing the +30 degree fibers on the inside and the −60 degree fibers on the outside. However, with layer 146a on the interior of spring 138 as shown (protected by spring 138), layer 146b can be substantially worn (abraded) away at the ridge formed by spring 138 and still provide a water tight hose. However if too much of layer 146b is worn away, the longitudinal strength of the hose can be compromised and the hose may then stretch linearly until it ruptures. Thus, hose 140 (along with other non-exoskeleton hoses) may benefit from an abrasion ridge similar to abrasion ridge 137 seen in FIGS. 8A-B and 9A. The abrasion ridge would be added along the spring's outer diameter. Such an abrasion ridge would protect the exposed ridge created by the larger diameter of the biasing spring, similar to abrasion ridge 137 on hose 130. The smooth inner layer 146a gives this hose the potential of deforming under pressure to create a substantially smooth cylindrical interior when pressurized, thus reducing drag on fluid flowing through the hose. Layers 146a-b can be composed of any of a number of resilient and flexible polymers, such as, vinyl, urethane, etc. Fibers 144a-b can be any of a number of high-strength polymer or natural fibers, such as, cotton, polyester, nylon, polyethylene, etc.

Alternatively, in FIG. 10B, fibers 144a could be woven with fibers 144b to form a woven layer 146b instead of polymer fiber layer 146b. In which case, layer 146a does not need reinforcing fiber 144a and may be simply spray coated onto the inside of this alternative woven layer 146b. Other alternatives would be to again use a woven layer 146b as described above, and then while spring 138 and woven layer 146b are stretched, to pull a polymer tube with a slightly smaller diameter than the inside of spring 138, down the center of the spring. Then applying pressure and heat in the form of hot compressed air, polymer tube 146a would become plastic and deform to the shape of the woven layer 146b. The hose would be cooled and sealing layer 146a would retain the shape seen in FIG. 10B In FIG. 10C, we see a cutaway of linearly retractable hose 141, comprising helical biasing spring 138, inner layer 148a with longitudinal fibers 147a, and outer layer 148b with radial fibers 147b. Layers 148a-b, respectfully, have fibers 147a-b securely embedded in them, and provide a water tight seal. Layers 148a-b may be bonded together or allowed to be held together by just friction contact between them. Fibers 147a within inner layer 148a are oriented at +0 degrees from the longitudinal axis of the hose (oriented longitudinally). Because layer 148a passes inside spring 138, hose 141 can potentially form an interior hose passageway that is nearly a perfectly smooth cylindrical tube when pressurized, greatly reducing fluid drag. Radial fibers 147b in layer 148b are oriented at +90 from the longitudinal axis (perpendicular to the longitudinal axis), and can be tailored to provide just the correct support to accomplish this smooth cylindrical tube shape when pressurized. Radial fibers 147b also provide radial strength to the hose to resist internal fluid pressure. Layers 148a-b can be composed of any of a number of resilient and flexible polymers, such as, vinyl, urethane, etc. Fibers 147a-b can be any of a number of high-strength polymer or natural fibers, such as, cotton, polyester, nylon, polyethylene, etc.

Figure 10C:
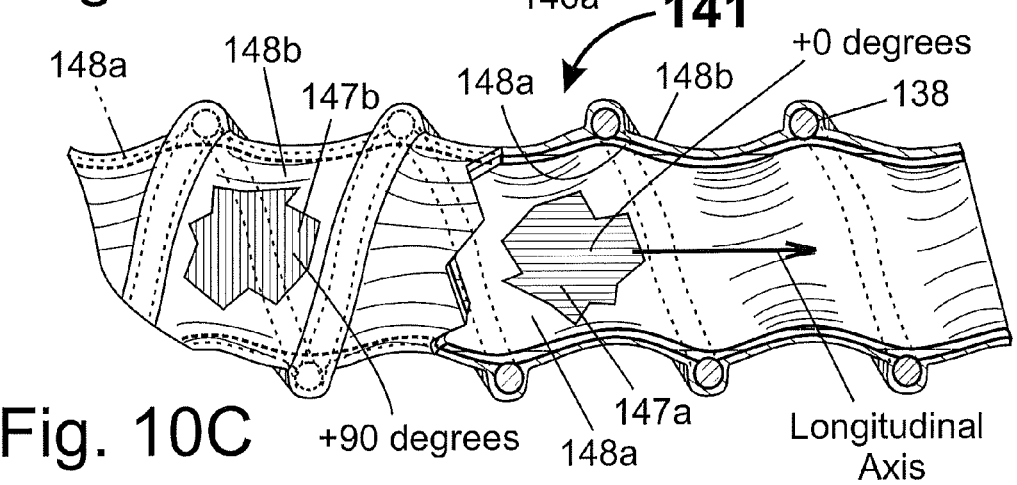
FIG. 10C Ninth embodiment in cut-away having alternate fiber reinforcement.

There are many alternative ways of manufacturing hoses 140 and 141 seen in FIGS. 10B and 10C, respectfully. For example, for hose 141, outer layer 148b may comprise a woven layer similar to layers 134 and 134c seen in FIGS. 9A and 10A, respectfully, and sealing layer 148a comprise a continuous thin wall polymer tube (vinyl, urethane, etc.), with or without strengthening fibers 147a. To manufacture, spring 138 can be stretched and layer 148b woven over the stretched spring 138, creating the double helical shape seen in FIG. 10C. Then while stretched, inner sealing layer 148a, in the form of a polymer tube 148a, is pulled down the center of spring 138 and woven layer 148b. Polymer tube 148a would initially have an outside diameter slightly less than the inside diameter of spring 138 so it can pass inside spring 138 with little resistance. After polymer tube 148a is fully within spring 138 and woven layer 148b, heat and pressure is applied to the inside of polymer tube 148a with hot compressed air, or other similar means, causing layer 148a to become plastic and expand, and deform, to take on the shape of the inside of woven layer 148b and spring 138. When the hose is cooled, layer 148a has the shape shown in FIG. 10C. Note that layer 148b, in this example, would have woven fibers like woven layers 134 and 134c, not just radial fibers 147b (+90 degrees from longitudinal axis) as seen in FIG. 10C. This same technique can be used for other pressure hose designs disclosed here.

Presently Preferred Woven Hose Design

While designs are always changing, below we are giving our presently best construction method for a woven support cover linearly retractable hose (see FIGS. 8A-C, and 9A for example). These values and specific designs should not be viewed as limiting the scope of the invention, but as one example of the invention.

Hose Diameter

The linearly retractable hose 130 presently has a preferred outside diameter (OD) of approximately 25 mm. This however, is only because the manufacturing equipment presently available can only go that small. The preferred diameter appears to be between 22 mm and 24 mm, which provides a more compact hose while still providing approximately a 5-to-1 expansion ratio. These diameters (radius=11 mm to 12 mm) also are large enough that they will provide very good water flow rates with only a small fluid flow resistance (hydrodynamic drag).

Sealing Layer

Sealing layer 136 can be made of a high-density vinyl that is extruded over the pre-bent helical spring coils and bonded to adjacent extrusions approximately at the midpoint between coils (bottom of indent between coils).

Spring Coil—Biasing

The wire material used should be approximately 0.045 inches in diameter (1.0 mil=0.0010 inch) if made form standard spring steel to provide the proper stiffness desired. And may be slightly larger diameter if a stainless steel is used because it is less rigid. Since hose 130 is going to be used to transport fluids, such as water, the spring material should be made of a rust proof stainless steel alloy approximately 0.045 inches (45 mil) in diameter. The wire may have a thin polymer coating if needed for bonding of sealing layer 136 to the wire during manufacturing. However, the polymer coating increases the longitudinal spacing of the hose, and thus the elimination of the polymer coating on the wire results in a hose that has a greater extended-to-retracted length ratio. Without a polymer coating the spring wire will be exposed directly to the fluid flow, and therefore must be able to resist corrosion and oxidation. This bare wire would have a 15 to 20 mil (0.015-0.020 inches) spacing advantage over the coated wire (65 mil OD), which could be used for a thicker woven cover to be used.

The wire when bent into the helical shape for the hose (25 mm OD), should include a longitudinal pre-bias to provide a retracting force even when the spring is fully retracted. The strength of the retracting force can be controlled by simply adding the proper longitudinal pre-bias to the wire (see below). The pre-biasing the wire is added to the wire by adding to the wire, which is already being bent into an outside diameter of 25 mm (diameter of hose), a bend perpendicular to this 25 mm curvature. This perpendicular pre-biasing (in the longitudinal direction of the hose) should have a radius of curvature from 60 mm to 80 mm using a 40 mil to 45 mil outside diameter wire (60 mil OD if coated). With the proper longitudinal pre-biasing the biasing spring can significantly increase the retracting force of the 25 mm OD hose when it is in its FULLY RETRACTED POSITION (this is important for proper function of the hose).

Woven Cover

Fiber cover layer 134 can be made from fiber material that is woven onto the hose layer 136 using a hose weaving machine (sometimes called a winding process). The particular fiber is not critical, except that it must be, strong (nylon 0.6 tensile strength or better), Ultraviolet (UV) resistant (UV level 2 or greater) and be able to withstand temperatures up to 80 C. UV protection can be provided by the addition of 2% carbon black to polyethylene monofilament or other polymer (BLACK is the preferred color). Other UV stabilizers can also be used which are standard for the industry. The polymers we have presently identified with sufficient desirable properties, are: Nylon 6, Nylon 6.6, LD polyethylene, HD polyethylene, and polyester. We believe that polyethylene and polyester fibers will provide better strength, heat resistance, and abrasion resistance than nylon, but nylon may work just fine. At this time it appears that we want to use a monofilament fiber weave for our cover to provide a relatively thick filament structure that will resist wearing better than a multi-fiber yarn like material. We would like the monofilament itself to be a narrow ribbon 7-9 mil thick (0.007-0.009 inches) and 30-60 mil wide but round stock can work also. The goal is to keep the thickness of the monofilament to less than 1.0 mil (0.001 inch) since each coil of the hose will have 4-layers of fiber weave around it (40 mil-2-layer thicknesses on each side of coil, woven layer approximately 2-fiber layers thick). Layer 134 adds approximately 30% to the retracted length of hose 130 without this layer. With slightly thinner cover material 134, it is possible to reduce this increase in retracted length to 20%. Spun yarn may also work, but should lay flat with a thickness of 7-10 mil (0.007-0.010 inches) per layer, and should be woven tightly so that the fibers do not shift during use. The abrasion resistance of spun yarn is likely to be significantly less than monofilament fiber, but would work. To accommodate winding machinery, we can use three or more round stock monofilaments, fed together, and laid flat with respect to the surface of sealing layer 136 to provide a weave spacing very similar to that with the narrow ribbon shape mentioned above. The weave pattern is not that important, and a PLAIN weave should be okay or any other weave that provides both radial strength and longitudinal strength. Just about any weave pattern that can provide radial strength and can conform to the helical shape of the hose should work. However, if possible, the two weave fibers orientations would be best oriented at −60 degrees from longitudinal (with a right-handed twist) and +30 degrees from longitudinal (with a left-handed twist). This places the −60 degree fibers counter rotating to the left-handed twist of helical biasing spring 138, and provides the counter-torque needed to keep the hose from twisting axially when pressure is introduced into the hose. Alternatively, weaving machines which orient the fibers at +0 and +90 degree angles, and at +45 and −45 degree angles with the longitudinal should also work. We know from test, that −60 and +30 degrees fibers will counteract the tendency for the hose to twist axially under applied internal pressure, essentially eliminating twisting of the hose when it expands. We also know that the −60/+30 degree fiber orientation allows the cover to conform to the helical shaped hose. The −60 degree fibers wrap around the hose at a steep angle and provide radial strength, while the +30 degree fibers provide longitudinal strength. The −60 degree fibers should wind around the hose in the opposite direction as the spring wire. Most wire bending machines will bend spring wire 138 with a LEFT-HANDED twist, thus the −60 degree fibers should have a RIGHT HANDED twist to them. If the spring were given a RIGHT-HANDED twist then the fibers should be given a +60 orientation (left-handed twist). Most weave pattern should be able to follow the helical shape of hose 130 when fully extended (without pressure) because the actual cross-sectional diameter of the helical hose remains relatively constant as one travels longitudinally along the length of the hose.

Abrasion Ridge

Abrasion ridge 137 is optional and can be molded onto the ridge formed by the biasing spring's diameter. Ridge 137 can be made of a hard wear-resistant plastic such as ABS, Polypropylene, etc., that can be melted directly into woven layer 134 to bond it to hose 130. Ridge 137 should be placed only on the crest of the ridge since placing it on the sides of the ridge will not only interfere with the expansion of layers 134 and 136 into a generally cylindrical shape, but will also add longitudinal width to each coil section and thus reduce the hose's expansion ratio.

Hose Ends

The hose ends (similar to inlet connector 152 and outlet connector 158, see FIGS. 11A-B) would preferably be standard water hose connectors made of black plastic to match the hose body color. These connectors would be standard garden hose connectors that are common to the home and garden industry. The outlet connector can also have a swivel joint built into it to release any axial twist of the hose during expansion & contraction. Though, simpler non-swivel ends can be used if the proper fiber orientation and weave pattern for cover layer 134 can eliminate most of the axial twist that would occur without it. A cutoff-valve may also be added to the outlet connector for turning-off the flow of water when desire.

Cover Coating

Finally, coating 132 is optional and can be applied to the outside of woven cover layer 134 before, during or after it has been woven onto sealing layer 136. Cover coating 132 can be used to help hold woven layer 134 in place and to provide added wear resistance. Coating 132 can be made of any of a number of polymers and sprayed, painted, dipped, or other method for coating the outer hose body. Coating 132 can be made of a UV resistant polymer that is used to protect cover layer 134 and help it hold its shape. However, coating 132 cannot be too thick or it will tend to cause layer 134 to bind and resist retracting to its retracted position.

Detailed Description of Exoskeleton Embodiments FIGS. 11A to 16D

In this document, the Linearly Retractable Exoskeleton Hoses will often be referred to as "Exoskeleton Hose", but at times may be referred to as "retractable garden hose", "linearly retractable hose", "retractable hose", "garden hose", "water hose", "hose", etc. Many methods already exist for the construction of pressure hoses. The exoskeleton hoses disclosed here comprise an outer exoskeleton spring (tension wave-spring) and an inner hose body. Spray coatings for the interior and/or exterior of the hose body can also be applied after the main portion of the hose body has been formed. The exoskeleton spring provides three main functions: (1) provides spring biasing for the hose, (2) provides radial pressure support for the hose body, and (3) provides mechanical protection for the hose body from the environment. A few specific methods of manufacturing the disclosed hose body and exoskeleton spring will be discussed later in this document. We will first look at a specific example of the disclosed Exoskeleton Hose (hose 150). After the reader has an understanding of the Exoskeleton Hose as a whole, the components of the exoskeleton hose will be discussed separately. While most of the disclosed exoskeleton springs are discussed as being made from spring stainless steel, the actual material used can be any of a number of well known materials used for springs, comprising many metals, alloys and composites that can provide the resiliency needed here for exoskeleton pressure hoses.

In FIGS. 11A-B, we see an example of the disclosed Exoskeleton Hose for use as a water hose. Exoskeleton hose 150, comprises a hybrid flat spring 154 (also called hybrid wave-spring, tension wave-spring, hybrid spring and exoskeleton spring) and a hose body 180. On inlet end of hose 150 is attached a faucet connector 152 for attaching to a standard water outlet. On the other end of hose 150 is attached a nozzle connector 158 for connecting to a sprinkler or other watering tool such as a spray nozzle. Both faucet connector 152 and nozzle connector 158 can be standard garden hose type connectors similar to those presently found on garden hoses. Hose body 180 comprises a central channel that forms a water tight seal between connectors 152 and 158 to provide a channel for water to move through from connector 152 to connector 158. The spacing between the exterior of hose body 180 and interior of exoskeleton spring 154 can be anywhere between a loose fit (radial space between body 180 and spring 154), to a bonded fit where hose body 180 physically bonded (attached) in multiple points to the interior of Exoskeleton Hose 150 along the length. Both exoskeleton spring 154 and hose body 180 are designed to stretch together, and for this particular design a 10-to-1 extended length-to-retracted length has be chosen (Hose 150 only partially extended in FIG. 11B).

In FIG. 11A, we see exoskeleton spring 154 in its retracted position. The length of hose 150 is shown here much shorter than a normal hose to allow FIG. 11B to show the expansion of the hose. In FIG. 11B, spring 154 is only partially extended, and hose body 180 has not become tight nor expanded radially to lay flat against the inside surface of exoskeleton spring 154.

In FIG. 11B, Hose 150 is seen partially extended, with an additional extension of about 20% to reach its full 10-to-1 expansion ratio. At this partially extended length, water pressure within hose body 180 has not reached a high enough pressure to fully extend exoskeleton hose 150. Note that hose body 180 is also not fully expanded against the interior surface of hybrid wave-spring 154, which occurs when internal pressure is great enough. With application of additional pressure within hose body 180, exoskeleton hose 150 expands longitudinally to its fully extended length. At this full length, a re-enforced fibers stopping means 182 (see FIGS. 13A and 15C) is aligned longitudinal within hose body 180 to provide longitudinal strength and prevent further longitudinal expansion. Without longitudinal stopping means 182 (strong polymer fibers) to stop further stretching of hybrid wave-spring 154, the hose body and hybrid spring would continue to stretch in length as water pressure increased until either spring 154 is stretched beyond its elastic range, and/or hose body 180 is stretched too far and ruptures. While the stopping means is discussed here as integral with the hose body, the actual stopping means could be just as easily a fiber support defined on the hybrid spring and/or a fiber support located between the hybrid spring and hose body. If the hybrid spring can stop longitudinal expansion of the hose before reaching its elastic limit, then longitudinal stopping means 182 is not needed.

Spring Designs

While we will mainly be discussing tension wave-springs and hybrid-wave springs for use with the disclosed exoskeleton hose, the reader should note that other spring designs can be used. This means the novel springs designs disclosed here can provide smaller gaps for the hose body to bulge through, and thus allows the exoskeleton spring to more easily support the hose body than a simple helical coil spring. Hybrid springs are preferred over helical coil springs because they can be made to nearly eliminate twist the exoskeleton hose around its longitudinal axis (axial twist) when pressurized. A helical coil springs when used in an exoskeleton hose can cause considerable twisting (axial twist) of the hose along the longitudinal axis. This twisting of the hose makes the hose slightly more difficult for a user to operate, because the end of the hose will tend to turn in the user's hand when pressure changes occur in the hose. However, as we will see there are ways to eliminate this twisting, such as by using multiple spring sections with opposite twists (twists counter each other), using swivel connector ends so the twisting motion is not transferred to the nozzle in the user's hand, using longitudinal support cords with the opposite twist of the helical coil, using rectangular shaped coils that interact with adjacent coils to limit twisting, and etc.

Figure 13A:
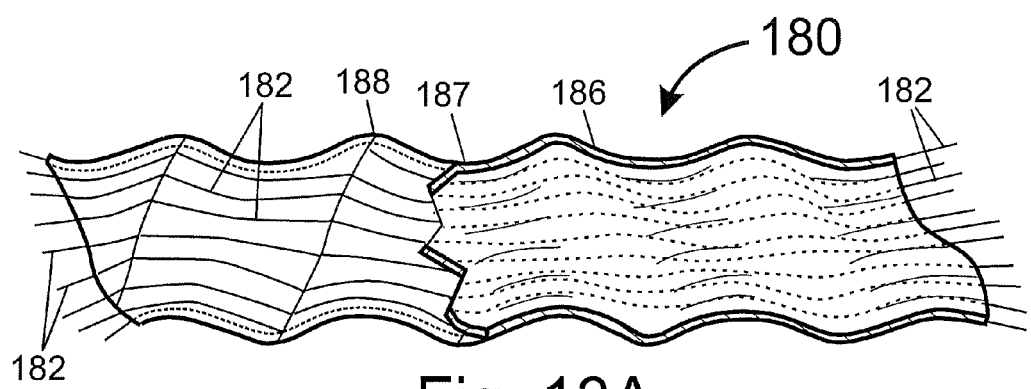
FIG. 13A-B Perspective view of Linearly Retractable Pressure Hose Body 180 partially sectioned. The helical shaped hose body 180 is shown extended in FIG. 13A and retracted in FIG. 13B.

If a helical coil spring is used for the exoskeleton, then the twist direction of the spring should be opposite the twist direction of the hose body (for helical hose bodies, see FIG. 13A). The opposite twist is needed to insure that the hose body does not fall outward and get in-between the coils of the helical coil spring and interfere with the full retraction of the hose. For example, hose body 180 in FIG. 13A has a left handed twist and, as such, it has ridge lines that run from lower-left to upper-right on the side facing an observer. A helical coil spring for use with hose body 180 would then have a right handed twist, with coil turns that run from lower-right to upper-left on the side facing the observer. Thus outer ridge 188 of hose 180 would cross the turns of the helical coil spring at an angle, making sure that there are multiple contacts between outer ridge 188 and the inner surface of the helical spring's coils. This cross pattern would help maintain the position of hose body 180 inside the interior surface of the helical coil spring. If both the helical spring and the hose body have the same twist (either both right handed, or both left handed) then ridge 188 of hose 180 could lineup with the helical gap between the coils of the helical coil spring and get trapped between the coils, preventing full retraction of the helical coil spring. Note that hose body 180 will still tend to bulge between the coils when under pressure, but the elastic properties of hose body 180 tend to pull it back inside the spring coils as water pressure is reduced and the hose begins to retract.

Bulging of the Hose Body Between Spring Coils

The exoskeleton hose design uses a relatively weak hose body placed within a relatively strong exoskeleton spring. The exoskeleton spring then provides radial support for the hose body to keep it from expanding radially. The hose body is strengthened by longitudinal cords places over the entire surface of the hose body. The nature of the exoskeleton spring is such that when it extends, longitudinally gaps are created between the different sections of the spring. These gaps allow the hose body to radially bulge through. However, the amount of bulge is limited by the longitudinal cords that cross these gaps in the spring. If all the radial strength of the hose body is assumed to depend on the longitudinal cords, one can calculate the angle of the bulge depending on the width of the gap.

First lets look at the stress in the hose body in the longitudinal and circumferential directions when pressurized. Longitudinal Stress=(pressure×sectional Area)/Circumference= $(P\pi R^2)/(2\pi R)$=½ PR. Circumferential Stress=(pressure×½ diameter)=PR. From these $$\text{Longitudinal Stress}=\tfrac{1}{2}PR(\text{lb/in}) \quad \text{Eq. 1}$$

Where, P=pressure
R=radius of hose $$\text{Circumferential Stress}=PR(\text{lb/in}) \quad \text{Eq. 2}$$

equations we see that the Longitudinal Stress is half the Circumferential Stress. This means the hose body needs to be twice as strong circumferentially as it does longitudinally. The bulging in the gaps will depend on both the longitudinal and circumferential strength of the hose body. To calculate the bulge angle lets first assume the hose body only has strength in the longitudinal direction because of the longitudinal cords (the actual hose body has strength in both directions but this assumption simplifies the calculations). With all the bulge pressure supported by the tension in the cords, we can assume the circumferential stress to be zero. Thus, the bulge angle is simply the vector angle of the sum of forces due to pressure in the longitudinal and radial directions. In the longitudinal direction force per inch is simply (½ PR). In the radial direction the force per inch across a gap (G), is simply the radially outward pressure times the gap width (PG) with half this force (½ PG) on each side of the gap. Then the initial bulge angle at the sides of the gap is equal to the inverse tangent of the radial force per inch (½ PG) divided by the longitudinal force per inch (½ PR):

$$\text{Initial Bulge Angle}=\text{Tan}^{-1}[(\tfrac{1}{2}PG)/(\tfrac{1}{2}PR)]=\text{Tan}^{-1}(G/R) \quad \text{Eq. 3}$$

Where, the circumferential stress equals zero
R=radius of hose, P=internal pressure
G=width of gap in spring Notice that in Eq. 3, the initial bulge angle at the spring's wire does not depend on the internal pressure (P) within the hose body, only on the radius of the hose (R) and the gap width (G). If the gap width is equal to the radius of the hose then the bulge angle is 45 degrees. For a gap one-half the hose radius the bulge angle is 30 degrees. Thus, a one inch diameter hose with quarter-inch spring gaps will have bulge angles no greater than 30 degrees. If the hose body provides some circumferential strength then the bulge angle will be smaller. Note that the spring biasing somewhat increases the bulge angle because it reduces the longitudinal stress on the hose body and longitudinal cords.

Hybrid Wave-Spring Designs—(FIGS. 11C-E, 12A-B, 15A-B and 16C-D)

One of the two components of a linearly retractable and extendable exoskeleton hose is the special exoskeleton hybrid spring used. This hybrid spring disclosed here, is in itself an invention by the applicant. This hybrid spring design appears to be novel and operates in the reverse mode of existing flat spring or wave spring designs which are compression only springs. The hybrid spring is used in the exoskeleton hose designs because of the unique properties the hybrid spring provides. The springs themselves can comprise any of the presently existing spring materials, such as high-carbon spring steel, spring stainless steel, spring alloys, spring titanium steel, etc.

The hybrid spring examples, disclosed here, have many important and unique properties that standard helical coil springs don't have. First, and the most important, is the unique property of the hybrid spring to allow much more closely spaced coils when fully extended. The coils of a standard helical coil spring of the same overall size and spring constant (spring retracting force per unit length stretched) would require much more widely spaced coils to provide the same retracting force. The more closely spaced coils of the hybrid design provide much better support for the inner hose body by reducing the hose body's ability to bulge out between the coils (see FIGS. 15A-C). Second, the longitudinal thickness of the hybrid spring's coils can also be made much thinner than helical coil spring coils and still provide the same spring constant. Thus, the hybrid spring can have many more coils than a helical coil spring for the same retracting force and length. This allows smaller spacing between coils while still providing a large ratio between extended length and retracted length. The reader should understand that there are many ways of constructing a hybrid spring, below are a few examples.

In FIG. 11C, we see a side-view of exoskeleton spring 154 in its partially extended position. Projected to the right of the side-view is a front view of the spring as if looking from the right-side of the paper. Exoskeleton spring 154 is comprised of a multitude of stacked flat rings 155. Each ring comprises a flat disk about 0.01 inch thick and 0.80 inches in diameter with a central hole about 0.60 inches in diameter. These flat rings 155 are stacked next to each other and bonded together with four sets of bond points 159a-d. Each ring has the four bond points (159a-d), connecting it to its two adjacent flat rings. Bond points 159a and 159c are shown on the top and bottom of hybrid wave-spring 154, respectfully, and bond points 159b and 159d are shown on the left and right side of spring 154, respectfully. Each flat ring is then bonded to one of its adjacent flat ring 155 with bond points 159a and 159c, and bonded to the other adjacent flat ring with bond points 159b and 159d. Thus, each flat ring 155 has two bond point connecting it to each adjacent flat ring, with each side (front and back) of the flat ring connected 90 degrees apart from each other. This results in each ring being bent about its middle along two perpendicular planes when exoskeleton spring 154 is stretched. If additional bonds are used they must be added in pairs (one on the front and one on the back) to provide even strain in the ring on both sides of a bond. The number of allowed bonds on each ring can be written as follows:

$$\text{Total Bonds per Ring}=2n \text{ (``}n\text{'' bonds on each side of each ring)} \quad \text{Eq. 4}$$

where, there are "2n" bond sets for both side of each ring, and "n" is a positive whole number (1, 2, 3, 4, 5, . . . ), so that 2n=2, 4, 6, 8, 10, . . . , respectfully.

In FIG. 11D, we see a side-view of and alternative exoskeleton hybrid flat spring 164 (also called hybrid wave-spring, tension wave-spring, hybrid spring, and exoskeleton spring) in its partially extended position. Projected to the right of the side-view is a front-view of the spring as if looking from the right-side of the paper. Exoskeleton spring 164 is constructed of a single coiled wire spring 165 that is bonded to adjacent turns in a specific way by three sets of bond points 169*a-c*. The term "wire" will be used throughout this patent to define an elongated wire structure that may have any of a number of cross-sectional shapes (i.e. rectangular—the preferred shape, circular, oval, square, etc.). To create springs with higher "spring constants", the same coiled spring 165 can be used with a larger number of bond point sets. Because of the nature of this type of hybrid spring 164, the bond point sets need to come in odd numbers of sets (i.e. 3, 5, 7, 9, etc.) and provides a half number of bonds per turn of the hybrid spring coil. For example, spring 164 has 1.5 bonds per turn because the coils are bonded every ⅔ turn of the coils [1 bond/(⅔turns)=3/2=1.5 bonds per turn]. This creates bonds on the front and back of each coil that are evenly interlaced with each other to provide even strain on each side of the bonds. Note that only half bonds per turn (i.e. 1.5, 2.5, 3.5, 4.5, etc. bonds per turn) provide exactly evenly spaced bonds. Thus, for hybrid spring 164, with 1.5 bonds per turn, each coil (or loop of the spring) will have a total of three bonds on it, either two on the front and one on the back, or two on the back and one on the front. These two versions of coil bonds obviously alternating along the length of hybrid spring 164. For hybrid springs with a larger number of bond sets the bond spacing is simply two divided by the number of bond sets (i.e. bond spacing=2 turns/(bond sets)=turns per bond).

In FIG. 11D, hybrid spring 164 can be made by sending the right side of helical coil spring 165 through a welding system by rotating the helical coils through the welder. The welder would weld the coil presently in the welder to the coil that had just passed through the welder and is adjacent to the coil presently in the welder. For spring 164, helical coil spring 165 would fed counter-clockwise into the welder from the left. After slightly more than one turn of spring 164, the first weld bond 169*a* is made between the second coil and the end of helical coil spring 165 (see the right side of the side-view portion of FIG. 11D). Spring 164 is then rotated counter-clockwise ⅔ of a turn and weld bond 169*b* is made between the second coil and the first coil. Spring 164 is then rotated counter-clockwise ⅔ of a turn and weld bond 169*c* is made between the third coil and the second coil. Spring 164 is then rotated counter-clockwise ⅔ of a turn and a second weld bond 169*a* is made between the fourth coil and the third coil, and the process continues repeating down the length of helical coil spring 165, converting it to hybrid spring 164. This gives the spring an average of 1.5 bonds placed per turn of the spring or 3 bonds per turn (3 bond sets) counting both sides of the turn). If a hybrid spring with 2.5 bonds per turn is desired (5 bond sets), then the welder would need to make a weld bond every ⅖ of a turn of helical coil spring 165. The same rules would apply if even greater numbers of bond sets were desired. These rules can be written as:

$$\text{Total Bonds per Turn} = 2(n+\tfrac{1}{2}) \text{ (Averaging } (n+\tfrac{1}{2}) \text{ bonds placed per turn)} \quad \text{Eq. 5}$$

where, the total number of bond sets equals $2(n+\tfrac{1}{2})$ sets
"n" is a positive whole number (1, 2, 3, 4, 5, . . . ),
so that $(n+\tfrac{1}{2})=1.5, 2.5, 3.5, 4.5, 5.5 \ldots$ , respectfully.

Both hybrid wave-springs 154 and 164, as well as the others, can be tailored to provide the desired spacing and the desired spring constant within a wide range. This is because both the longitudinal thickness of the wire and the number of bonds per turn can be adjusted. These two factors both effect the spring constant of the final spring and thus can offset each other. For example, the wire thickness can be reduced in half for spring 164, which reduces the spring constant of the spring by one-half, but also doubles the maximum ratio of extended-to-retracted lengths to about twenty. If however, the number of bonds is increased from 1.5 to 2.5 per turn, the spring would again have approximately the same spring constant as hybrid spring 164, even though the wire is now longitudinally half as thick. Going from 1.5 to 2.5 bonds per turn will also reduce the extended-to-retracted ratio back to about 10-to-1 and the maximum spacing between the wires to 0.10 inches from 0.20 inches for hybrid spring 164 (the spring now has twice as many turns in the coil). Thus, modified hybrid springs can be made with very tiny spaces between adjacent turns of the wire simply by reducing the wire thickness and increasing the number of bonds while still retain the same spring constant as a spring with a much thicker wire. In this way, the user can tailor the hybrid spring's spacing between adjacent turns, spring constant, and a maximum extension ratio simply by adjusting the longitudinal wire thickness, radial thickness, and number of bond points per turn. While in theory, the spacing between turns could be made incredibly small, there is a point where the longitudinal thickness of the wire will get too thin to justify the increased number of bond points and the difficulty of making these bonds. In short, the multiplicity of bonds between adjacent coils of the helical spring 165 at regular intervals, will result in both the radial strength, and the retracting force strength of the spring to increased substantially above what helical spring 165 could do without the multiplicity of bonds.

In FIG. 11E, we see a hybrid spring 174, which is very similar in construction to hybrid spring 164 seen in FIG. 11D. Hybrid spring 174 has the same physical layout as hybrid spring 164, with a helical coil 175 and three sets of bond points (179*a*, 179*d*, 179*g*), (179*b*, 179*e*, 179*h*), and (179*c*, 179*f*). However, the bond points within each bond set of spring 174 are slightly offset circumferentially from the preceding bond point in that set. For hybrid spring 164, each of the three sets of bond points where aligned longitudinally with the spring. This arrangement of 1.5 bond points per turn resulted in even strain in the spring coils on both sides of bond points. For spring 174, the spacing between bond points is slightly off-center so that the circumferential distance between adjacent bond points alternates between two or more values. This creates an uneven strain in spring coil 175. The spring coil material between the shorter spaced bond points (179*b-c*), (179*d-e*), and (179*f-g*) have greater strain because of this spacing which ultimate reduces the elastic range (non-deformed extended-to-retracted ratio) of hybrid spring 174. However, if the offset is small, the difference in spacing is small and thus the loss in elastic range will also be small. The spring coil material between the longer spaced bond points (179*a-b*), (179*c-d*), and (179*e-f*) have less strain because of the wider spacing between these bond points.

In FIG. 11E, the offset nature of the bond points can be used to provide at least two useful properties to hybrid spring 174. The first property is that the bonding method used for bond points can increase the longitudinal thickness of the coils at the location of the bond points (see FIGS. 16C and 16D). This thickening can be the result of straps, indented sections to form adhesive pockets and other bonding methods. By offsetting the bond points circumferential locations the effect of this thickening can be reduced and allow the hybrid spring to retract more fully and increase its extended-to-retracted length ratio. The second useful property is that a consistent offset direction for the bond points, like that seen in hybrid spring 174 (FIG. 11E), will result in a net torque along its longitudinal axis when the spring changes length. This is useful, because this torque can be used to counteract an opposing torque created by the helical shape of the hose body when it is extended (see hose body 180 in FIGS. 13A-B). Thus, such an exoskeleton hose can be tailored to provide nearly zero longitudinal twist of the hose when it expands and contracts. This is useful because it means the hose does not twist in the user's hand as it expands and contracts and thus eliminates the need for pivot joints at the ends of the hose to keep garden nozzles from spinning during extension and retraction.

Spring Bias and Retraction Force (FIGS. 12A-B)

In FIG. 12A we see hose 150 from FIG. 11A-B in a graph showing how the spring tension of hybrid spring 154 relates to the expansion length of exoskeleton hose 150. The values shown in FIG. 12A are just for example and many other tension values can be obtained by proper selection and design of the hybrid spring (see FIG. 12B) and hose cover material. At the top of the graph we see exoskeleton hose 150 with hybrid spring 154 in its "natural state" fully retracted state, that is, no external forces exerted on it. In this "natural state" spring 154 has no tension in it (−0 lb, no internal biasing of the spring). Below this retracted example, in FIG. 12A, we see hose 150 in its "fully extended" position with spring 154 in its fully extended state. Notice that the maximum length that hose 150 can reach is limited by the maximum extended length of hose body 180 for this example. In practice, either spring 154 and/or hose body 180 could provide the longitudinal stopping strength. Alternatively, additional component(s) can be used to provide the needed longitudinal strength for the longitudinal stopping means for the exoskeleton hose. Hose body 180 and spring 154 are designed to have approximately the same ratio between their extended and retracted lengths. Because hose body 180 is made of an elastic material (i.e. vinyl), some of its extension ratio can come from folding of the hose body material, and some can come from actual elastic stretching of body 180 in the longitudinal direction after unfolded.

In FIG. 12A, when hose 150 is extended to twice its natural length, the retracting force is 0.5 pounds as seen on the "Spring Tension" scale. The negative sign signifies that the bias force is trying to compress (retract) the hose longitudinally. In FIG. 12A, hose 150 is shown in both its fully retracted state, and its fully extended state. On the "Spring Tension" bar we see that four and one-half pounds (4.5 lb) of force is needed to overcome the spring tension within the hose when it is fully extended to ten times (10×) its original length. The fully extended spring tension force of negative four and one-half pounds (−4.5 lb) does not take into account any additional biasing forces that may be caused by the hose cover material (hose body 180) itself. Notice that the force generated by the spring increases linearly, which is typical for simple helical coil springs and also hybrid springs. The "Length Expansion Ratio" bar shows the different expansion ratios for pressure hose 150, normalized to the natural retracted length of spring 154. From this graph, we see that four and one-half pounds (4.5 lb) of pressure force on the ends of hose 150 is needed to overcome the spring's bias (bias force) when fully extended to ten times the springs natural length. These forces are relatively easy to obtain with a typical household water faucet that usually has a working pressure between 40 and 80 pounds per square inch (psi). Thus, for a hose with close to a one-half square inch cross-section, only a small fraction of the actual water pressure may be needed to forcefully extend hose 150 and keep it fully extended while in use. A typical spray nozzle will provide sufficient restriction in the water flow to provide sufficient pressure to extend the hose. For areas with low water pressure or for uses requiring small back-pressures, a lighter biasing spring can be used.

In FIG. 12B, a biasing spring 154b is used in hose 150b to provide a different biasing output from that seen in hose 150 with spring 154. In this example, hose 150b and spring 154b are substantially the same size, shape and construction as hose 150 and spring 154. Spring 154b however, includes a small pre-stress bias built into it when it was made. On the spring tension bar in FIG. 12B, notice that spring 154b has one pound of tension (−1.0 lb) in its natural state, while spring 154 had zero. This pre-stress allows spring 154b to provide a strong retracting force even when the hose is fully retracted. Hose 150 had no pre-biasing so its retracting force went to zero in its fully retracted position. Spring 154b, however, has been bent (pre-stressed) to have a retracting force of one pound (−1.0 lb) even when hose 150b is fully retracted. Both springs 154 and 154b can be made from the same original flat rings 155, have almost the same maximum expansion ratio, and have the same force difference between fully retracted and fully extended positions. The science of spring biasing and manufacture is well known, and these two examples of spring biasing are only meant to be examples of how one might adjust a hybrid spring to suit specific requirements for the user. May other ways exist of using different "spring constant (k)" and different pre-biasing for the spring, to provide the desired range of forces for a specific application. Note that any spring can be pre-stressed in a similar way. Also, notice that the spring constant of hybrid spring 154b can be reduced so that its retracting force when fully extended is 4.5 pounds, the same as spring 154. This effectively provides a more stable retracting force throughout the full range of hose 150b. The use of hose body 180b in this example provides substantially the same properties as using would hose body 180, and its use just as an example.

Hose Body Construction (FIGS. 13A-D, 15A-C, & 16A-B)

In FIGS. 11A and 11B we see a side-view of a first preferred embodiment of improved linearly retractable hose 150. FIG. 11A shows hose 150 in its retracted position, and FIG. 11B shows the hose in a partially extended position. As we have already seen, hybrid springs 154 and 164 can extend and retract by a ratio of 10-to-1. Because of this, hose body 180, mounted within spring 154 must also be able to longitudinally extend and retract by a factor of 10×. Special care in the design of hose body 180 is needed to achieve this 10-to-1 ratio without overly stressing the material that hose body 186 is made from (see FIG. 13A) or making its wall too thin that it ruptures even when supported by the hybrid spring. Hose body 180 is designed to work in concert with hybrid spring 154 so that it can withstand normal household water pressure. The closer the spacing between adjacent rings in hybrid spring 154, when it is fully extended, the easier it is for hose body 180 to contain the water pressure. Thus, there is an advantage to reduce the longitudinal thickness and cell spacing of the hybrid springs. However, at some thickness, the rings (spring 154) and turns (springs 164, 174, 200, and 210) become too thin to effectively bond and/or require too many bonds to be practical.

In FIGS. 13A. and 13B, we see hose body 180 in its partially extended and retracted positions, respectfully. Hose body 180 comprises a helical-shaped tube 186, and a plurality of strengthening cords 182. Helical-shaped tube 186 is shaped so that it can easily extend and retract longitudinally as seen in the contrast between FIG. 13B (hose body 180 substantially retracted) and FIG. 13A (hose body 180 partially extended). Cords 182 provide a substantial longitudinal strengthening means for hose body 180 and are shown in FIG. 13A as substantially bonded to the outside of tube 186. While cords 182 are shown in FIG. 13A molded on the exterior of tube 186, these cords preferably would be molded completely within the polymer material making up the hose body as seen in FIG. 13C. With cords 182 molded within tube 186 they would be less likely to be damaged by abrasion and other means, and they cannot pull away from tube body which would reduce their effectiveness at providing longitudinal strength.

In FIG. 13A, we see that tube 186 has a general helical-shape comprising a helical-shaped valley 187 and a helical-shaped ridge 188 that spiral together along the length of tube 186. Tube 186 is made of a flexible polymer material (i.e. vinyl, urethane, etc.) that is very flexible to allow the hose body to be compressed and expanded easily in the longitudinal direction. This helical shape allows valley 187 to fold under ridge 188 as hose body 180 retracts to its substantially retracted position seen in FIG. 13B. This folding of the hose body can provide a longitudinal expansion and retraction ratio of 10× or more. Note that the volume within hose body 180 increases by approximately the same factor as its length.

Figures 13B, 13D:
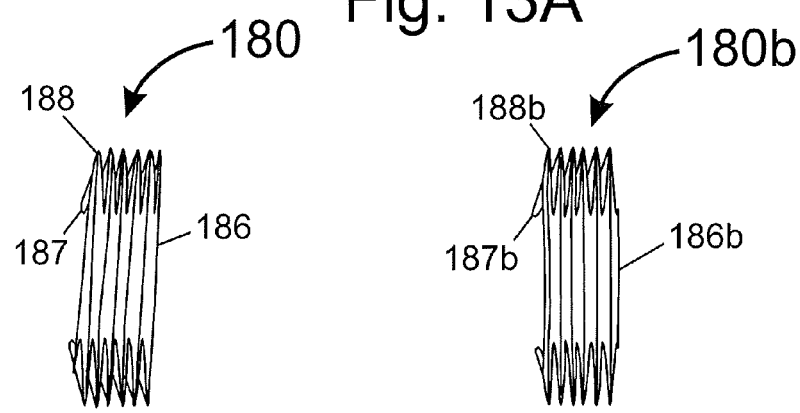
FIG. 13C-D Perspective view of Linearly Retractable Pressure Hose Body 180b partially sectioned. The helical shaped hose body 180b is shown extended in FIG. 13C and retracted in FIG. 13D.
Figure 13C:
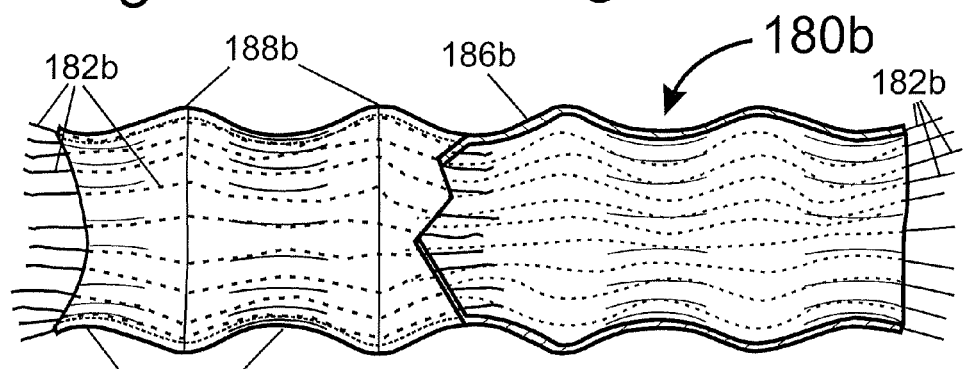

In FIGS. 13C and 13D, we see alternative hose body 180b in its partially extended and retracted positions, respectfully. Hose body 180b comprises a corrugated or pleated tube 186b made of vinyl, and a plurality of strengthening cords 182b made of polyethylene fibers. Tube 186b is made from vinyl because of vinyl's high flexibility, low embrittlement temperature (well below the freezing point of water), good abrasion resistance, very good ultraviolet radiation resistance, good elasticity, and good strength. Tube 186b is shaped with alternating large and small radial diameters along its length to allow the hose body 180b to fold up longitudinally much like hose body 180 previously discussed. This alternating between large diameters 188b and small diameters 187b allows the hose body to easily extend and retract longitudinally as seen in FIGS. 13C and 13D, respectfully. The smaller diameter sections 187b fold under the larger diameter sections 188b, with smaller sections 187b folding circumferentially (similar to folded section 187 in FIG. 15A) as hose body 180b retracts and tries to compress sections 187b radially inward. While vinyl is the material of choice for convoluluted and corrugated tubes 186 and 186b, respectively, many other known polymers, mixtures, and methods can be used and provide approximately the same properties as vinyl.

Cords 182b provide a longitudinal strengthening means for hose body 180b and are shown in FIG. 13C substantially molded entirely within the polymer material comprising tube 186b. With cords 182b molded within tube 186b they are less likely to be damaged by abrasion and sharp objects, and they cannot be pulled away from the tube body. Thus, hose body 180b is potentially a much more durable structure than hose body 180, not because of its shape, but because of the internal placement of strengthening cords 182b. Cords 182b can be made from a number of different high-strength fiber materials, such as, nylon, polyester, polyethylene, polypropylene, etc. Care must be taken to select fibers that retain their strength at high temperatures, because during use, the hose can experience temperatures of 170 degrees Fahrenheit in direct sunlight.

In FIGS. 15A and 15B we see hose body 180 sectioned along the longitudinal axis 189 of hybrid hose 150. In FIG. 15A, hose body 180 is compressed longitudinally along with hybrid spring 154 so that exoskeleton hose 150 is substantially in its fully retracted position. The outer ridge 188 of hose body 180 is in contact with the inner surface of spring 154. A slight outward pressure can be exerted by ridges 188 to keep them in position within spring 154. As hose 150 expands (lengthens longitudinally), ridges 188 tend to remain in contact with the interior of hybrid spring 154 and provide smooth expansion of both spring 154 and hose body 180. If ridges 188 are not exerting outward pressure on spring 154 (outside diameter of ridge 188 is smaller than inside diameter of hybrid spring), as soon as fluid pressure is introduced into hose body 180, hose body 180 will tend to expand and press against the interior of hybrid spring 154. This outward pressure will increase as the pressure within the hose body is increased and hose 150 extends due to this pressure.

In FIG. 15B we see exoskeleton hose 150 extended by internal pressure to its fully extended length. Cords 182 (not shown in FIG. 15B, keep the drawing uncluttered, see FIGS. 13A & 15C) have become taught on the exterior of hose body 180 and stopped further longitudinal extension of hose 150. With full fluid pressure within hose body 180, the valley sections 187 have stretched outward against the interior surfaces of hybrid spring 154 and cause hose body 180 to bulge outward slightly between the gaps in spring 154. Cords 182 (not shown in FIG. 15B) help maintain radial strength of hose body 180 by providing support across the gaps in hybrid spring 154.

In FIG. 15C, we see hose 150 sectioned along a radial plane (see cut line in FIG. 15B), and looking at the cross-section in the longitudinal direction (hose 150 extends into the page). Spring 154 is shown at the top of the drawing supporting hose body 180 radially, with cords 182 running into the page and supporting tube material 186 between adjacent turns of spring 154 (between the spring sectioned shown and the next ring behind it (not shown)). Cords 182 are drawn tight with hose 150 fully pressurized as seen in FIG. 13B, and greatly reduce how much hose body 180 can bowing outward between the gaps in hybrid spring 154.

In FIG. 15C, cords 182 do not have to lie parallel to the longitudinal axis of the hose body as shown. Instead the cords can be made to spiral around the longitudinal axis in either direction (left-handed, or right-handed). This angling of the cords provides an axial twist along the length of the hose body that can be used to counteract the axial twist generated by the hose.

In FIG. 16A-B, we see an alternative hose body design comprising helical support wire 195 and a flexible hose body 190. FIG. 16A, shows a longitudinal section view of hose body 190 (looking from the side of the hose body) in its fully compressed position. FIG. 16B shows a transverse section view of a portion of hose body 190 and wire support 195 looking along the longitudinal axis as marked in FIG. 16A. Helical-shaped support wire 195 comprises a spring steel wire 198 and a polymer coating 197. Hose body 190 comprises outer layer 194 with longitudinal support cords 192, and main body 196. Support wire 195 is bonded to hose body 190 with a bonding interface 199 between polymer coating 197 on the wire and main body 196. Bonding interface 199 forms a generally helical path that follows wire 195. During manufacture, support wire 195 is used to provide a structural framework for main body 196 to be extruded onto the helical shaped wire with the edges of the extrusion sealed along its edges to form a sealed tube. Heat from the extrusion process melts polymer coating 197 and bonds it to main body 196 at interface 199. The shape produced for hose body 190 is very similar to the other hose body designs discussed here. However, the presents of helical wire 195 reduces the potential extension ratio of hose body 190 because of the added thickness of the wire. Longitudinal support cords 192 can be bonded to the exterior of main body 196 with a polymer layer 194 coated over support cords 192. Polymer layer 194 can be bonded to main body 196 by thermal melting or other bonding means. Operation of hose body 190 would be substantially the same as the operation of other hose bodies discussed in this patent.

Alternate Hybrid Spring Designs (FIGS. 16C and 16D)

In FIG. 16C, we see an alternative hybrid tension wave-spring 200 (also called tension wave-spring, hybrid spring, and exoskeleton spring), which is very similar to hybrid springs 164 and 174. However, in this example, three different types of bonds are used to demonstrate some of the bonding methods one might use. Spring 200 is made from a single piece of helical shaped spring steel wire that comprises three different types of bonds 202, 204 and 206. Bonds 202 comprise straps that are wrapped around adjacent turns of helical wire 205 to bind them together. Bonds 204, comprise an adhesive means between adjacent turns to bind them together. Bonds 206 comprise spot welds on the inner and/or outer edges of the turns to bind them together.

In FIG. 16C, strap bonds 202 can comprise a strap that is fastened around adjacent coils on helical coil spring 205 to bind those coils together. Strap bonds 202 can comprise a wire wrapped multiple times around the adjacent coils. Straps 202 can be made of a metal alloy, polymer, or other strong resilient material. By using the straps, the strength and elasticity of the original helical coil spring 205 is not compromised. Because straps 202 have a significant thickness, straps 202 are shown here staggered to reduce the retracted length of the hybrid spring. Adjacent straps do not rest on one another but fit side by side, thus reducing the space between adjacent coil pairs to one thickness of the strap. If straps 202 were aligned then there would be a two strap thickness space between each coil pair.

In FIG. 16C, adhesive bonds 204 can comprise any of a number of adhesives that provide strong bonding between adjacent metal coils of helical spring 205 to bond those coil layers together. Many adhesives exist that are water-proof, strong and very durable. Because the actual loads that the hybrid spring will experience are quite small (approximately five pounds), the bond need only be resilient and very durable. Many adhesives now being looked at for bonding automobile parts together would work well in this application. The adhesive bonds 204 can comprise a flexible support material (not shown), such as, a thin rubber or polymer sheet, where the adhesive is applied to both sides of this support material. Such support material gives bonds 204 more resiliency and reduces the maximum stress on the adhesive when hybrid spring 200 is stretched longitudinally. That is, the deformation of spring material 205 produces much smaller stresses in the adhesive layer (bonds 204) when the support material can deform with the spring.

In FIG. 16C, welded bonds 206 can comprise one or more weld points where adjacent coils on helical spring 205 are fuse together. These welds can comprise many different types of welds and with various welding methods. For instance, weld bonds 206 might be spot welds done by laser, induction heating, arc welding and/or other means. The welds can be ultrasonic welds using high-frequency vibrations to bond the adjacent coils. Welds 206 must be done in such a way that the spring metal that coil 205 is made of is not weakened. This means the area of thermal heating should be kept as small as possible, and the amount of time spent heating the weld area kept very short. Heat can very quickly weaken the spring steel and other spring metals which helical coil 205 might be made. Because of the very thin nature of the coils (approx. 0.01 inches), the welds will be very small and thus cool very quickly. This potentially can leave most of the coil's cross-section unchanged and retaining its spring steel properties.

The reader should note that each of the three bonding examples, in FIG. 16C, can also be used in hybrid springs formed of rings also (see FIG. 11C). The rings can have similar cross-sectional dimensions to helical coil spring 205 and can thus be bonded by the same methods. Thus, straps, adhesives and welded bonds would work with ring shaped "wires" just as well as with helical shaped "wire". In short, the multiplicity of bonds between adjacent coils of the helical flat-spring 205 will result in both the radial strength, and the strength of the retracting force of the spring to increase substantially above what helical flat-spring 205 could do without the multiplicity of bonds.

In FIG. 16D, we see hybrid spring 210 (also called hybrid wave-spring, tension wave-spring, and exoskeleton spring) which can be very similar to hybrid spring 200 in both material, shape and spring constant. The bond points, however, comprise an adhesive means 219 placed between adjacent coils on helical spring 215 to bond those coils together. Left and right indentations 212 and 214, respectfully, provide a stable location for the adhesive means to attach between the spring's coils. Indentations 212 and 214 also allows the thickness of the adhesive means 219 to be partially compensated for by staggering the circumferential placement of the indentations 212 and 214, and adhesive means 219, as seen in FIG. 16D. The adhesive means 219 and indentations 212 and 214 can be made very narrow circumferentially because the forces involved with the spring are relatively small and very good adhesives exist for bonding to metals.

In FIG. 16D, the adhesive means 219, can comprise any of a number of adhesive bonding methods including comprising an adhesive layer, pad or strip of adhesive material. For example, adhesive means 219 might comprise simply a flexible adhesive material that is sprayed, rolled and/or extruded into the indentations 212 and 214. Another example would be to have a flexible pad of substantial thickness with adhesive on both sides. The flexible pad provides resiliency to the adhesive so stress at the edges of the adhesive pad can remain low even when the spring is fully stretched, and the spring coils in that location is no longer perfectly parallel. Alternatively, the notch indentations can be made into the shape of a pocket so that side walls of that pocket provide additional stiffness to the spring coil in the area of the pocket indentation. With such a pocket indentation, less strain occurs near the adhesive means 219 and the adhesive means can be less resilient and still experience low stresses. As with the other bonding methods shown here, this bonding method can also be used with hybrid springs made of bonded rings (see FIG. 11C).

Operation of Improved Linearly Retractable Hose

The extending and retracting of the improved linearly retractable and extendible hoses shown in this document are operated substantially the same as prior art linearly retractable pressure hoses. The improved linearly retractable hoses disclosed here, however, does cause the flexible elongated hose body to fold differently than prior art designs, decreasing the retracted hose volume and protecting the hose body form damage. The subtle differences in operation of some of the disclosed linear retractable hoses will be discussed here. The first operational description will use the examples seen in FIGS. 6A, 4B, 6B and 6C, in that order.

In FIG. 6A, we see linearly retractable pressure hose 90 in its fully retracted position, with the hose body (layers 94 and 95 folded inside the helical spring 96. This fully retracted position is the normal unstressed state of the linearly retractable pressure hose. No pressurized fluid has been introduced into the interior channel to pressurize the hose. Once connected to a fluid source and fluid is forced under pressure into the interior of hose 90, the pressure within hose 90 begins to increase just from friction of the fluid moving against the walls of the hose. A restricting device on the dispensing side of the hose restricts the flow of fluid out of the hose, thereby causing the pressurized fluid to backup in the hose and the internal pressure to rise. {The dispensing end of the hose itself can be designed to have a minimum amount of restriction necessary to cause hose 90 to reach a minimum extended pressure (pressure $P_2$) sufficient to substantially fully extend the hose.} As internal pressure rises in the hose, eventually the longitudinal extending force created by fluid pressure overcomes the spring biasing force trying to retract the hose. When this happens the hose begins to extend as fluid begins filling it.

In FIG. 5A, we see what a linearly retractable pressure hose might look like between its retracted and extended positions. Notice that the indented groove 84b is still slightly crumpled or corrugated at the bottom of indentation 84b, and still has a radius slightly less than it will have when the hose is fully extended. The other hose designs disclosed in this document would function approximately the same way.

In FIG. 6B we see hose 90 after fluid pressure has continued to expand the hose longitudinally to its substantially fully extended length. The change in length 99a represents the change in length caused by this pressurization of the interior channel of hose 90. Attachment and sealing layer 95 keeps the fluid from escaping and hose body while also providing some structural support to the hose body. Once extended user can operate hose 90 just like any other hose (i.e. garden water hose, air hose, gas hose, etc.) which is flexible but does not change length substantially during use.

In FIG. 6C we see that hose 90 can continue to lengthen slightly if additional pressure is applied. In most cases this additional extension is small as signified by small distance 99b. This added increase in length is a result of the indented portion of the hose body stretching slightly outward to a diameter 99e, which is nearly the same as the diameter of the hose material at its attachment point on the spring. This makes the interior surface (layer 95) of the hose more nearly cylindrical so that fluid can flow more easily through the hose. This stretching can be seen in the increased separation distance 99d between the coils of spring 96 so that the hose material between them is nearly straight.

When the user is finished and the fluid pressure is released from the interior of the hose, the spring biasing of spring 96 tends to retract the hose back to its retracted state as seen in FIG. 6A. Depending on the strength of biasing spring 96, the hose may be able to physically drag itself back to this fully retracted position. For weaker spring biasing some help may be needed to get it fully back to its retracted position.

Flow Restriction for Linearly Retractable Hoses

As with prior art Linearly Retractable Water Hose designs, the improved hose designs here can still require a restricting nozzle, adaptor, or watering attachment at the dispensing end of the hose to insure sufficient pressure within the hose to maintained the hose in its extended position. With a light spring bias, little or no restriction at the hose's dispensing end is needed. The user can actually stretch the hose themselves if a light enough spring bias is use, and/or friction of water flowing through the hose can generate sufficient pressure buildup within the hose to cause it to extend. However, if a stiff spring biasing means is used, some back pressure within the hose is desirable to keep the hose from pulling on the user during use. Nearly any water hose attachment, like a spray nozzle, or a water sprinkler, will produces significant back pressure within the linearly retractable hose to extend it even if it has very stiff spring biasing. In prior art designs, the dispensing end of the linearly retractable hose can include a restriction built directly into that end of the hose. This insures that sufficient back pressure is generated at all times during use. This keeps the hose extended for use, independent of what garden hose attachment, or lack of attachment, might be engaging the dispensing end of the linearly retractable hose. Care must be taken to not overly restrict water flow at the dispensing end so that insufficient water flow remains to supply water in the desired quantities. The restriction may also be accomplished with a twist on extension, which can be screwed on and off the dispensing end of the linearly retractable hose to provide the restriction in water flow or not providing a restriction to water flow, respectfully. Advantages to not providing a built in restriction is that several Linearly Retractable Hoses can be connected together without the multiple pressure loss caused by a water flow restriction on each hose segment. By leaving the Linearly Retractable Hose as unrestricted as possible, several hoses can be combined while still provide good water pressure at the end. A single restricting means (hose attachment) could then be removably connected to the final hose end in the series of connected hoses to create a back-pressure that extend all the hoses.

Many different means for creating a fluid flow restriction are possible. Multiple constrictions may be used, and may be placed along the length of the hose or may be placed near the end of the hose, for the purpose of creating a restriction on fluid flow. This in turn, will create a back pressure within the hose to help keep it extend during use. The user can control the extending and retracting of the hose by simply controlling the rate of flow of fluid at the source, (i.e. by turning a water faucet, or water outlet, on and off, respectfully), and/or by controlling the amount of flow restriction present at the dispensing end of the hose.

Exoskeleton Biasing Springs

Many types of spring shapes can be used, not just different spring cross-sections, but also other types like a wave-spring. A wave-spring constructed of individual spring steel rings welded together at alternating positions on the rings to form a mesh like structure when the spring is stretched. Similarly, a wave-spring can be constructed of a single coiled strip bonded at intervals so that the bond points alternate and again allow a mesh-like pattern. These wave-springs can then be used as a biasing means for a hose body having a helical and/or ring shaped indentation along its surface to provide retracting room for the improved linearly retractable pressure hose. Attachment of such a hose body to the wave-spring would have to be modified so that the hose body only attaches at specific points on the wave spring. This is because a wave spring does not evenly space the expansion of the spring material (rings or coil) as it is stretched. Thus, the hose body may include attachment rings mounted to the hose body at its major radius portions to mount to the wave-spring and help distribute force from the wave-spring to the hose body. In general, each such attachment ring may only attach at one or two places on the inside of the wave-spring. If a helical shaped hose body is used with a helical attachment ridge on the major radius, then the helical attachment ridge would attach at regular intervals to the wave-spring.

Operation of Woven Covered Hoses (FIGS. 8A, 9A-B, 10A-C)

In FIGS. 8A-B, and 9A, we see linearly retractable pressure hose 130 in its retracted and extended positions, respectively. While the operation of the hose as a whole is essentially the same, there are added structures to this design that provide added functions for the hose. Let's first consider abrasion ridge 137 which runs along the ridge formed by biasing spring 138. In both the retracted position, FIG. 8A and the extended position FIG. 9A, abrasion ridge 137 provides a abrasion surface for the hose to protect the structural woven layer 134 from abrasion. Since hose 130 is essentially a tube when being used, any dragging and pulling of the hose across a surface will tend to wear on these ridges. Since the hose body is molded over the outside of spring 138, if layers 134 and 136 are worn away at ridge 137 the hose will be weakened and then fail. Thus, abrasion ridge 137 extends the life of hose 130 in high wear environments such as use as a pool cleaning hose.

The nature of support layer 134 is that it tends to keep the indentation between the spring's coils indented even under high-internal pressure. This is accomplished by weaving support layer 134 with a smaller diameter than spring 138. The helical shape created by the combination of spring 138 and hose body portion 136 has a substantially constant cross-sectional diameter. This woven cross-sectional diameter is substantially smaller than the outside diameter of the spring's coil. This is possible because the ridge on one side of the hose matches up with the indentation (or trough) between the coils on the other side. Thus, a roughly constant circular cross-section exists that spirals down the length of the hose. Where this circular cross-section is smaller in diameter than the outside diameter of spring 138. When hose 130 is pressurized, support layer 134 tries to straighten out which tends to squeeze spring 138 radially to reduce its diameter. If the fibers within layer 134 are angled correctly the tendency of the spring to expand under pressure and the tendency of support layer 134 to compress the spring radially will balance and the hose will tend not to twist about its central longitudinal axis (axial twisting). Experimental hoses show that this can be done with fibers 134 oriented as shown in FIG. 9A. A left-handed twist of fibers at thirty degrees to provide longitudinal strength, and a set fibers with a right-handed twist at sixty degrees (when fully extended) provide the radial strength. These angles seemed to provide a very stable hose, which showed no axial twisting for pressures between zero and sixty pounds per square inch. Note that the right-handed fibers twist in the opposite direction of the left-handed spring coil. This tends to pull the coils into a smaller diameter as the hose stretches longitudinally. The result of these forces is that hose 130 forms a nearly cylindrical hose when pressurized. This provides a nearly constant diameter hose for transporting a fluid. This constant diameter means there is less turbulence in the fluid flow within the hose and thus less drag friction on the fluid so less pressure drop in the hose than if it remained helical shaped.

In FIG. 9B, we see that alternative fiber positions are possible. Hose 130e has two support layers 136a and 136b. In this example fibers within layer 136a are oriented at sixty degrees with a right-handed twist (counter to spring 138 when hose 130e is extended). Layer 136b has fibers oriented nearly parallel with the longitudinal axis to provide longitudinal strength to resist fluid pressure. As pressure is introduced into hose 130e, the sixty degree fibers 133e in layer 134e provide a radially compressive force on spring 138 and thus helps diminish axial twisting of the hose. At the same time longitudinal fibers 135e provide longitudinal strength to prevent the hose from over expanding in the longitudinal direction. The tailoring of the angle of fibers 133e and their weave diameter can be used to minimize the axial twist experienced by hose 130e as it is pressurized.

In FIG. 10A we see hose 130f with fibers oriented at sixty degrees in both the left and right-handed directions. This is the optimal angles for resisting purely hydraulic internal forces on the hose. Thus, as the hose is pressurized, pressure will not tend to change the angles of the fibers but will tend to straighten the woven layer 134c into its natural cylindrical shape, while maintaining its diameter. Thus, spring 138 will tend to be compressed radially to conform to the smaller-diameter, cylindrical-shape of the pressurized woven layer 134c. Both fibers orientations would tend to compress the spring radially as internal pressure is applied. Both sets of fibers provide approximately the same longitudinal and radial support for hose 130f as it is pressurized.

In FIGS. 10B and 10C, hoses 140 and 141 would operate essentially the same as other hoses disclosed here, with fibers reinforcing providing the means to resist axial twisting and provide radial and longitudinal tensile strength. However, hoses 140 and 141 have their interior sealing layers 146a and 148a molded on the interior of biasing spring 138. This allows inner layers 146a and 148a to form a smoother hose interior when pressurized than the other designs. When pressurized, inner layers 146a and 148a would shift shape to more nearly conform to a smooth cylindrical shape instead of the shown helical shape. With exterior fibers 144b and 147b tensioned properly to the correct diameter, expansion of the inner layers 146a and 148a, respectfully, can be stopped when the hoses are nearly shaped like a smooth straight cylindrical tube.

In FIG. 10C, hose 141, parallel fiber layer 147a and perpendicular fiber layer 147b tend to be directed along the lines of stress in layers 148a and 148b. With fibers 147b in layer 148b wound to the correct diameter, layer 148a will expand when pressurized to form a nearly straight cylindrical tube. This shape is optimal for the flow of water through the hose. Notice that spring 138 in hoses 140 and 141 is not an obstruction to fluid flow as it is in hoses 130, 130e and 130f. Thus, hoses 140 and 141 can provide better fluid flow than the other designs presented thus far.

Operation of Exoskeleton Pressure Hose
(FIGS. 11A-C, 13A-D, 14A-B, & 15A-C)

The operation of the exoskeleton pressure hose requires that the exoskeleton spring on the exterior expand and contract longitudinally with the hose body on the interior. The designs shown can accomplish this without any "hard" bonding between the hose body and the exoskeleton spring. However, bonding or other secure contact points between the hose body and the spring can be used if desires.

Looking at FIGS. 11A and 11B we see the general operation a typical exoskeleton pressure hose 150. The reader should note that similar operation will result with other exoskeleton pressure hoses, using any of the shown exoskeleton springs combined with any of the shown hose bodies. With exoskeleton hose 150 in its retracted position shown in FIG. 11A, hybrid spring 154 provides a retracting force holding it in that retracted position. When a pressurized fluid (not shown), such as water, is introduced into faucet connector 152, the water flows into hose 150 and increases the pressure within the hose above ambient pressure if there is sufficient restriction at nozzle connector 158. This increase in internal pressure caused both a radial force and a longitudinal force on the hose. The radial pressure presses hose body 180 outward against spring 154. The radial strength of spring 154 stops this expansion of the hose body and longitudinal cords within hose body 180 (see FIG. 13A) help keep the hose body from expanding much beyond the interior surface of hybrid spring 154. Internal pressure on nozzle connector 158 and a nozzle (not shown), causes a longitudinal force on the hose which tends to force the faucet connector 152 and nozzle connector 158 apart. As internal pressure within the hose increases this longitudinal force on the two ends of the hose increases until finally the longitudinal force overcomes the spring biasing of spring 154, and hose 150 begins to expand linearly along its longitudinal length. FIG. 11B shows hose 150 in a partially extended position with hose body 180 nearing its fully extended state. As internal pressure continues to increase, hose 150 eventually reaches its maximum length, where longitudinal cords 182 become taught and faucet connector 152 and nozzle connector 158 can no longer move freely move further apart. Thus, further increases in the length of hose 150 would require increases in pressure to stretch cords 182. Since cords 182 are designed to be relatively strong, they do not stretch substantially with this increase in pressure. With the hose fully extended and pressure within hose body 180, the hose is ready to be used.

After use, water pressure can be turned off to faucet connector 152 and pressure drained from nozzle connector 158. As water exits connector 158, the internal pressure within hose body 180 drops back toward ambient pressure and the spring biasing generated by hybrid spring 154 causes a net retracting force on hose 150. This spring tension tends to pull hose 150 back toward the position seen in FIG. 11A. As it returns back to the position seen in FIG. 11A, spring tension creates a positive pressure within hose body 180 which forces the remaining water out nozzle connector 158. Eventually, most of the water within hose body 180 is forced out the open end of nozzle connector 158 and hose 150 returns to its fully retracted state (FIG. 11A). This completes one full operational cycle of hose 150. Turning on water pressure again at the faucet connector 152, causes hose 150 to extend again for use. Turning off water pressure, causes hose 150 to retract again back to its retracted position when either end of hose 150 is opened to the environment.

The operation of other combinations of exoskeleton springs and hose bodies operate in essentially the same way as described above. Properties, such as, adjusting the spring's biasing force to provide relatively constant biasing force (prebias), and adjusting the magnitude of the spring's retracting force can be accomplished without changing the general operational characteristics. For example, the two properties we just mentioned changes the pressure at which the hose starts extending and the pressure the hose stops extending. Also, making the spring stronger radially increases its radial strength to resist being crushed by heavy objects. Thus, the above description of the exoskeleton hose should be sufficient for the reader to understand how all combinations of springs and hose bodies would operate.

While exoskeleton hose's operate essentially the same, the exoskeleton springs and hose bodies by themselves can have different operational characteristics. Hybrid springs and multi-layer springs both provide longitudinal biasing and radial pressure strength, but multi-layer springs must deal with axial twisting because of its shape, while the hybrid springs do not. Thus, we will now discuss the operation of a number of springs and hose bodies, starting with the hose body designs.

Hose Body Operation (FIGS. 13a-13d)

While all the hose bodies discussed here are essentially corrugated (pleated) so that they an collapse like an accordion, the corrugation can be either radial or helical in nature. In FIGS. 13A and 13B, hose body 180 has a helical shape with ridge 188 and valley 187 that runs continuously along the length of hose body 180 in a helical pattern. As hose body 180 compressed longitudinally (folds up) from the position seen in FIG. 13A to the position seen in FIG. 13B, the valley portion 187 folds under the ridge portion 188 and is compressed. This collapsing process can proceed rapidly around the helical path of hose body 180. With hose body 180b seen in FIGS. 13C and 13D, there are multiple ridges 188b and multiple valleys 187b. Thus, when hose body 180b is compressed longitudinally, each valley 187b and ridge 188b combination must be compressed as a unit. This tends to make the compressing of hose body 180b slightly less smooth compared to helical hose body 180.

Spring Bias and Pressure Relationship (FIGS. 14A, 14B)

In FIG. 14A we see a graph relating the length of a typical linearly retractable hose 150, to the fluid pressure within the hose. These relationships are essentially the same as for prior art linearly retractable hoses, however, the novel feature of placing the hose body completely within a hybrid spring can allow a greater retraction/expansion ratio than previous designs.

At pressures below $P_1$, the retractable hose is substantially fully retracted at a length denoted by 1× on the graph in FIG. 14A. This 1× denotes a unit length of hose. As pressure increases above $P_1$ the hose begins to expand longitudinally as the force created by the water pressure inside the hose overcomes the retracting force generated by the hybrid spring biasing. As the fluid pressure within the hose continues to increase the hose continues to expand, and at a pressure $P_2$ reaches substantially its full length of 10×. The graph in FIG. 14A shows a straight line relationship between hose length and fluid pressure during the transition between pressures $P_1$ and $P_2$. This is because of the linear relationship between an ideal spring and its length of stretch. In reality, the hybrid spring is not perfectly an ideal spring and the flexible hose body will effect the retracting forces, making the change in length slightly curved on the graph, especially near pressure $P_2$ as the hose becomes taught.

At pressure $P_2$ the hose body material has substantially stopped its longitudinal expansion, and the hose body has stopped its radial expansion due to the radial strength of the hybrid spring. As fluid pressure increases above $P_2$ the hose body can stretch slightly in both the radial and longitudinal directions, but longitudinal fiber reinforcing within the hose body prevents much stretch beyond the designed value and radial expansion of the hose body is stopped by the radial strength of the hybrid spring. As the hose body flattens against the inside of the hybrid spring, further stretching of the hose is dominated by the longitudinal cords within the hose body. This stretching can be seen in the slight increase in the hose length as pressure increases well above pressure $P_2$ in the Normal Operation pressure range. As pressure continues to increase, eventually the hoses maximum pressure is reached at which point there is a danger that the hose will be damaged, either by the hose body rupturing through the gaps in the hybrid spring, or by breaking the longitudinal cords and the hose body expands lineally until it ruptures.

FIG. 14B shows the same information as seen in FIG. 14A, but on a linear graph of the different pressure states for a typical linearly retractable hose. For this discussion, the term "longitudinal bias force" or simply "bias force" is defined to include both the spring bias and any biasing caused by the flexible cover material (hose body) that actually makes up the hose. In most designs, the biasing caused by the flexible cover material of the hose is designed to be small compared to the biasing caused by the spring. However, in some designs, for special purposes, the cover material may represent a significant portion of the bias force. In fact, if desired, the hose may obtain all its biasing force from the cover material, and not need a separate metal or composite spring at all.

In FIG. 14B, when the interior pressure and exterior pressure of the hose are the same (zero gauge pressure), the hose is in what is called its "natural state", where the spring bias determines whether the hose is extended or retracted. This zero gauge pressure is signified by "0 ambient pressure" on the graph. Pressures to the left of "0" are vacuum pressure (pressure less-than ambient) and pressures to the right of "0" have positive pressure (pressure greater-than ambient). In general, a pressure hose will only experience pressure values to the right of "0" and vacuum hoses will only experience pressures to the left of "0". However, in some applications, pressure fluctuations may extend outside this range for each type of hose. At "0" gauge pressure, a linearly retractable pressure hose is fully retracted due to its biasing. The hose remains retracted by the biasing until pressure within the hose increases to gauge pressure $P_1$. At a pressure of $P_1$, the pressure hose is still fully retracted (net longitudinal force negative, trying to retract hose), but the force exerted by the bias exactly cancels the force exerted by the internal hose pressure $P_1$. As the hose gauge pressure increases from $P_1$ to $P_2$, the pressure hose extends and reaches its full length at a pressure of $P_2$. Again, if fluid is flowing through the hose, restrictions in the hose (fluid friction) may result in significant differences in pressure at different sections of the hose. At the pressure of $P_2$ the bias force still exactly matches the pressure force (net longitudinal force equals zero), but the hose is now fully extended. Above pressure $P_2$ (net longitudinal force positive–tending to extend hose) the pressure hose remains fully extended and cannot extend significantly further because it is restrained by the hose body or other stiffening means for limiting longitudinal expansion. Thus, the hose maintains substantially its fully extended length between pressure $P_2$ and up to its "Max. pressure" which is the maximum pressure the hose can withstand without damage.

Hose Body and Exoskeleton Spring Interaction (FIGS. 15A-C)

In FIGS. 15A-B, we see section views of hose 150 in its retracted and extended positions, respectfully. Hose 150 has been sectioned along its longitudinal length in FIGS. 15A and 15B as shown in FIGS. 11A and 11B, respectfully. In FIG. 15A, we see hose 150 in its retracted state, with outer helical ridge 188 of hose body 180 presses against the inner surface of hybrid spring 154. This pressure against the spring creates friction that tends to hold portions of hose body 180 in place with relative to corresponding portions of spring 154. Thus, as spring 154 extends, the friction between ridge 188 and spring 154 tends to keep hose body 180 extending at the same rate. This friction force is further enhanced by the application of fluid pressure within hose body 180 which tends to force hose body 180 outward against the inside of hybrid spring 154. In fact, fluid pressure will tend to forced hose body 180 outward against the inside of spring 154 even if the diameter of ridge 188 is substantially smaller than the inside diameter of hybrid spring 154. This is because substantial fluid pressure must first be built up within hose body 180 before sufficient pressure exists to cause hose 150 to extend. This minimum extending pressure (see $P_1$ in FIGS. 14A-B) can be used to expand hose body 180 against the inside of spring 154 before hose 150 begins to extend longitudinally.

In FIG. 15B, we see hose 150 in its fully extended state, with outer helical ridge 188 and valley 187 essentially undetectable, with hose body 180 expanded and presses against the inner surface of hybrid spring 154. The close spacing of adjacent sections of spring 154 only allows hose body 180 to bulge slightly outward between the spring's coils. Cords 182, which can be seen in section in FIG. 15C are taught and are preventing further longitudinal extension of hose 150. The tension in cords 182 increases as the internal pressure within hose body 180 increases. Thus, the tension in the cords counter balances the increased radial pressure and the angle of the bulges remain the same independent of the pressure within hose body 180 (see Eq. 3). The calculations for this follow that the longitudinal tension per inch in the hose body equals the Pressure times the area ($P\pi r^2$) divided by the circumference of the hose ($2\pi r$), which equals one-half the pressure times the radius of the hose ($\frac{1}{2}Pr$). The radial pressure per unit width of hose is equal to the gap width times the Pressure (GP) which half of this force is exerted on each side of the gap ($\frac{1}{2}GP$). Since both these forces must vectorially sum to equal the force created by the bulging hose body, we can create an equation defining the bulge angle (see Eq. 3). Using Eq. 3, we find that the bulge angle of hose body 180 does not depend on the internal pressure, but instead on the ratio between the gap width and the hose radius ($\text{Tan}(\theta)=G/R$). Thus, for a gap width of 0.20 inches (G=0.20) and a hose body diameter of 0.80 inches (r=0.40 inches). The bulge angle at the gap edge would be twenty-seven degrees (27 degrees), which would provide a relatively very small bulge, because the bulge angle is reduced to zero degrees at the middle of the gap. Eq. 3 assumes that hose body 180 provides no radial support itself, only from cords 182. As pressure is released from within hose body 180 in its completely extended position (see FIG. 15B), the elastic nature of hose body 180 begins pulling back away from spring 154 and into its retracted shape seen in FIG. 15A. This elastic return to the original corrugated hose shape seen in FIG. 15A is essential for providing hose 150 with repeatable extension and retraction ability.

Flow Restriction for Linearly Retractable Hoses

As with prior art Linearly Retractable Water Hose designs, the improved hose designs here can still require a restricting nozzle or adaptor at the dispensing end of the hose to ensure sufficient pressure within the hose to maintained the hose in its extended position. With a light spring bias, little or no restriction at the hose's dispensing end is needed. The user can actually stretch the hose themselves if a light enough spring bias is use, and/or friction of water flowing through the hose can generate sufficient pressure buildup within the hose to cause it to extend. However, if a stiff spring biasing is used, some back-pressure within the hose is desirable to keep the hose from pulling on the user during use. Any hose attachment, like a spray nozzle, a water sprinkler, etc. can produce significant back-pressure within the linearly retractable hose, which can extend even a very stiffly biased hose. In prior art designs, the dispensing end of the linearly retractable hose can include a restriction built directly into that end of the hose. This insures that sufficient back-pressure is generated at all times during use to keep the hose extended for use, independent on what nozzle attachment or lack of nozzle attachment might be engaging the dispensing end of the linearly retractable hose. Care must be taken to not overly restrict water flow at the dispensing end so that insufficient water flow remains to supply water in the desired quantities. The restriction may also be accomplished with a twist on extension, which can be screwed onto the dispensing end of the linearly retractable hose to provide restriction in water flow.

Of course linearly retractable pressure hoses may be made with a minimum of flow restriction and rely entirely on end attachments, such as water sprinklers, spray nozzles, water toys, and similar water device, to provide the hose with the needed flow restriction to provide the needed back-pressure to extend the hose. For hose 150 (see FIGS. 11A-B) this would mean that faucet connector 152 and nozzle connector 158 would be designed with a large bore passageway through them, so that these end connectors create very little fluid-flow restriction. With this type of open flow design, several linearly retractable pressure hoses can be chained together in series to produce a longer hose that has less pressure loss at the dispensing end than would occur if each hose had a built in flow restriction. Thus, linearly retractable hoses would preferably not have any flow restriction built into the dispensing end of the hose, but rely on removably attachable flow restrictions (valves, spray nozzles, sprinklers, etc.) to the end of the hose to provide back-pressure.

Of course, this type of hose can be used with other fluids besides water. Many different means for creating a fluid flow restriction are possible. Multiple constrictions may be used, and may be placed along the length of the hose or may be placed near the end of the hose, for the purpose of creating a restriction on fluid flow, which in turn, will create a back-pressure within the hose to help keep it extend during use. The user can control the extending and retracting of the hose by simply controlling rate of flow of fluid at the source, (i.e. by turning a water faucet on and off).

Ramifications, and Scope

Although the above description of the invention contains many specifications, these should not be viewed as limiting the scope of the invention. Instead, the above description should be considered illustrations of some of the presently preferred embodiments of this invention. For example, many additional ways exist for applying the hose body onto the biasing means, the examples shown here are just for illustration. For example, additional variations and other ways exist to construct the wave-spring to provide a strong tight-spaced biasing structure. Similarly, the cross-section of the wire used to make these hybrid springs can be varied significantly, and the shapes shown here (circular, oval, trapezoid, and rectangular) are only for example. Also, many additional ways exist for creating a flexible hose body that is capable of retracting to 1/10th its extended length and the examples shown here are just for illustration. The materials comprising the hose body, and the hybrid spring, do not need to be limited to the examples given. For example the hose body can be made from any of a number of resilient and flexible polymers and polymer mixtures. Similarly, any of a number of different fibers can be added to the hose body to provide added strength in the desired orientations. The hybrid spring can be made from many different metals, alloys and even composites. Also, the fabric woven around the hose body can comprise any number of natural and/or synthetic fibers to increase radial strength and/or longitudinal strength of the hose. Finally, the hose body can comprise any number of different layers, with each layer's placement following a path either inside or outside the spring biasing means, to provide a nearly endless number of combinations for construction of a linearly retractable pressure hose. And of course, these Linearly Retractable Hose Structures can be used with nearly any fluid including water.

Thus, the scope of this invention should not be limited to the above examples, but should be determined from the following claims:

The invention claimed is:

1. A hose comprising:
   (a) a flexible elongated outer tube having a first end and a second end, an interior of said outer tube being substantially hollow;
   (b) a flexible elongated inner tube formed of an elastic material and having a first end and a second end, an interior of said inner tube being substantially hollow;
   (c) a first coupler secured to said first end of said inner and said outer tubes;
   (d) a second coupler secured to said second end of said inner and said outer tubes; and
   (e) said first coupler adapted to couple said hose to a source of pressurized fluid, said second coupler adapted to couple said hose to a fluid flow restrictor, whereby said fluid flow restrictor is adapted to create an increase in fluid pressure between said first coupler and said second coupler within said hose to expand said elongated inner tube longitudinally along a length of said inner tube and laterally across a width of said inner tube thereby substantially increasing a length of said hose to an expanded condition and wherein said hose is adapted to contract to a substantially decreased or relaxed length when there is a decrease in fluid pressure between said first coupler and said second coupler;
   wherein the flexible elongated inner tube provides a biasing force sufficient to retract the hose from the expanded condition to the relaxed length when fluid pressure between said first coupler and said second coupler is equal to or less than ambient pressure.

2. The hose of claim 1 wherein said inner tube and said outer tube are unsecured to each other between their first and second ends.

3. The hose of claim 2, wherein the flexible elongated outer tube is a hybrid tension wave spring.

4. The hose of claim 2, wherein the flexible elongated outer tube is constructed from a fabric material.

5. The hose of claim 4, wherein the flexible elongated outer tube comprises a woven tube comprising fibers woven substantially in the radial direction and the longitudinal direction of the hose.

6. The hose of claim 1 further comprising a spring disposed between the flexible elongated outer tube and the flexible elongated inner tube.

7. A hose comprising:
   a flexible elongated outer tube constructed from a fabric material having a first end and a second end, an interior of said outer tube being substantially hollow;
   a flexible elongated inner tube having a first end and a second end, an interior of said inner tube being substantially hollow, said inner tube being formed of an elastic material;
   a first coupler secured to said first end of said inner and said outer tubes;
   a second coupler secured to said second end of said inner and said outer tubes with the inner and outer tubes unsecured to each other between first and second ends; and
   said first coupler fluidly coupling said hose to a source of pressurized fluid, said second coupler coupling said hose to a fluid flow restrictor,
   whereby said fluid flow restrictor creates an increase in fluid pressure between said first coupler and said second coupler within said hose, said increase in fluid pressure expands said elongated inner tube longitudinally along a length of said inner tube and laterally across a width of said inner tube thereby substantially increasing a length of said hose to an expanded condition and said hose contracting to a substantially decreased or relaxed length when there is a decrease in fluid pressure between said first coupler and said second coupler; and
   wherein the flexible elongated inner tube provides a biasing force sufficient to retract the hose from the expanded condition to the substantially decreased or relaxed length when there is the decrease in fluid pressure between the first coupler and the second coupler.

8. The hose of claim 7 wherein said outer tube is made from a material which will not stretch longitudinally or laterally when a force is applied to an interior of said outer tube.

9. The hose of claim 8, wherein said outer tube in made from a material selected from the group consisting of nylon, polyester, or polypropylene.

10. The hose of claim 9, wherein the flexible elongated outer tube comprises a woven tube comprising fibers woven substantially in the radial direction and the longitudinal direction of the hose.

11. The hose of claim 7, wherein said fluid flow restrictor is integrally formed with said second coupler.

12. The hose of claim 7, wherein said flow restrictor is a fluid nozzle which is removeably secured to said hose.

13. The hose of claim 7, wherein said hose is a garden hose.

14. The hose of claim 7 wherein said pressurized fluid is a gas.

15. A method of transporting a fluid comprising:
introducing a fluid into a hose, said hose including a non elastic, bendable elongated outer tube having a first end and a second end, an interior of said outer tube being substantially hollow, an expandable, elastic elongated inner tube having a first end and a second end, an interior of said inner tube being substantially hollow, said inner tube being formed of an elastic material;
securing a first coupler to said first end of said inner and said outer tubes;
securing a second coupler to said second end of said inner and said outer tubes;
said inner and said outer tubes being secured to each other only at said first and said second ends and unsecured to each other between said first and said second ends;
connecting said first coupler to a source of pressurized fluid;
connecting said second coupler to a fluid flow restrictor;
creating an increase in fluid pressure between said first coupler and said second coupler within said hose, said increase in fluid pressure automatically expanding said inner tube longitudinally along a length of said inner tube and laterally across a width of said inner tube thereby increasing a length and width of said hose to an extended condition; and
automatically contracting said hose to a decreased length and width by removing said fluid pressure differential between said first coupler and said second coupler, whereby said inner tube moves freely with respect to said outer tube when there is no fluid pressure differential between said first coupler and said second coupler;
wherein the elastic elongated inner tube provides a biasing force sufficient to retract the hose from the extended condition to the decreased length and width when the fluid pressure differential between the first coupler and the second coupler is removed.

16. The method of transporting a fluid of claim 15 wherein said outer tube constrains the lateral or radial expansion and the longitudinal expansion of said inner tube upon an increase of said fluid pressure between said first coupler and said second coupler within said hose.

17. The method of transporting a fluid of claim 16 wherein:
the hose is a garden hose; and
the fluid is water.

18. The method of transporting a fluid of claim 17 wherein:
the outer tube comprises a woven tube comprising fibers woven substantially in the radial direction and the longitudinal direction of the hose; and
the increase in fluid pressure is created using the fluid flow restrictor.

* * * * *